(12) United States Patent
Murashita

(10) Patent No.: US 7,268,913 B2
(45) Date of Patent: Sep. 11, 2007

(54) DISPLAY MEASURING METHOD AND PROFILE GENERATING METHOD

(75) Inventor: Kimitaka Murashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 809 days.

(21) Appl. No.: 10/028,264

(22) Filed: Dec. 28, 2001

(65) Prior Publication Data

US 2003/0142110 A1    Jul. 31, 2003

Related U.S. Application Data

(63) Continuation of application No. PCT/JP99/04588, filed on Aug. 25, 1999.

(51) Int. Cl.
| H04N 1/60 | (2006.01) |
| H04N 17/02 | (2006.01) |
| G09G 5/00 | (2006.01) |
| G01J 3/46 | (2006.01) |
| G01J 3/52 | (2006.01) |

(52) U.S. Cl. .................. 358/1.9; 358/504; 358/518; 358/527; 348/180; 348/181; 348/189; 348/191; 345/589; 345/690; 356/421

(58) Field of Classification Search .......... 358/1.9, 358/504, 500, 516, 527, 518, 530, 406; 345/600, 345/690, 603, 604, 589, 593, 594, 595, 904, 345/207; 348/180, 182, 649, 655, 181, 184, 348/189, 191; 356/213, 218, 221, 222, 228, 356/229, 421; 324/76.19, 76.22; 702/76, 702/77, 182; 382/167, 165
See application file for complete search history.

(56) References Cited

U.S. PATENT DOCUMENTS

| 4,648,046 A | 3/1987 | Copenhaver et al. |
| 4,941,038 A | 7/1990 | Walowit |
| 5,371,537 A * | 12/1994 | Bohan et al. ............... 348/181 |
| 5,475,424 A * | 12/1995 | Sowig et al. ............... 348/181 |
| 5,483,259 A | 1/1996 | Sachs |

(Continued)

FOREIGN PATENT DOCUMENTS

EP    0 767 445    4/1997

(Continued)

OTHER PUBLICATIONS

Yves Vander Haeghen et al, "Consistent digital color image acquisition of the skin", Proceedings of the 20th Annual Conference of the IEEE Engineering in Medicine and Biology Society, vol. 20, No. 2, 1998, pp. 944-949.*
Search Report for corresponding European Appl. No. 99940480.9 dated Apr. 4, 2006.

*Primary Examiner*—Scott A. Rogers
(74) *Attorney, Agent, or Firm*—Staas & Halsey LLP

(57) ABSTRACT

In order to stabilize a displayed color and to attenuate printing when measuring a color patch for preparing a color conversion profile, an accurate measurement is obtained by waiting for a certain time, repeating the measurement until measurements settle down or using a measurement obtained when the measurements of color patchs of different sizes all become equal. When preparing a matrix profile, which should be stored for higher accuracy, a γ value or a TRC value is judged and a selected value is stored in the profile. Both a matrix profile and an LUT profile are prepared and a profile with higher accuracy is stored as an available one.

14 Claims, 35 Drawing Sheets

U.S. PATENT DOCUMENTS

| | | | |
|---|---|---|---|
| 5,570,108 A | 10/1996 | McLaughlin et al. | |
| 5,579,031 A * | 11/1996 | Liang | 345/593 |
| 5,694,227 A | 12/1997 | Starkweather | |
| 5,809,366 A | 9/1998 | Yamakawa et al. | |
| 5,859,933 A * | 1/1999 | Sasanuma et al. | 382/275 |
| 5,877,787 A | 3/1999 | Edge | |
| 5,987,272 A | 11/1999 | Maeda et al. | |
| 6,130,961 A * | 10/2000 | Akioka et al. | 382/167 |
| 6,480,202 B1 | 11/2002 | Deguchi et al. | |
| 6,559,826 B1 * | 5/2003 | Mendelson et al. | 345/207 |
| 2001/0052998 A1 * | 12/2001 | Kiyosu et al. | 358/1.15 |
| 2002/0093509 A1 * | 7/2002 | Murashita et al. | 345/589 |
| 2005/0036162 A1 * | 2/2005 | Edge et al. | 358/1.9 |
| 2006/0279563 A1 * | 12/2006 | Shen et al. | 345/207 |

FOREIGN PATENT DOCUMENTS

| | | |
|---|---|---|
| EP | 0 785 672 | 7/1997 |
| EP | 0 789 283 | 8/1997 |
| EP | 0 866 603 | 9/1998 |
| EP | 0 912 042 | 4/1999 |
| JP | 62-101179 | 5/1987 |
| JP | 4-133571 | 5/1992 |
| JP | 5-290094 | 11/1993 |
| JP | 5-336552 | 12/1993 |
| JP | 6-090366 | 3/1994 |
| JP | 8-248721 | 9/1996 |
| JP | 8-262830 | 10/1996 |
| JP | 8-287226 | 11/1996 |
| JP | 9-187999 | 7/1997 |
| JP | 9-265225 | 10/1997 |
| JP | 9-307763 | 11/1997 |
| JP | 9-311520 | 12/1997 |
| JP | 10-213928 | 8/1998 |
| JP | 10222242 A * | 8/1998 |
| JP | 11-038719 | 2/1999 |
| JP | 11-55696 | 2/1999 |
| JP | 2000278722 A * | 10/2000 |
| WO | WO95/31794 | 11/1995 |
| WO | WO99/20036 | 4/1999 |
| WO | WO99/23637 | 5/1999 |

* cited by examiner

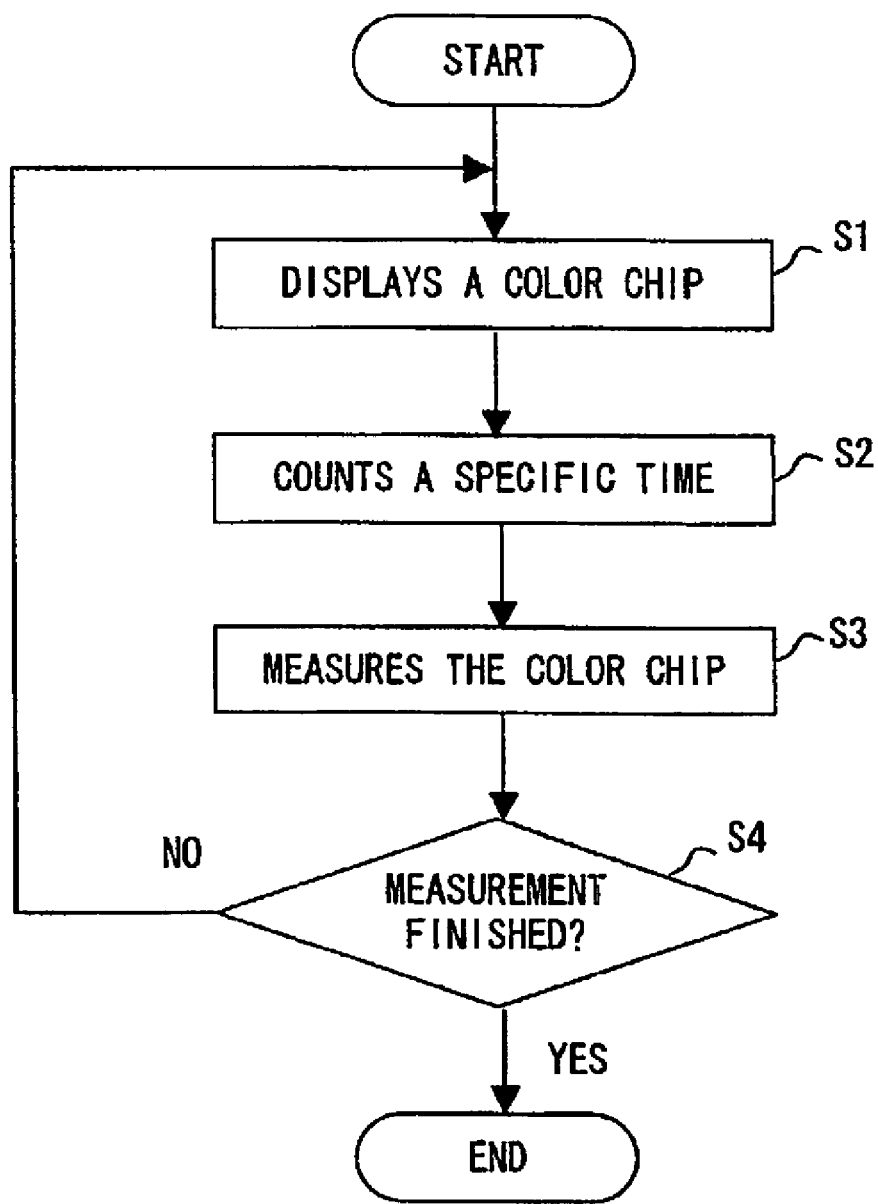
F I G. 6

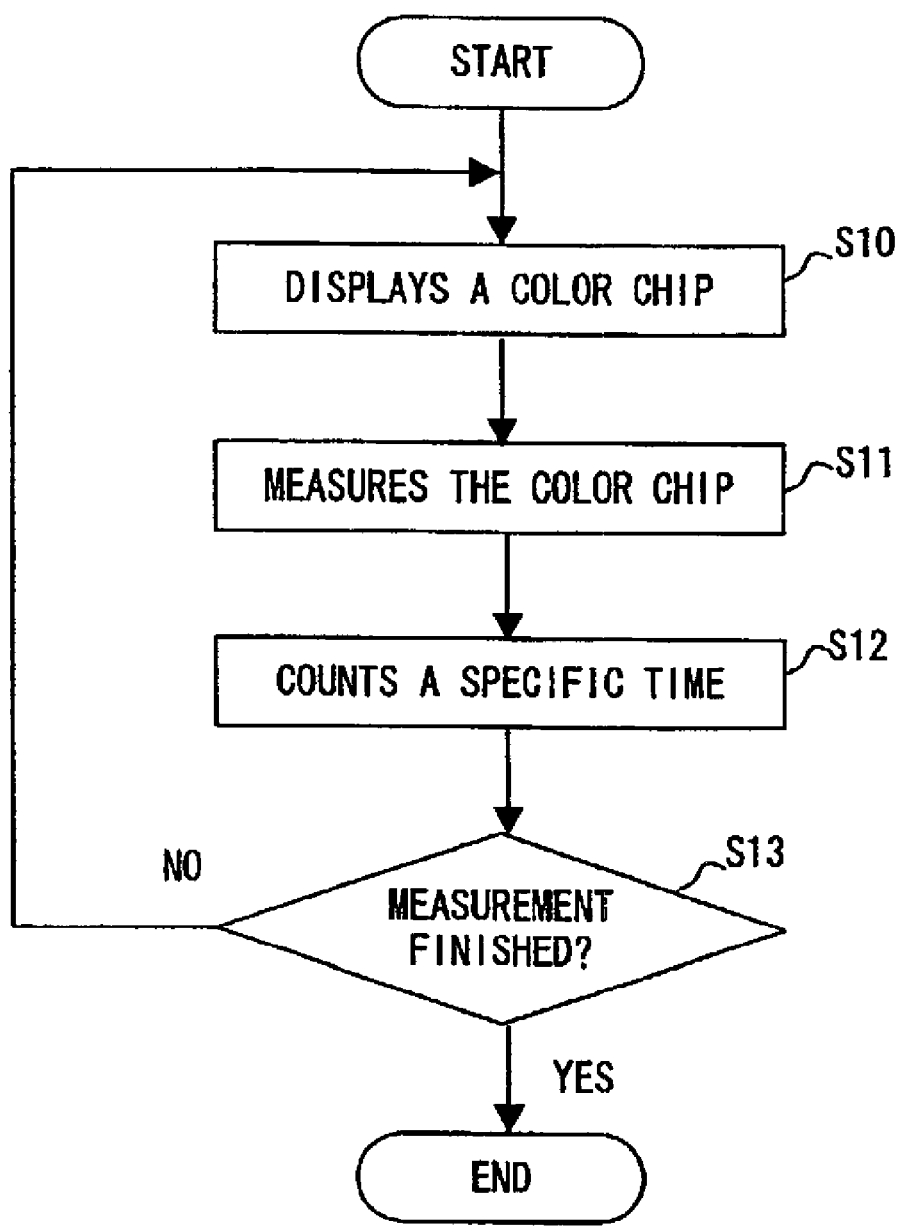
F I G. 8

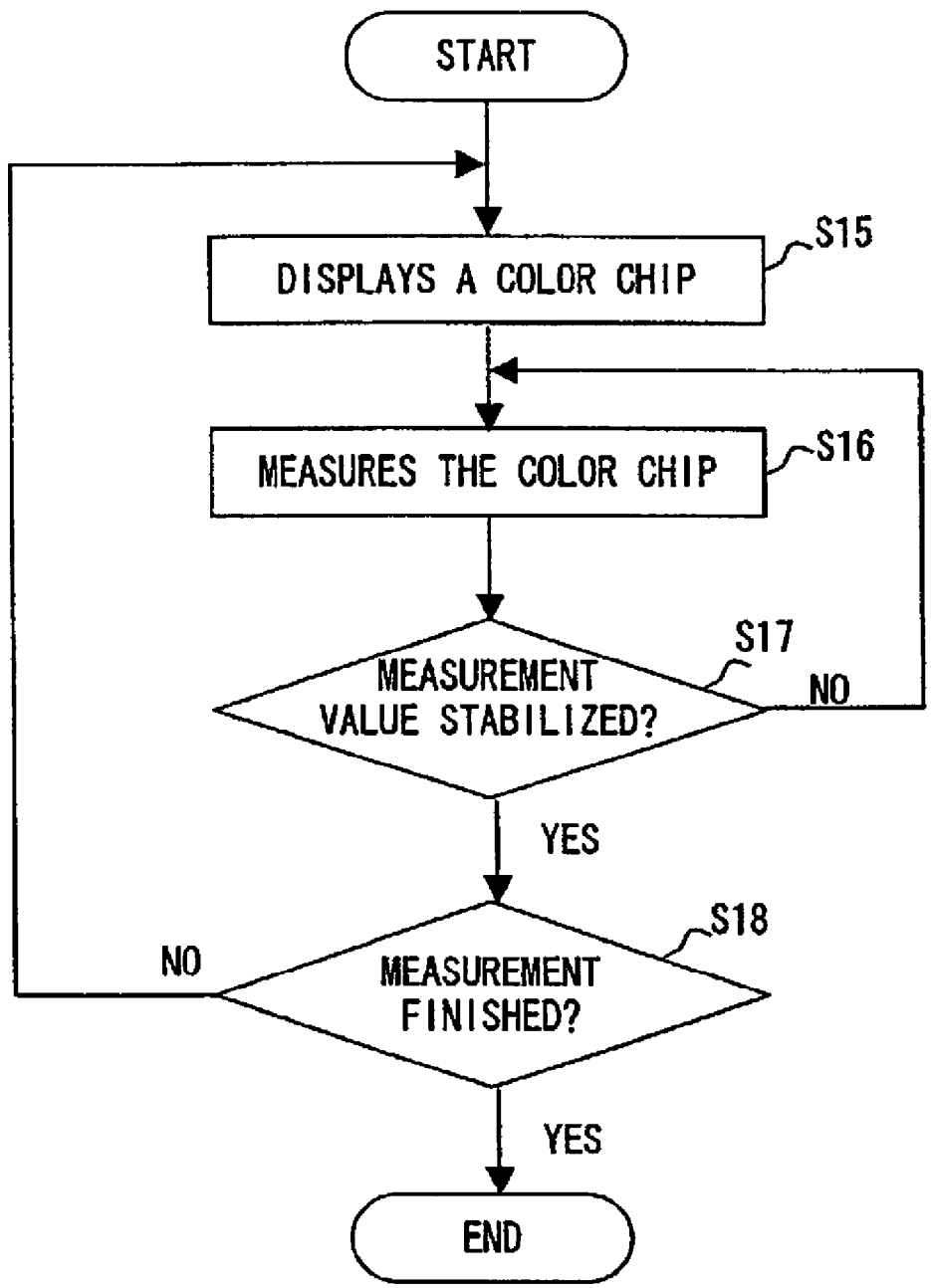
F I G. 9

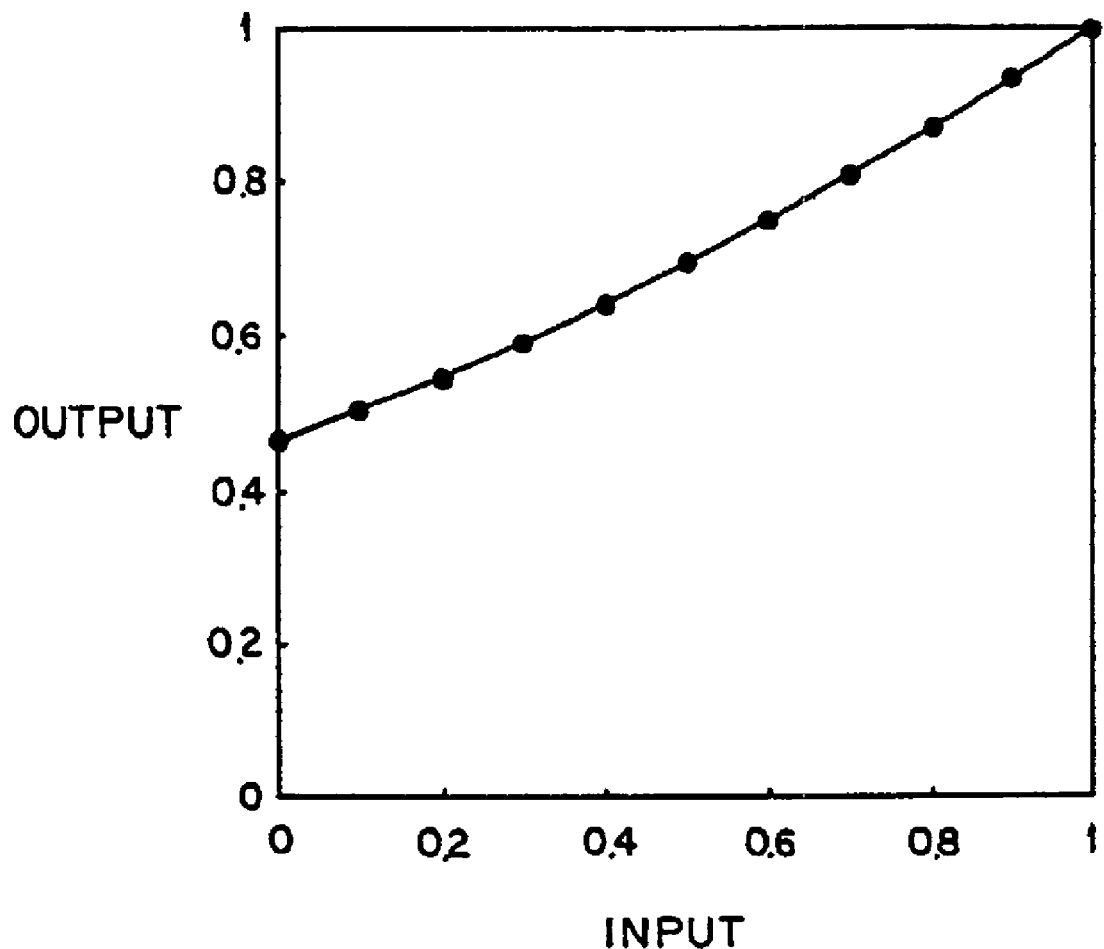
F I G. 11

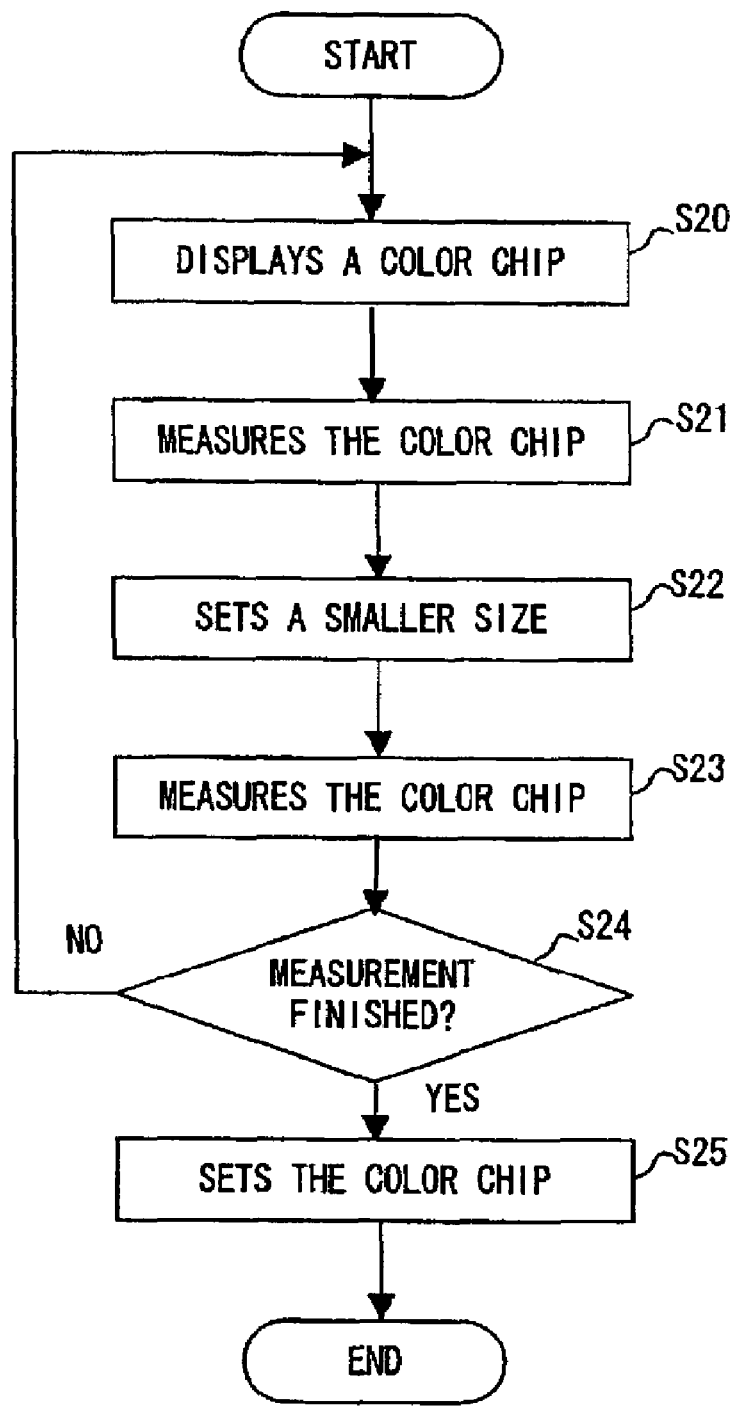
F I G. 1 2

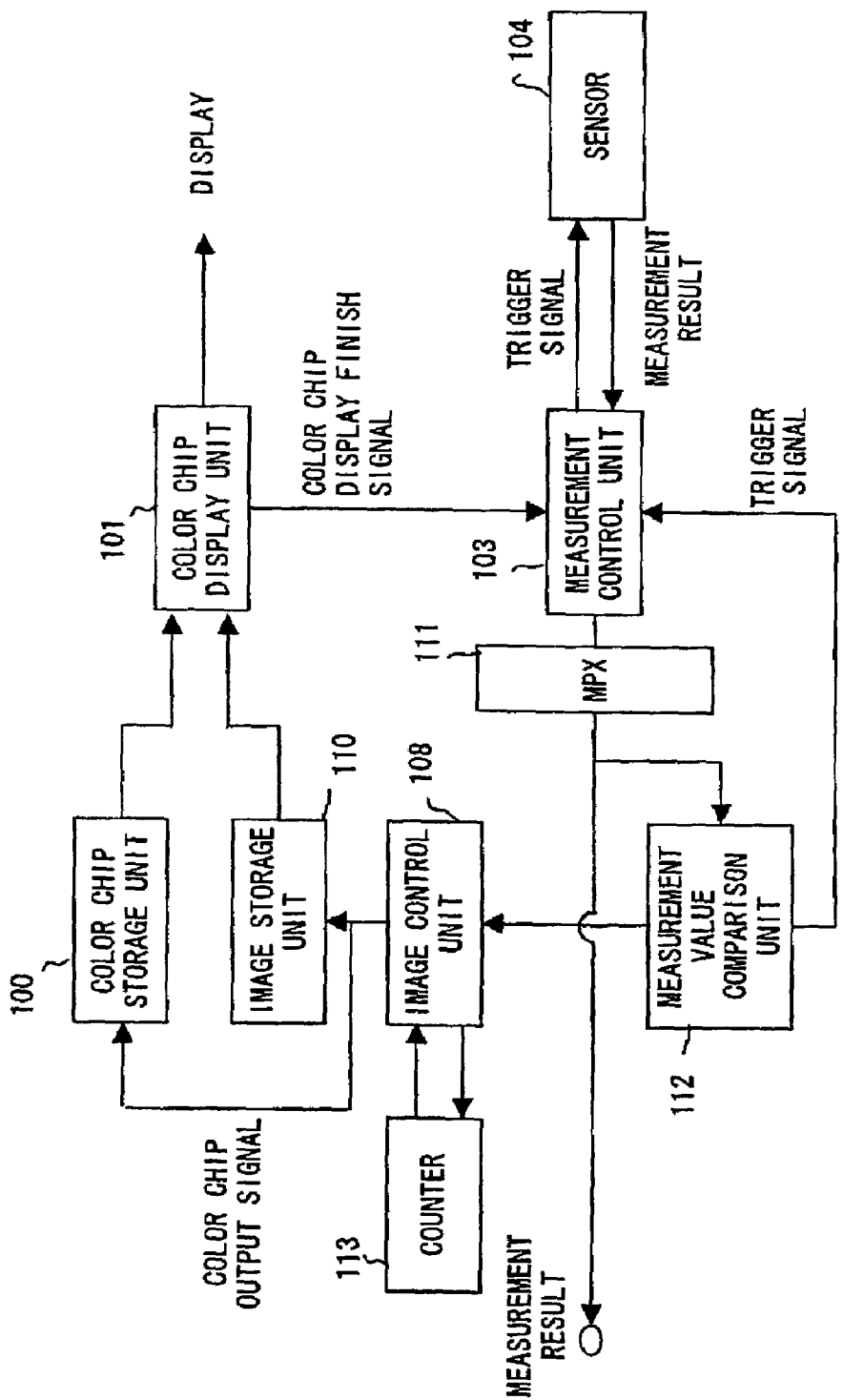
F I G. 23

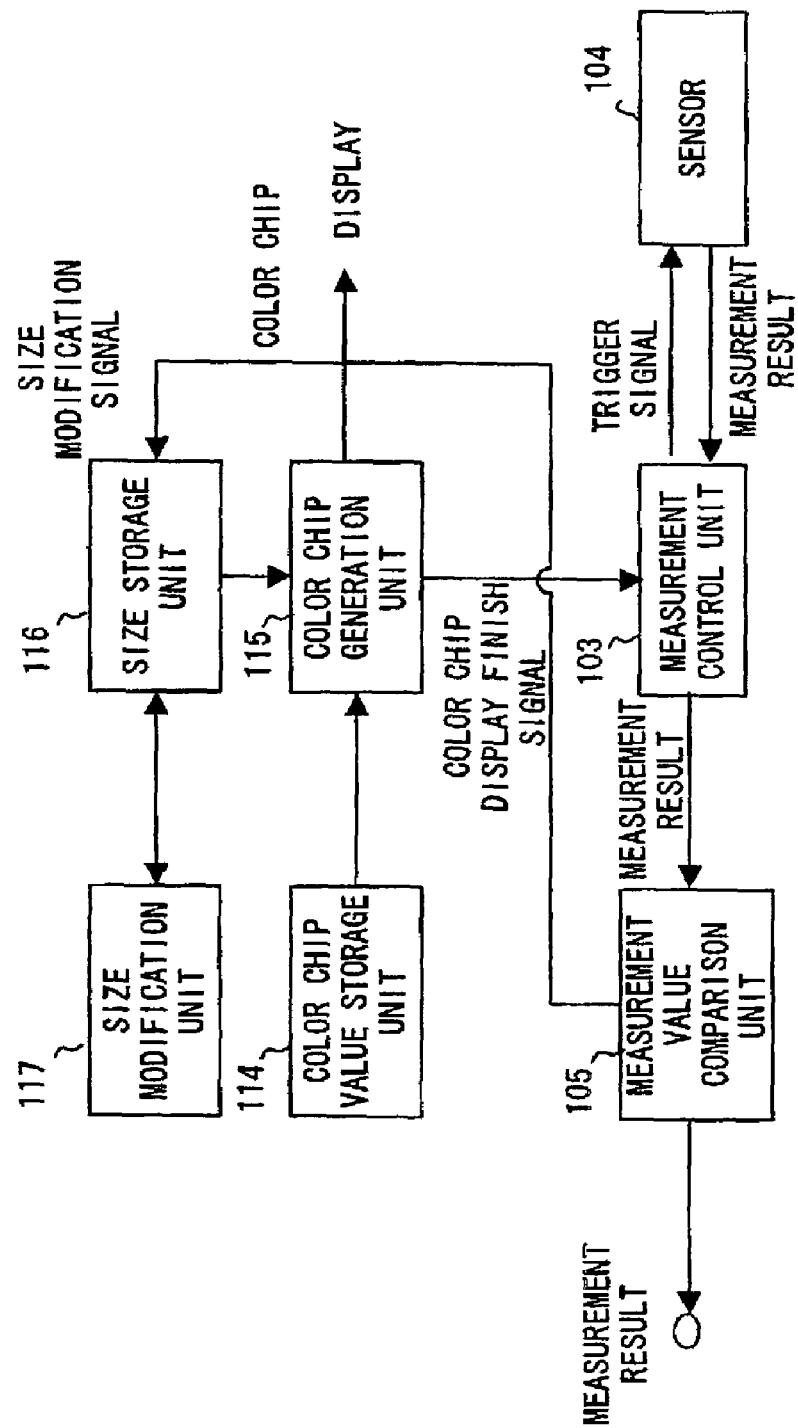
F I G. 24

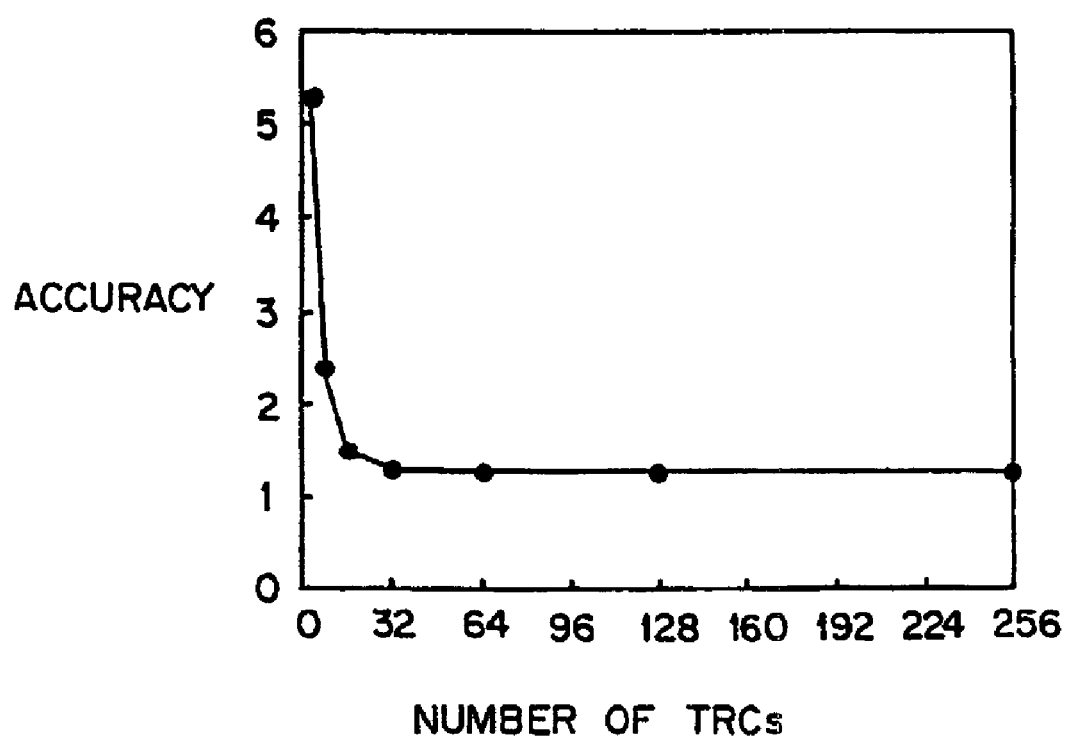
F I G. 26

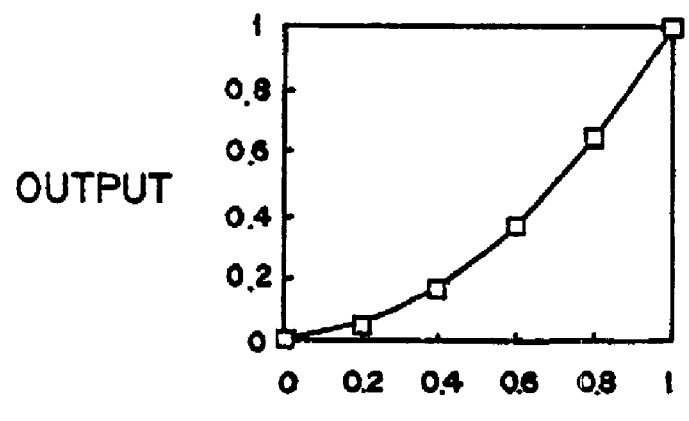
(a)
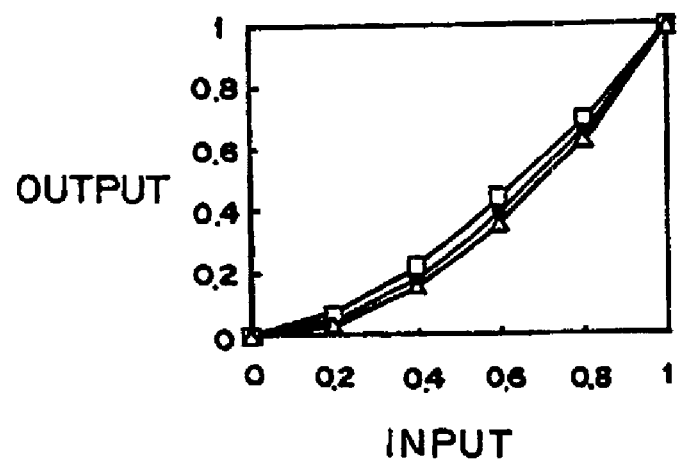
(b)
FIG. 27

```
0000000  0000 03d4 4b43 4d53 0200 0000 6d6e 7472
0000020  5247 4220 5859 5a20 07cf 0004 0010 0013
0000040  0013 0014 6163 7370 4d53 4654 0000 0000
  (OMITTED)
0001400  7269 6768 7428 4329 2046 756a 6974 7375
0001420  204c 5444 2e20 616e 6420 4675 6a69 7473
0001440  7520 4c61 626f 7261 746f 7269 6573 204c
0001460  5444 2e20 3139 3939 0000 0000 5859 5a20
0001500  0000 0000 0000 dddd 0001 0000 0001 1555
0001520  5859 5a20 0000 0000 0000 5247 0000 5555
0001540  0000 4669 5859 5a20 0000 0000 0000 5247
0001560  0000 5555 0000 4669 5859 5a20 0000 0000
0001600  0000 5247 0000 5555 0000 4669 6375 7276
0001620  0000 0000 0000 0005 0000 151f 4999 98a3
0001640  ffff 0000 6375 7276 0000 0000 0000 0005
0001660  0000 151f 4999 9888 ffff 0000 6375 7276
0001700  0000 0000 0000 0005 0000 1512 4974 989d
0001720  ffff 00
```

FIG. 28

DISPLAY MEASURING METHOD AND PROFILE GENERATING METHOD

CROSS REFERENCE TO RELATED APPLICATION

This application is a continuation of International PCT Application No. PCT/JP99/04588 filed on Aug. 25, 1999.

BACKGROUND OF THE INVENTION

1. Field of the Invention

The present invention relates to a display measuring method and a profile generating method.

2. Description of the Related Art

Thanks to both the spread of high-end personal computers and the low prices of image input/output devices, such as scanners, color printers or the like, the opportunities for individual users to handle color images have increased. As individual users have handled color images, color reproducibility has become a major problem. Specifically, the color of the displayed image of a display, the printed image of a printer or the like cannot be reproduced to be the same as that of an original image. This is because a color development mechanism or a color characteristic, such as a color conversion image spectrum or the like varies depending on input/output devices. A color management system (hereinafter called "CMS") is a technology for matching the color appearance between different input/output devices. By adopting a CMS, the color appearance of an image read by a scanner, that of an image displayed on a display and further that of an image outputted by a printer can be matched, thereby making the differences between the images undetectable by a user.

Today, the framework of a CMS is incorporated on an OS level as in ICM (image color matching) 1.0 of Windows95 and ColorSync2.0 of Macintosh OS. By providing a user with a device profile matched with ICM1.0 or ColorSync2.0, input/output device makers can guarantee the displayed image of a display, the printed image of a printer or the like, for which a user cannot detect an incompatibility, even if the user outputs the image using a different device. The device profiles of ICM1.0 and ColorSync2.0 conform to an ICC profile advocated by ICC (International Color Consortium). By providing a user with a profile conforming to ICC profile specifications, input/output device makers can guarantee the use in Windows and Macintosh environments of their input/output devices.

FIG. 1 shows the basic configuration of a CMS.

For example, data read from a scanner 1 is converted into common color signals that do not depend on devices (for example, CIELAB) using a scanner profile 2. By converting the common color signals into an image using a display profile 3 and by displaying the image, the color appearance of a manuscript inputted by the scanner 1 and that of a displayed image can be matched. The profile stores both information for converting signals peculiar to the device (for example, RGB values) into common color signals and information for converting the common color signals into the signals peculiar to the device (that is, a profile provided for each device).

Similarly, images generated by the scanner 1 or a display 4 are converted into common color signals (L*a*b* signals) by the scanner profile 2 or display profile 3. Then, the common color signals are converted into CMY (K) signals by a printer profile 5 and are outputted from a printer 6.

To perform high-accuracy color matching, the accuracy of a profile that stores the display characteristic of a display must be improved. To achieve this, a display measurement must be conducted without an error.

FIG. 2 shows the structure of an ICC profile.

In the ICC profile, all pieces of necessary data are described using tags. The ICC profile is composed of three parts: a profile header (128 bytes, fixed length) for representing both information about the profile itself and target equipment, a tag table for representing the types of information and the storage place and tagged element data for storing actual information. Information for representing the equipment property of an input/output device is stored in the tagged element data.

There are two types of profiles in an ICC profile: a matrix profile used mainly for a display profile and an LUT profile used for a printer profile.

The matrix profile uses the color additive-mixture characteristic of an input/output device. Color additive-mixture means that a color C(r, g, b) composed of specific RGB values r, g and b can be expressed by the sum of a color R(r, 0, 0) composed of only r, a color G (0, g, 0) composed of only g and a color B (0, 0, b) composed of only b.

$$C(r, g, b) = R(r, 0, 0) + G(0, g, 0) + B(0, 0, b)$$

The matrix profile stores both the measurement values of maximum red, green and blue and color tone characteristics of red, green and blue. A color tone characteristic is a relationship between input and output values and is also called a $\gamma$ characteristic. In this description, a color tone value means the output value of a color tone characteristic against a specific input value. Color tone data means the aggregate of color tone values against input 0 (minimum) to 1 (maximum). By utilizing this characteristic, for example, the CIEXYZ values of an arbitrary color C(r, g, b) can be calculated according to the following equation, if it is assumed that an RGB value is 8 bits, that the output values (CIEXYZ values) of maximum red (255, 0, 0), maximum green (0, 255, 0) and maximum blue (0, 0, 255) are $(X_{(255, 0, 0)}, Y_{(255, 0, 0)}, Z_{(255, 0, 0)})$, $(X_{(0, 255, 0)}, Y_{(0, 255, 0)}, Z_{(0, 255, 0)})$ and $(X_{(0, 0, 255)}, Y_{(0, 0, 255)}, Z_{(0, 0, 255)})$, respectively, and that the color tone characteristics of red, green and blue are fR(r), fG(g) and fB(b), respectively.

$$\begin{pmatrix} X_{(r,g,b)} \\ Y_{(r,g,b)} \\ Z_{(r,g,b)} \end{pmatrix} = \begin{pmatrix} X_{(255,0,0)} & X_{(0,255,0)} & X_{(0,0,255)} \\ Y_{(255,0,0)} & Y_{(0,255,0)} & Y_{(0,0,255)} \\ Z_{(255,0,0)} & Z_{(0,255,0)} & Z_{(0,0,255)} \end{pmatrix} \begin{pmatrix} fR(r) \\ fG(g) \\ fB(b) \end{pmatrix}$$

A matrix profile is used to calculate a relationship between input and output according to the above equation. Therefore, the profile stores the reference CIEXYZ value $((X_{(255, 255, 255)}, Y_{(255, 255, 255)}, Z_{(255, 255, 255)})$ of white, the values $X_{(255, 0, 0)}, Y_{(255, 0, 0)}, Z_{(255, 0, 0)})$, $(X_{(0, 255, 0)}, Y_{(0, 255, 0)}, Z_{(0, 255, 0)})$ and $(X_{(0, 0, 255)}, Y_{(0, 0, 255)}, Z_{(0, 0, 255)})$ of red, green and blue, respectively, and the color tone characteristics fR(r), fG (g) and fB (b) of red, green and blue, respectively (see FIG. 3). Since a matrix profile assumes that the above equation holds true, high accuracy can be obtained in the case of a device with both a high color additive-mixture and a high degree to which a color tone characteristic can be approximated by a relation f (approximation characteristic) (for example, a CRT). However, only low accuracy can be obtained in the case of the other devices (for example, a printer or the like). Even displays have different color additive-mixture characteristics and the approximation characteristics of a color tone characteristic vary depending on their types and models. Generally speaking, a CRT has high color additive-mixture and approximation characteristics, and an LCD or PDP has lower color additive-mixture and approximation characteristics than a CRT.

An LUT profile stores an LUT (look-up table) for converting an input value into an output value. The profile divides the space of an input value (for example, RGB values) into n×n×n grid data, and stores the output values of the grid points (CIELAB) as data. Similarly, an LUT for inverse conversion divides the space of an output value into m×m×m grid data and stores these input values as data. These division numbers n and m are called a "number of grids" or "grid". The numbers of grids n and m are usually 9, 17 and 33, which are all "prime numbers of 8 bits (256)+1". An ICC profile stores an LUT using 8-bit or 16-bit values. Since an ICC profile stores all correspondences between input and output using an LUT, an ICC profile has a greater size than a matrix profile.

The color-matching module (CMM) of a CMS converts color using an LUT. If an input value is on a grid, the CMM calculates an LUT value. If an input value is not on a grid, the CMM calculates an output value by interpolating a value in the neighborhood. The correspondence between input and output is 1 to 1, and is common to all devices. The LUT profile is not limited to use in a display and can be used in all color input/output devices.

To generate a display profile with high-accuracy, the following problems must be solved.

1. Color Stability Immediately After Display

In the case of a display, displayed color is in a transient state for a period immediately after display and then shifts to a static state. Since a measurement value in a transient state is a peculiar value, which is not the characteristic value of a display, measurement must be conducted in a static state.

2. Afterimage of Displayed Color

If another color is displayed after a specific color is displayed, sometimes the previous color affects a subsequent color. The influence of the previous color causes an error between a measurement value and the characteristic of a display.

3. Stability at the Time of the Start of a Display

Color on a display is in a transient state for a period immediately after the power of the display is switched on and enters a static state after several minutes to several tens of minutes. FIG. 4 shows the fluctuation characteristics of display luminance after the power is switched on. FIG. 4 shows an example of the luminance fluctuations immediately after the power of a CRT is switched on and which are shown in an international regulation draft IEC-61966-3, which the IEC (International Electro-technical Commission) is currently working on. The display measurement must be conducted in a static state. The period required for color to enter a static state (time constant) varies depending on the models and types of displays.

4. Display in which Display Luminance Fluctuates

Some models of displays change the amount of power applied to the displays depending on color or areas to be displayed in order to suppress power consumption. FIG. 5 is a graph for showing an example of a relationship between a display area and luminance. If such a display is measured without any correction, sometimes the measurement value of blue becomes brighter than that of white. Since the measurement of a display characteristic must always be conducted under the same conditions, an accurate profile cannot be generated from such a measurement result.

5. Measurement Error

A user must always monitor measurement situations so that an unexpected error cannot occur, for example, so that a measuring instrument does not malfunction during measurement or so that extraneous light is not measured.

6. Information Amount of a Matrix Profile

A matrix profile stores the color tone data of R, G, B or the like. The greater the number of color tones, the more accurate a profile becomes. However, the size of a profile increases in proportion to the number. The necessary information amount in a profile varies depending on the display.

7. Number of Tone Reproduction Characteristic Measurements

A matrix profile stores the color tone data of R, G. B or the like. In proportion to the number of color tones to be stored, the number of measurements increases and the period required to generate a profile increases.

8. Accuracy of the Information of a Profile

In a profile regulated by ICC, measurement values are stored as a ratio to white. As a result, even measurement values with different display luminance are stored as the same color if their ratios to white are the same. However, as known by the Betzolt-Brücke phenomenon or the like, color appearance changes as light intensity increases. It is known that human beings recognize such colors to be different. Since the color appearance of a specific color with a specific relative measurement value against white varies depending on light intensity, high-accuracy color matching cannot be expected.

9. Problems with Both Display Setting and Profile Generation

The color temperature and γ characteristic of some current displays and display cards can be changed. With such a model, a user can set the color temperature and γ characteristic. Since the display characteristic of a display varies depending on the color temperature setting and γ characteristic setting, a profile must be generated for each setting.

10. Number of Grids of an LUT Profile

An LUT profile stores the grid data of R, G, B or the like as a look-up table (LUT). The larger the number of grids, the more accurate a profile becomes. However, a profile size increases in proportion to the number. The necessary information amount in a profile varies depending on the display.

11. Number of Grid Data Measurements

An LUT profile stores the LUTs of R, G, B or the like. In proportion to the number of grids to be stored, the number of measurements increases and thereby the period required to generate a profile increases. Since a matrix profile stores color tone data, it is sufficient for a matrix profile to measure at most 759 colors (256 color tones for each of R, G and B and one white color (255, 255, 255)). Whereas, an LUT profile must measure at most 16,770,000 colors (256×256× 256 colors). Even an LUT with 10 grids must measure 1,000 colors. To generate a profile with high accuracy by using many grids, a huge amount of measurements must be conducted.

12. Selection of a Profile Type

There are two types of profiles: a matrix profile for storing both color tone values and the color information of R, G and B and an LUT profile for storing tables for color conversion.

Although the accuracy of a matrix profile is low except for a model in which the display characteristic of a display is pre-determined, the file size is very small (approximately 1 kB). Whereas, although the file size of an LUT profile is large (50 kB to 300 kB), the LUT profile can be used for any display (LCD and PDP display devices or the like). The profile, which should be used, varies depending on the types and models of displays.

13. Confirmation of Profile Accuracy

Even if a profile is generated, a user cannot confirm the adequacy of the profile on the spot.

SUMMARY OF THE INVENTION

An object of the present invention is to provide both a high-accuracy profile generating method and a display characteristic measuring method needed for color matching.

According to the present invention, to avoid an unstable display, immediately after a color patch is displayed, the color patch starts to be measured at a specific time after the color patch is displayed. Alternatively, a color patch can be measured a plurality of times and one measured after a measurement value is stabilized can be used as a correct measurement value.

By displaying and measuring a color patch at a specific time after the previous color patch disappears and before the display of a color patch to be measured, the afterimage of the previous color patch can be prevented from causing an error in a measurement value.

Displaying and measuring a color patch at a specific time after the start-up of a display can avoid the instability of the display at the time of start-up.

If the luminance of a display is changed in order to suppress power consumption, color patchs of different sizes are sequentially displayed and measured, and a color patch of the size, which has been measured when a measurement value is stabilized, is used.

If extraneous light has been measured by mistake, a measurement error can be detected by checking for a gap among measurement values.

Both the information amount of a matrix profile and the number of color tone characteristic measurements can be optimized by generating profiles with different information amounts and a different number of color tone characteristics and by measuring the respective accuracy.

As for an LUT profile, if the number of grids becomes fairly large, accuracy improvements stop. Therefore, the number of grids is determined in consideration of this point.

By calculating and comparing the respective errors for each device it is determined whether a matrix profile or an LUT profile has higher accuracy, and the profile with the higher accuracy is stored as the profile.

BRIEF DESCRIPTION OF THE DRAWINGS

FIG. 4 shows the fluctuations of display luminance after the power is switched on.

FIG. 6 is a flowchart showing the process of solving the first problem.

FIG. 8 is a flowchart showing the process in the case where the error of a color patch measurement value is reduced due to afterimage at display intervals of color patchs.

FIG. 9 is a flowchart showing the process in the case where color patch display intervals are automatically set.

FIG. 11 shows a γ curve based on a model of equation (2).

FIG. 12 is a flowchart showing the color patch measuring process of a display, the power consumption of which is variable.

FIG. 23 shows the configuration of the sixth preferred embodiment of the display-measuring device of the present invention.

FIG. 24 shows the configuration of the seventh preferred embodiment of the display-measuring device of the present invention.

FIG. 26 shows a relationship between the number of nodes of a TRC and the accuracy of a profile generated by the TRC.

FIG. 27 shows one γ characteristic of a display.

FIG. 28 shows the dump code of a matrix profile.

DESCRIPTION OF THE PREFERRED EMBODIMENT

Figure 1:
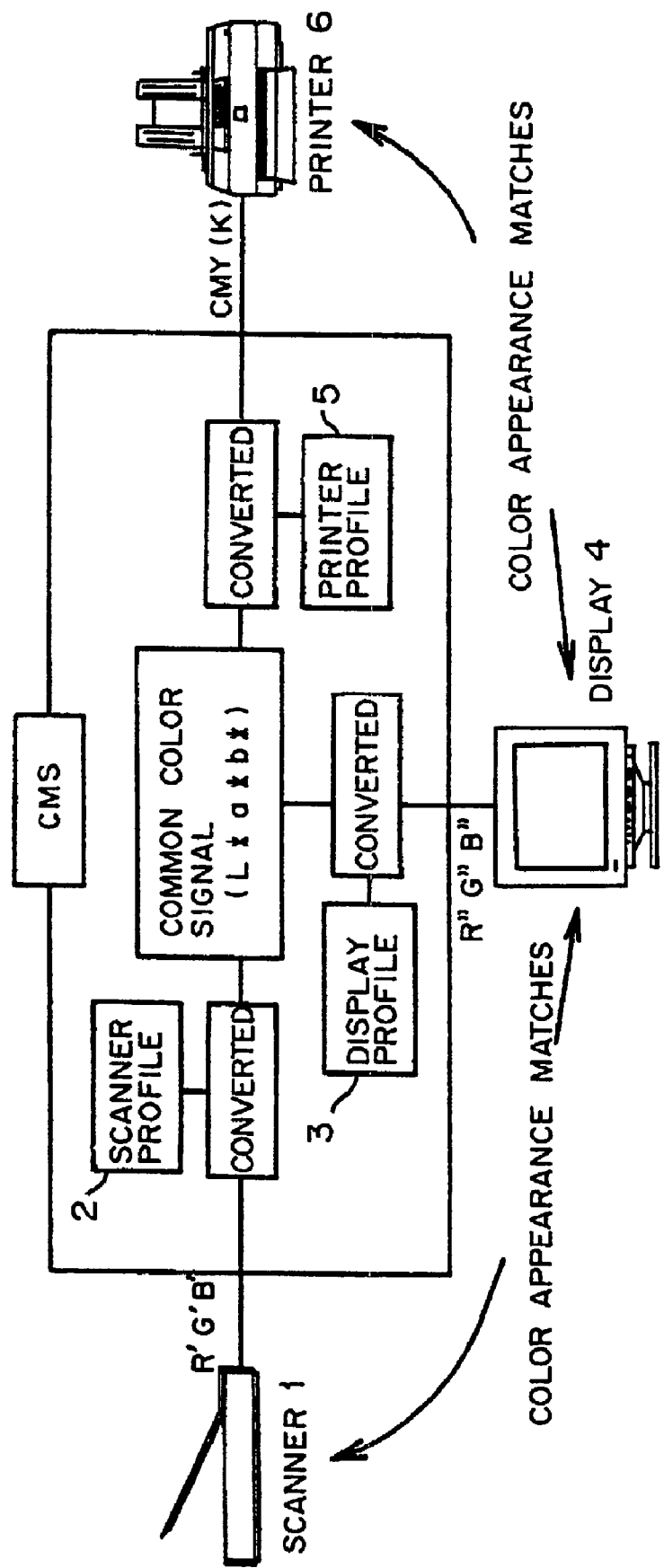
FIG. 1 shows the basic configuration of a CMS.

The first problem can be solved by a display measuring method comprising the steps of displaying one or a plurality of color patchs, counting a time that elapses after displaying the color patchs and measuring the color of the color patchs displayed on a display.

The second problem can be solved by a display measuring method comprising the steps of displaying one or a plurality of color patchs, measuring the color of the color patchs displayed on a display, displaying a pre-determined image after the measurement and counting a time that elapses after displaying the image.

The third problem can be solved by a display measuring method comprising the steps of displaying a pre-determined specific image (color patch) before the measurement of all color patchs, counting a time that elapses after displaying the image, displaying one or a plurality of color patchs and measuring the color of the color patchs displayed on the display.

The fourth problem can be solved by a display measuring method comprising the steps of displaying both a color patch of a standard size composed of the same color and a color patch of a fairly small size, measuring the respective color patchs, reducing the reference size if the measurement values of the respective color patchs are different and setting the reference size as the size of the respective color patchs if the measurement values of the respective color patchs are the same.

The fifth problem can be solved by a display measuring method comprising the steps of measuring the color of color patchs displayed on a display, comparing the RGB values of a color patch measured before with the RGB values of the current color patch and comparing the respective results in the color patch RGB value comparison step and measurement value comparison step.

The sixth problem can be solved by a profile generating method comprising the steps of measuring the color tone values of a display, generating a plurality of TRCs, on which the values of a plurality of tone reproduction curves (γ curves) at discrete points are recorded with different numbers of color tones based on measured color tone data, verifying the accuracy of a profile based on the TRC generated in the TRC generation step and generating a profile using a TRC with the highest accuracy.

The seventh problem can be solved by a profile generating method comprising the steps of measuring at least two colorless color patchs, detecting dispersion in the measurement values of the colorless images based on the measurement result in the colorless measurement step, comparing the dispersion value calculated in the dispersion calculation step with a predetermined threshold value and measuring the color tone value of a display.

The eighth problem can be solved by a profile generating method comprising the steps of storing reference data used to convert measurement data, converting a measurement value using the reference value and generating a profile using the converted measurement value. The reference value used to convert the measurement data is stored in the generated profile.

The ninth problem can be solved by a profile generating method comprising the steps of measuring a color patch displayed on a display, generating a plurality of LUTs with different numbers of grids based on measured grid data, verifying the accuracy of a profile based on the LUTs generated in the LUT preparation step and generating a profile using an LUT with the highest accuracy.

The tenth problem can be solved by a profile generating method comprising the steps of measuring a color patch displayed on a display, generating a plurality of LUTs with different numbers of grids based on measured grid data, verifying the accuracy of a profile based on the LUTs generated in the LUT preparation step and generating a profile using an LUT with the highest accuracy.

The eleventh problem can be solved by a profile generating method comprising the steps of displaying the color patch of color tone data on a display, measuring the color patch displayed on the display, generating grid data from the measurement value of the color tone data of R, G and B color elements by color additive-mixture and generating a profile from the grid data.

The twelfth problem can be solved by a profile generating method comprising the steps of measuring a color patch displayed on a display, generating a matrix profile, generating an LUT profile, calculating the accuracy of the generated matrix profile and selecting either the matrix or LUT profile.

The thirteenth problem can be solved by a profile accuracy verifying method comprising the steps of designating a profile, displaying a color patch for accuracy verification, measuring the color patch for accuracy verification, comparing a value calculated using the designated profile with the measurement result of the color patch for accuracy verification and verifying the accuracy of the profile based on the comparison result.

Since the color immediately after display is not stable, this measurement value does not correctly display a display characteristic (problem 1). The color immediately after display enters a normal state after a specific period of time in a transient state. By measuring in a normal state instead of in a transient state, the first problem can be avoided. To do so, it is better to set a time interval (measurement interval) between the display of a color patch and the start of measurement.

FIG. 6 is a flowchart showing the process of solving the first problem.

First, in step S1, a color patch is displayed on a display. Then, in step S2, a specific time is counted. After a specific time elapses, the color patch is measured (step S3), and in step S4 it is judged whether the process should be finished. If the process is not finished, the flow returns to step S1 and the processes are repeated. If the process is finished, the measurement is finished. A specific time (measurement interval) should be appropriately set depending on the model of the display or the like.

A measurement interval can be individually set depending on the model used by a user, by a user designating the model.

A time required for the color of a displayed slip to shift from a transient state to a normal state (time constant) can be largely classified depending on model. Generally speaking, the time constant of a CRT is short and that of an LCD or PDP is long. A measurement interval, which is pre-determined for each model of a display to be used, can also be adopted. This time constant sometimes varies depending on color patchs. The brighter a color patch, the longer the time constant. The darker a color patch, the shorter the time constant. In such a display, a measurement interval suitable for a color patch can be determined by increasing/decreasing the measurement interval depending on color patchs. Alternatively, a table of measurement intervals can also be generated in advance.

Alternatively, a measurement interval can be automatically calculated.

Figure 7:
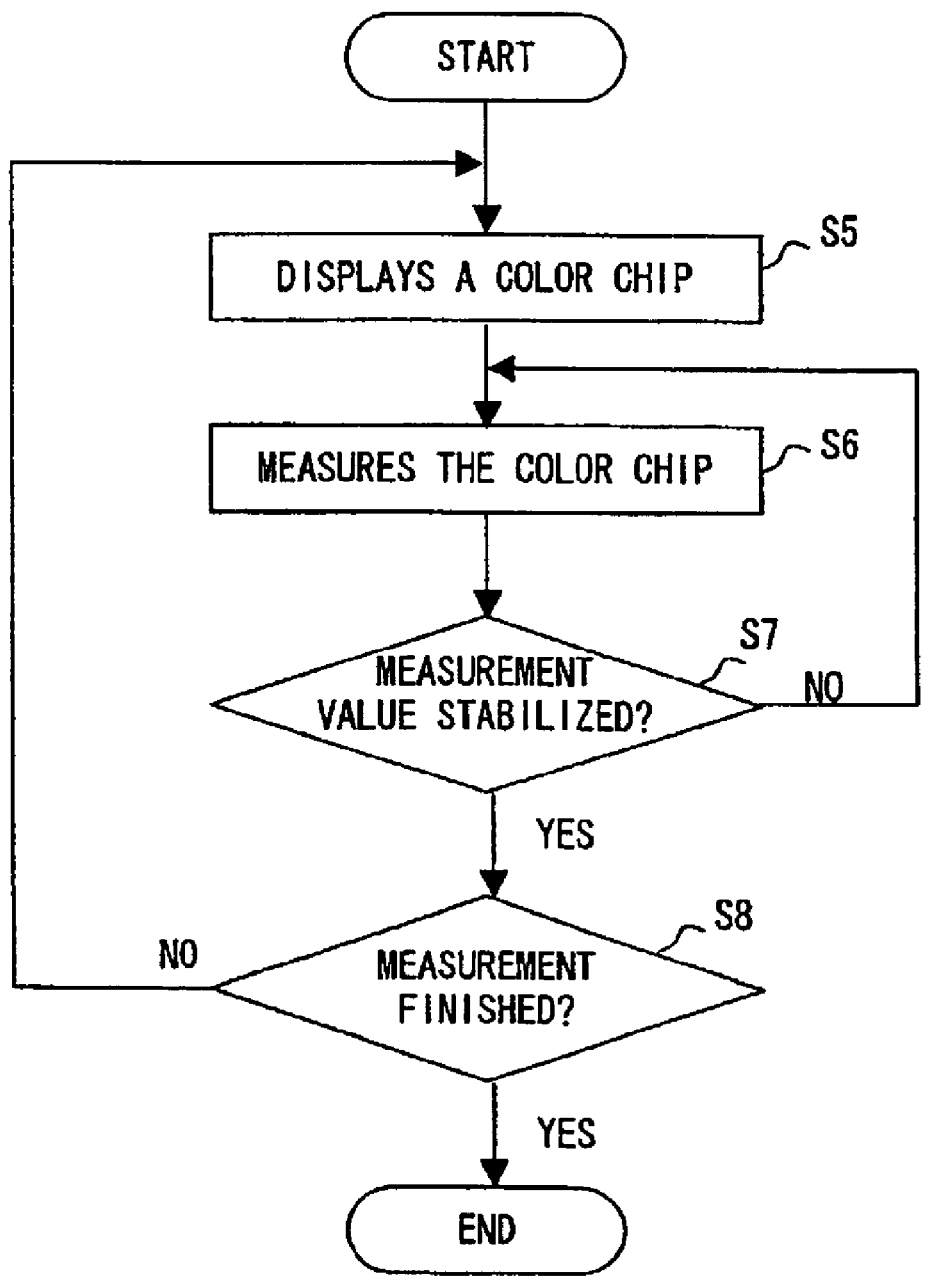
FIG. 7 is a flowchart showing the process in the case where measurement intervals are automatically set.

FIG. 7 is a flowchart showing the process of automatically setting a measurement interval.

First, in step S5 a color patch is displayed, and in step S6 the color patch is measured. In step S7, the measurement value of the previous color patch is compared with the measurement value of the current color patch and it is judged whether a measurement value is stabilized (the fluctuations of a measurement value remain below a specific threshold value). If a measurement value is not stabilized, the flow returns to step S6 and the color patch is measured again. If a measurement value is stabilized, in step S8 it is judged whether the measurement is finished. If there is no measurement value, the flow returns to step S5 and the measurement is continued.

In this case, the color patch is consecutively measured after the color patch display. If the current measurement result is significantly different from the previous result, the color is considered to be in a transient state. If the fluctuations diminish, the color can be considered to be in a normal state. If it is judged that the color is in a normal state, the measurement value of the color patch is stored. A period judged to be required for the color to enter a normal state after the color patch display in the first measurement is stored as a measurement interval. By using the result of the first measurement as a measurement interval for the second and subsequent measurements, a normal state judgment process can also be skipped for the second and subsequent measurements. If a time required for the color to enter a normal state varies depending on color patchs, a measurement interval can be increased/decreased depending on the values of color patchs using the first measurement result as the reference.

If, for example, blue (0, 0, 255) is displayed following red (R, G, B)=(255, 0, 0) on some display, sometimes there will be a slight shine to the color although the pixel of R is "0" (there is no voltage on the pixel of R). In such a display, for example, the measurement value of blue (0, 0, 255) obtained following black (0, 0, 0) is different from that of blue (0, 0, 255) obtained following red (255, 0, 0). In other words, the color to be displayed varies depending on colors displayed immediately before (problem 2). The phenomenon in which the color displayed immediately before remains on a display even after finishing the display, is called an "after-image". When there is an after-image, it is acceptable if a specific image is displayed for a specific period (color patch display interval) after displaying and measuring a color patch, and a subsequent color patch is displayed when there is no after-image. The specific image displayed in this case is a color with no after-image, that is, a color patch of black (0, 0, 0), and by displaying and measuring a subsequent color patch after a specific time elapses, measurement without the influence of an after-image can be made possible. Alternatively, a color display interval can be individually set for each color previously displayed. Furthermore, a time required to enter no after-image state can be largely classified depending on models. Generally speaking, in the case of a CRT, the period is short; and in the case of a PDP, the period is long. Alternatively, a color display interval pre-determined for each model to be used can be used. Sometimes the continuation time of an after-image varies depending on color patchs. The lighter a color patch, the longer the time, and the darker a color patch, the shorter the time. In such a display, a color display interval suitable for a color patch can be used by setting a different color display interval for each color patch or increasing/decreasing a color display interval depending on the color patchs. Alternatively, a color display interval can be automatically calculated.

FIG. 8 is a flowchart showing the process of reducing the error of a color patch measurement value due to an after-image by a color display interval.

First, in step S10 a color patch is displayed, and in step S11 the color patch is measured after the display enters a normal state. Then, in step S12 a specific time (color display interval) is counted after displaying a specific image, and in step S13 it is judged whether the measurement is finished. If the measurement should be continued, the flow returns to step S10. Then, another color patch is displayed and the process is continued. Otherwise, the process is terminated.

FIG. 9 is a flowchart showing the process of automatically setting a color display interval.

In step S15 a color patch is displayed and in step S16 the color patch is measured. In step S17, a previous color patch measurement value and a current color patch measurement value are compared and it is judged whether a measurement value is stabilized. If the value is stabilized, in step S18 it is judged whether the measurement is finished since it means that there no longer is an after-image. If the measurement value is not stabilized, the flow returns to step S16 and the color patch is measured again since it means that there is still an after-image. If in step S18 it is judged that the measurement should not be stopped, the flow returns to step S15 and a subsequent color patch is displayed.

If there are still large fluctuations when the measurements are compared, it can be judged that an after-image still remains. If there are no fluctuations, it is judged that there no longer is an after-image. If it is judged that there is no after-image, a subsequent color patch is displayed. As to the measurement of fluctuations, alternatively, first, a black image can be measured as a reference and the measurement result can be stored as a reference value. By measuring a black color patch and comparing the measurement value with the reference value, it can be judged whether there are fluctuations. In this case, a time required to judge whether there is an after-image after the color patch measurement is stored as a color display interval, and the process of judging whether there is an after-image can be skipped in the second and subsequent measurements by using the first measurement result for the second and subsequent measurements. If a period required to enter a normal state varies depending on color patchs, it is acceptable if the time is increased/decreased depending on the value of color patchs using the first measurement result as the reference value.

The display on a display is stabilized for a period after the power is switched on (problem 3). By displaying a specific image after the power of the display is switched on, displaying a color patch for a specific time (measurement start interval) after the display is switched on and starting the measurement of the color patch, measurement can be started in the stable state of the display. It is sufficient if a measurement start interval can be used only for the first measurement. Alternatively, by enabling a user to designate a measurement start interval, the measurement start interval can be individually set depending on a model used by a user. Furthermore, a period required to enter a normal state can be largely classified depending on models. Generally speaking, in the case of a CRT, the time is short, and in the case of a PDP, the time is long. Therefore, a color patch display interval pre-determined for each display model to be used can also be used.

Figure 10:
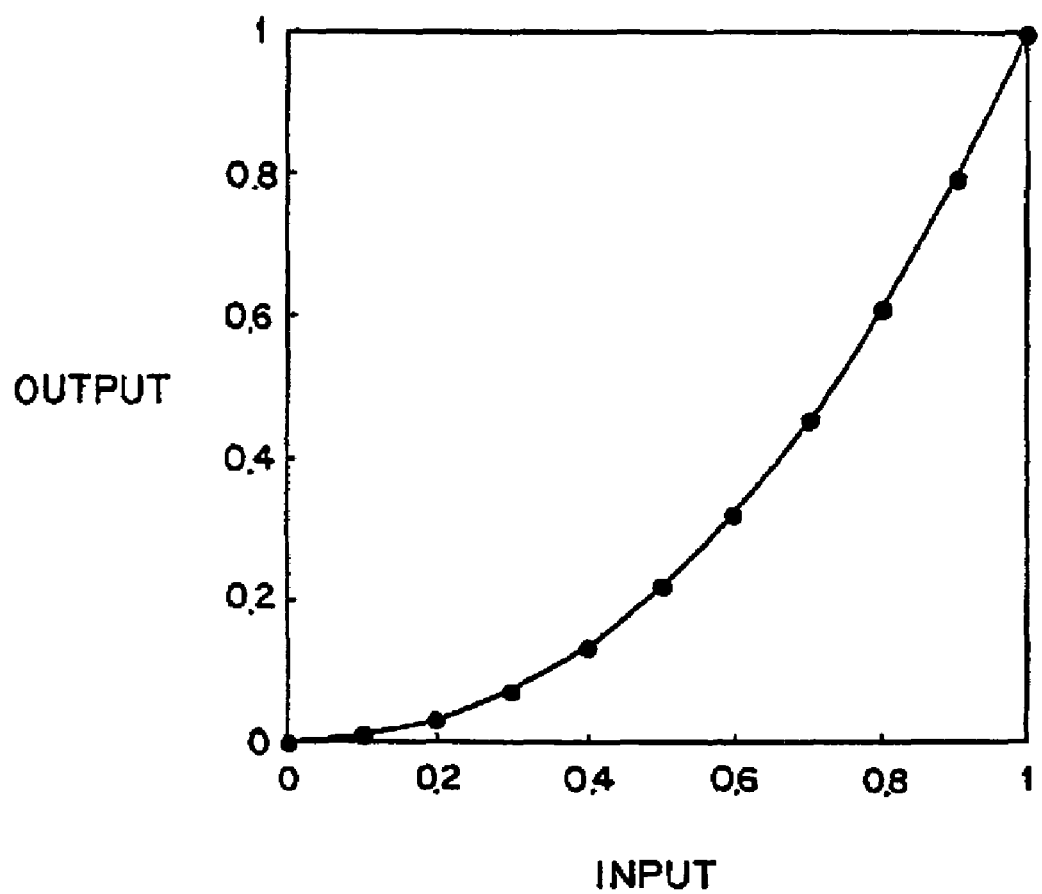
FIG. 10 shows one γ curve.

It is known that a tone reproduction characteristic of a display can be approximated by a curve called a γ curve. FIG. 10 shows one γ curve. A display with the tone reproduction characteristic shown in FIG. 10 can be expressed as follows.

$$(\text{Output})=(\text{Input})^\gamma (\gamma=2.2) \qquad (1)$$

In this case, this display is called a "display of γ(gamma) 2.2". There are also a display with a bright background and a display with a steeper rising input/output curve. The models of such displays cannot be expressed simply. They must be expressed by the following more complex equations.

$$(\text{Output})=a(\text{Input}+b)^{\gamma}+c \qquad (2)$$

(γ=2.2, a=1.5, b=1.8 and C-2.3)

FIG. 11 shows a γ curve according to a model expressed by equation (2). A matrix profile targets a model according to equation (1) and does not target other complex models. Therefore, sufficient color matching accuracy cannot be expected of a profile generated from the measurement value of a display of such a model. For example, the following complex models, in addition to model (1), can be generated, the relevant model can be judged based on the measurement results and the model of the relevant display can be judged by calculating the respective parameters.

$$\text{Output}=(\text{Input})^\gamma+c \qquad (3)$$

$$\text{Output}=a(\text{Input})^\gamma+c \qquad (4)$$

$$\text{Output}=a(\text{Input}+b)^\gamma+c \qquad (5)$$

By storing those parameters in a profile, color matching with higher accuracy can be implemented in CMSs corresponding to models (3) through (5) than in a CMS corresponding to only the conventional model (1).

Some displays perform control of voltage applied to a display panel depending on colors to be displayed or areas to be displayed for the reason that power consumption must be suppressed below a specific value or the like (problem 4). In the current display, in particular, in a PDP with large power consumption, such a method is popular. Such a function is designed to operate if the consumption power of a display exceeds a specific value. Therefore, if the display area of a color patch is small, the power control does not function.

FIG. 12 is a flowchart showing a color patch measuring process in a display with variable power consumption.

First, in step S20 a color patch is displayed and in step S21 the color patch is measured. Then, in step S22 a color patch with a smaller size than the measured chip is displayed, and in step S23 the color patch with the smaller size is measured. In step S24 it is judged whether the difference in a measurement value between color patchs measured in steps S21 and 23 is equal to or less than a threshold value. If the difference is judged to be equal to or less than the threshold value, it is not considered that power control has not been performed and in step S25 a color patch size is set to the color patch size set in step S22. If in step S24 it is judged that the difference of the measurement value is more than the threshold value, it is considered that power control has been performed, the flow returns to step S22 and a far smaller color patch is processed. Individual users should appropriately determine the threshold value.

Thus, a color patch of a pre-determined size is measured and then a smaller color patch is measured. If the two measurement results are different, it is detected that power control has been performed. In this case, the measurement of a smaller color patch is repeated. If the measurement results become the same, it is detected that power control has not been performed for the size, the color patch size is set to the size and the color is displayed. If white is displayed, the respective R, G and B pixels radiate at a maximum intensity. Since power consumption becomes a maximum if white is displayed, white (255, 255, 255) is preferable as the color of a color patch to be used to detect a size in which power control is not performed. If a size in which power control is not performed is determined, the size can also be stored and this stored size can also be used for the second and subsequent measurements.

If there is an error for some reason when a display is measured, it is difficult for a user to detect the error (problem 5). It is natural that high-accuracy color matching cannot be expected of a profile generated from a measured result with an error. Therefore, the existence/non-existence of an error during measurement must be detected. The error of a measurement value can be detected by judging whether a color additive-mixture can be applied. Alternatively, there is a correlation between a measurement color value (XYZ values) and a color patch value (RGB values). Generally, the greater the RGB values, the greater the CIEXYZ values. Therefore, the difference between measurement values can be detected by judging whether XYZ values increase/decrease as RGB values increase/decrease.

Since color additive-mixture can be applied in a display, the measurement value of white (255, 255, 255) is the greatest of those of all colors. Therefore, the existence/non-existence of the difference between measurement values can be detected by judging whether the result of white is the greatest. The measurement of white can be conducted first, the measurement value can be stored and the value can be compared with the second and subsequent measurement values. Alternatively, the measurement result of white can be compared with that of another color after the measurement is finished. In this case, comparison can be conducted for all the elements of a measurement value (for example, an X value, a Y value and a Z value in the case of CIEXYZ values) or for only one of the elements. A color to be used for comparison is not limited to white, and an arbitrary color can be used.

If an error is detected in such a check stage of a measurement value, a WARNING message is issued. It is preferable to notify a measurer of the error by making a BEEP sound or the like. Upon receipt of the message, the measurer checks whether a measuring instrument is disconnected, whether extraneous light penetrates or the like, and the measurement error can be immediately handled.

Figure 13:
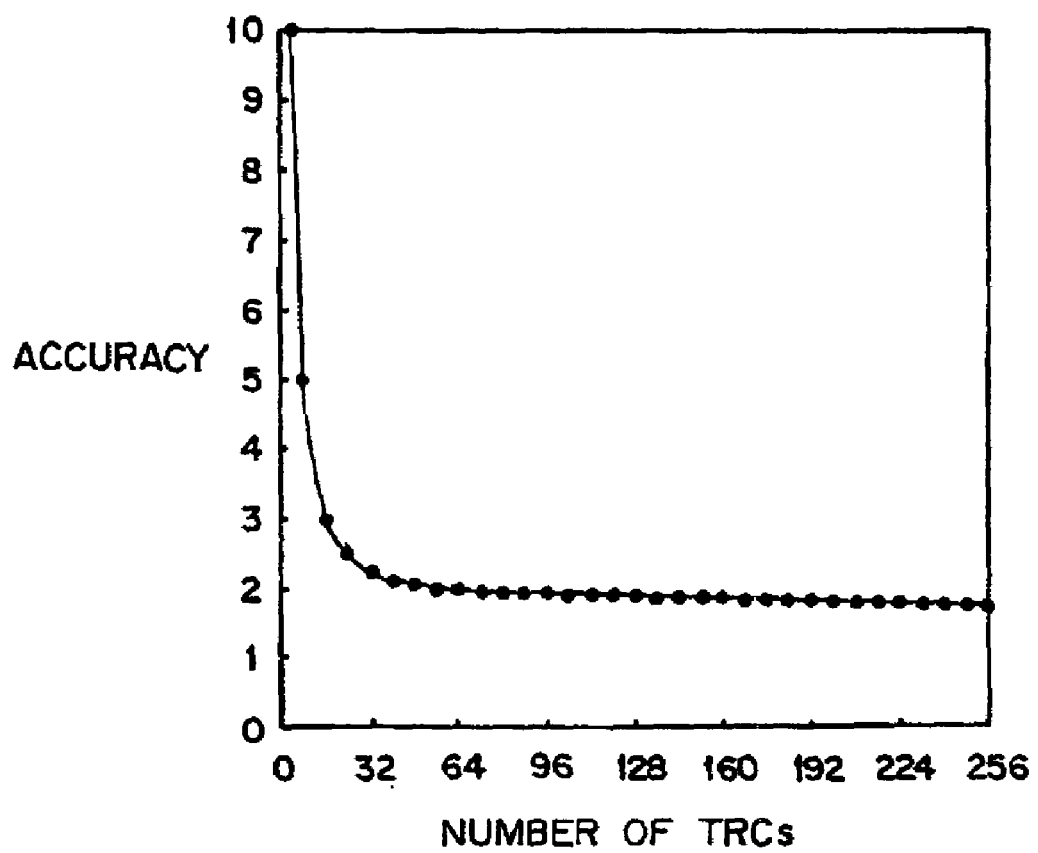
FIG. 13 shows a relationship between the number of nodes of a TRC and accuracy.

In a matrix profile, the respective color tone values of R, G and B can be stored in a form of a TRC. A TRC is expressed as a value in the range of 0 to 65535, with 65535 and 0 as the maximum and minimum values, respectively. Since, as the number of nodes expressing a TRC increases, the profile size increases in proportion to the increase. Therefore, it is preferable to generate a profile in which high accuracy can be obtained by even the small number of nodes in a TRC (problem 7). By generating several TRCs with different numbers of nodes based on the measurement results of R, G and B values, by calculating color reproduction accuracy in the case of each TRC and by storing a TRC with the highest accuracy in a profile, a profile with the highest accuracy can be generated. FIG. 13 shows a relationship between the number of nodes of a TRC and accuracy. In the case of a CRT, the number of nodes of a TRC does not improve accuracy any more after the number reaches a specific number. If the number of nodes of a TRC is increased, accuracy becomes higher. However, the file size also increases in proportion to the increase in the number of nodes of a TRC. Therefore, it is preferable to set the number of nodes of a TRC to about 16 in such a display since the improvement of accuracy becomes saturated at a specific point. By comparing accuracy corresponding to the number of nodes of a TRC with a file size and selecting the most effective number of nodes of a TRC, the highest performance can be introduced even in a small profile size. As to a matrix profile, there is also a method for storing a γ coefficient value instead of a TRC, on which a numeric value at each discrete point of a γ curve is recorded. If the tone reproduction characteristic of a display can be obtained and a relationship between an input and an output can be approximated by (Output)=(Input)$^{\gamma}$, a γ coefficient value can be stored instead of a TRC.

Figure 14:
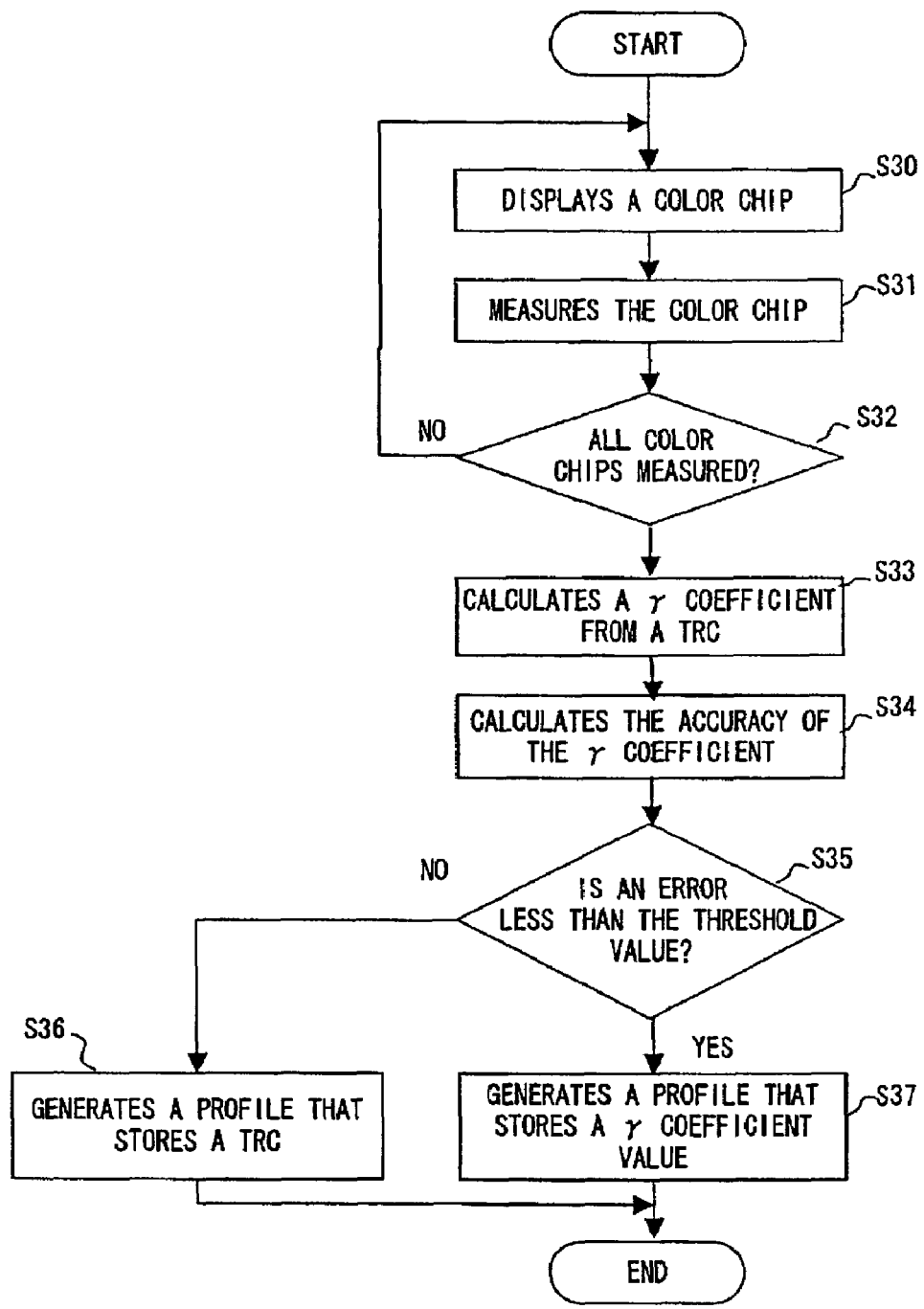
FIG. 14 is a flowchart showing the process of generating a profile for storing a TRC or a γ coefficient value.

FIG. 14 is a flowchart showing the profile generation process of storing a TRC or a γ coefficient value.

First, in step S30, a color patch in a specific color is displayed. In step S31 the color patch is measured, and in step S32 it is judged whether the measurement of all color clips in appropriate colors is finished. If the measurement is not finished, the flow returns to step S30 and the measurement is continued. If the measurement is finished, the flow proceeds to step S33 and a γ coefficient value is calculated from a TRC. Then, in step S34 the accuracy of an input/output relationship is calculated based on the calculated γ coefficient value, and in step S35 it is judged whether the error between the input/output relationship based on the calculated γ coefficient value and a measurement result is equal to or less than a threshold value. If the error is equal to or less than the threshold value, the accuracy of a profile using the γ coefficient value is judged to be high. Therefore, in step S37 a profile that stores a γ coefficient value is generated. If in step S35 it is judged that the error is more than the threshold value, the input/output relationship obtained by the calculated γ coefficient value does not have sufficient accuracy. Therefore, in step S36 a profile that stores a TRC is generated and the process is terminated.

The optimal number of nodes of a TRC varies depending on the types of display (problem 6). Therefore, the optimal number of nodes of a TRC for each type (or model) of display can also be generated and each can also be selected according to the type (or model). Although an ICC profile stores TRCs for each R, G and B color element, the profile does not always need to store measured TRCs for each R, G and B color element. Alternatively, a TRC can be generated by measuring the color tone data of white and the data can be stored as a TRC with R, G and B color elements. In particular, in the case of a CRT, there is almost no difference in a tone reproduction characteristic between red, green and blue color elements. Whether the tone reproduction characteristics of red, green and blue color elements are the same can be judged by measuring an intermediate tone color (gray). Specifically, if the tone reproduction characteristics of red, green and blue are the same, all the chromaticity values of gray are the same. In the case of a display with scattered color tones, for example, if the γ coefficient value of blue is smaller than that of red or green, the lighter dark gray becomes, the more bluish it becomes, and when it goes beyond a specific point, it becomes whitish. The chromaticity values of gray, which is an intermediate tone color, and white are measured. If there is no difference in the chromaticity values of gray and white, a TRC is generated from the color tone data of white or one of red, green and blue, and is stored as the TRC of red, green or blue. Thus, the number of times the measurement is required can be reduced. If there is a difference in the chromaticity values of gray, which is an intermediate color, and white, a tone reproduction characteristic must be obtained for each color and a TRC must be generated for each color.

Although in an ICC profile, the measurement value of a color patch is stored in a form of a ratio to a reference color (D50), color appearance also varies depending on light strength (Betzolt-Brücke phenomenon: problem 8). The numeric value of a profile can be uniquely determined by setting in advance a color, which will be a reference, modifying the measurement data based on the measurement value of the reference color, generating a profile based on the result and also storing the reference value in the profile. Alternatively, the measurement value itself can also be stored. By using such a profile, a CMS in which a difference in color appearance due to the Betzolt-Brücke phenomenon is taken into consideration can be implemented.

There are some current display devices, the display characteristics of which can be changed by a display, a display card, an OS or the like. Since the profile of a display varies depending on the display characteristics of a display, a profile must be generated after measuring the display characteristic of each display (problem 9). However, if a tone reproduction characteristic varies, the R, G, B and W values do not vary, and only a TRC varies. Similarly, if color temperature varies, the TRC does not vary, and only the R, G, B and W values vary. Therefore, modifying only a TRC without measurement based on a measured and generated profile can generate a profile, only the tone reproduction characteristic of which varies. Similarly, modifying only the R, G, B and W values without measurement based on a measured and generated profile when color temperature is modified can generate a profile with a different color temperature. The display characteristic of a display is determined not only by a single display, but also by a combination of display cards or the like. Therefore, even if a display card is set to γ2.2, there is no guarantee that the display is really set to γ2.2. One display is set to γ1.8, and another display is set to γ2.9. The same description applies to color temperature. Even if 9300K is set for a display, the color temperature of one display card is more than 10,000K and that of another display card is about 8,000K. In such a case, color temperature must be actually measured and the measurement result must be stored. However, the complete measurement is not required. The tone reproduction characteristic of a display can be approximated by (Output)=(Input)$^{\gamma}$. Therefore, if a point N (N≧2) on a tone reproduction curve is obtained, γ can be calculated.

Figure 15:
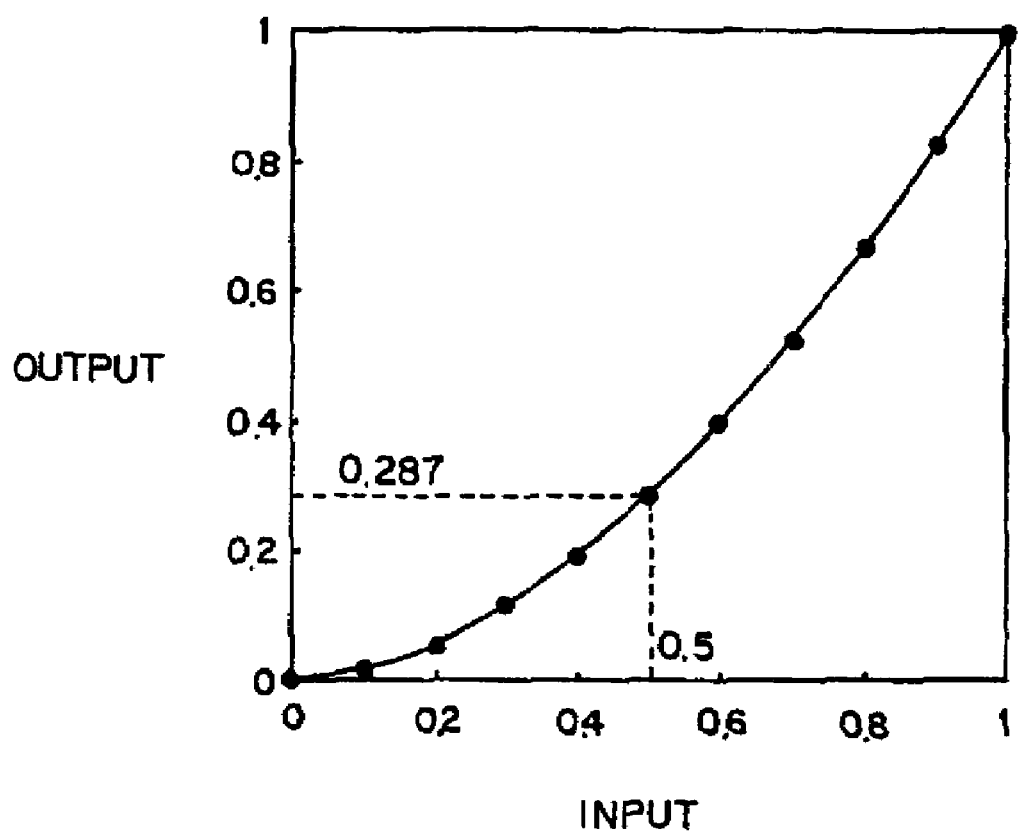
FIG. 15 shows the color tone characteristic of γ1.8.
Figure 16:
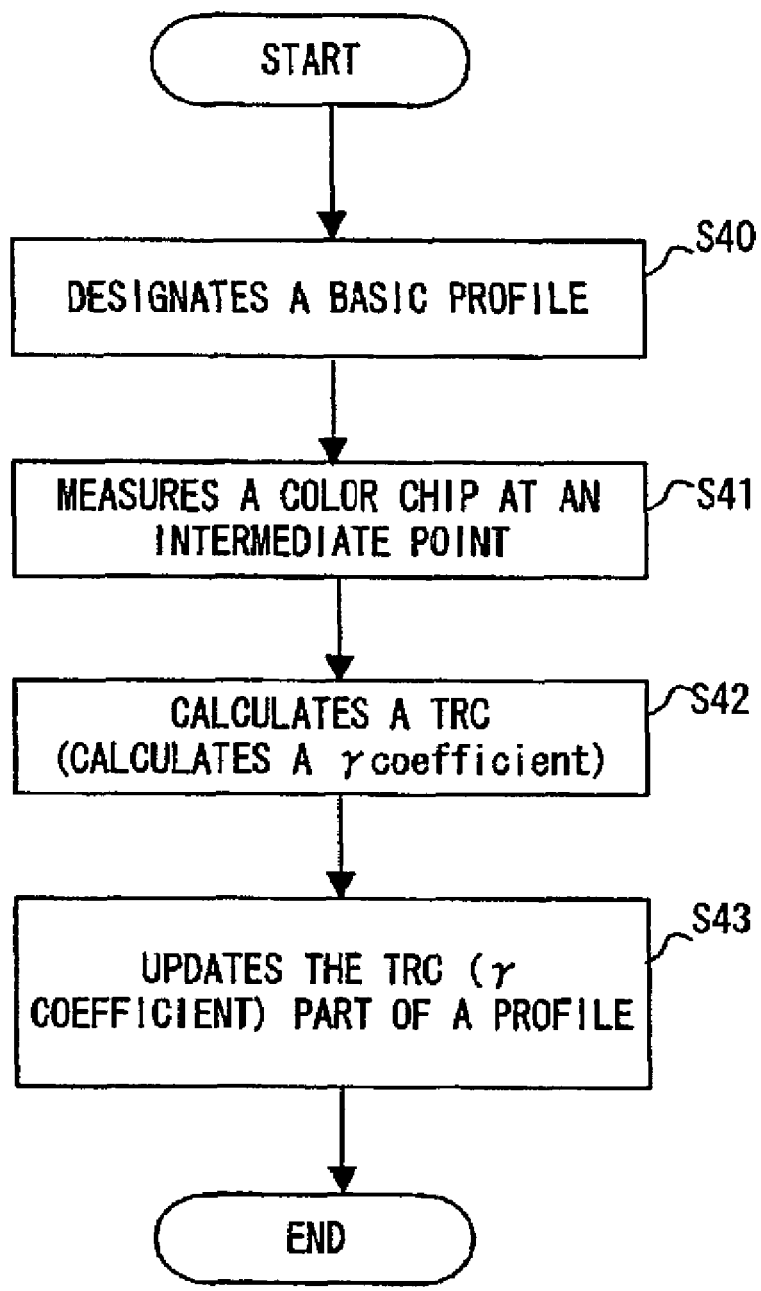
FIG. 16 is a flowchart showing the process of updating a profile by measurement.

FIG. 15 shows a γ characteristic, and FIG. 16 is a flowchart showing the process.

In step S40 of FIG. 16 a basic profile is designated, and in step S41 a color patch at an intermediate point on a tone reproduction curve is measured. Then, in step S42, a TRC or a γ coefficient value is calculated. Then, in step S43 the TRC part or γ coefficient value part of the profile is updated and the process is terminated.

If the luminance of the measurement value of white (255, 255, 255) and the luminance of gray (128, 128, 128) are assumed to be 100 cd/m$^2$ and 28.7 cd/m$^2$, respectively, the luminance ratio of gray to white is 0.287. Since the RGB values of white and gray are (255, 255, 255) and (128, 128, 128), the RGB value ratio of gray to white is 0.502. If the ratios are assigned to the equation (Output)=(Input)$^{\gamma}$, 0.287=0.502$^{\gamma}$, and γ=1.8 can be obtained. By generating a TRC based on γ=1.8 and storing γ=1.8 in the profile, a profile with high accuracy can be generated with a small number of measurements. Although only one intermediate point is sufficient, by increasing the number of intermediate points, for example, to up to two or three points, and by measuring the points, a more accurate TRC or $\gamma 0$ coefficient value can be calculated. Similarly, as to color temperature, only one color, white, is measured, and R, G, B and W values to be stored in a profile can be calculated based on the measurement value. If the calculated result is stored in a profile, measuring only one color can generate a profile with accurate color temperature.

An LUT profile stores outputs against inputs in a form of an LUT (look-uptable). Since R, G and B values are 8 bits, a profile with the highest accuracy can be generated if 256×256×256 LUTs, each of which is called a 256-grid LUT, are stored. However, a 256-grid LUT must store 16,000,000 pieces of data, which is not practical (problem 10). In reality, a small number of grids, such as 8 grids or 10 grids are stored, and parts without data are interpolated by neighboring information (grid points). As in the case of a TRC, by generating a plurality of LUTs with different numbers of grids based on measurement data, calculating the accuracy of each LUT and generating a profile using an LUT with the highest accuracy, a profile with high accuracy can be generated. As in the case of a matrix profile, in an LUT profile, when the number of grids exceeds a specific value, accuracy cannot be improved any more. However, a profile size increases in proportion to the cube of the number of grids. By determining the number of an LUT, taking into consideration both a profile size and LUT accuracy, a more efficient LUT profile can be generated.

The relationship between the number of LUTs and accuracy depends on the models (types) of a display. For example, in the case of a CRT, high accuracy can also be obtained despite a small number of grids. Alternatively, the number of grids can be selected depending on display types.

Since a matrix profile stores color tone data, it is sufficient if the maximum of 769 colors (a highly accurate profile of 256 color tones for each of R, G and B and one color of white (255, 255, 255)) are measured. However, in the case of an LUT profile, the maximum of 16,770,000 colors or more (256×256×256 colors) must be measured (problem 11). Even in the case of a 10-grid LUT, 1,000 colors must be measured. To generate a profile with high accuracy in the case of a large number of grids, an enormous number of measurements must be conducted. In the case of a display, if the measurement value of grid data is calculated by color additive mixture, an LUT profile with a large number of grids can be generated by a small number of measurements. For example, even if an LUT profile with 9 grids is generated, the number of measurements can be reduced from 729 ($9^3$) colors to 28 (3×9+1) colors. However, some displays have both low color additive mixture accuracy and a big error between a color additive-mixture calculation value and a measurement value due to the influence of a shining black display, or the like. In such a display, if a measurement value is calculated by color additive-mixture, profile accuracy degrades. In such a case, color additive-mixture accuracy can be confirmed in advance. In the case of a display with high color additive-mixture accuracy a color tone value can be measured and grid data can be generated by color additive-mixture. In the case of a display with low color additive-mixture accuracy, grid data can be measured.

Figure 17:
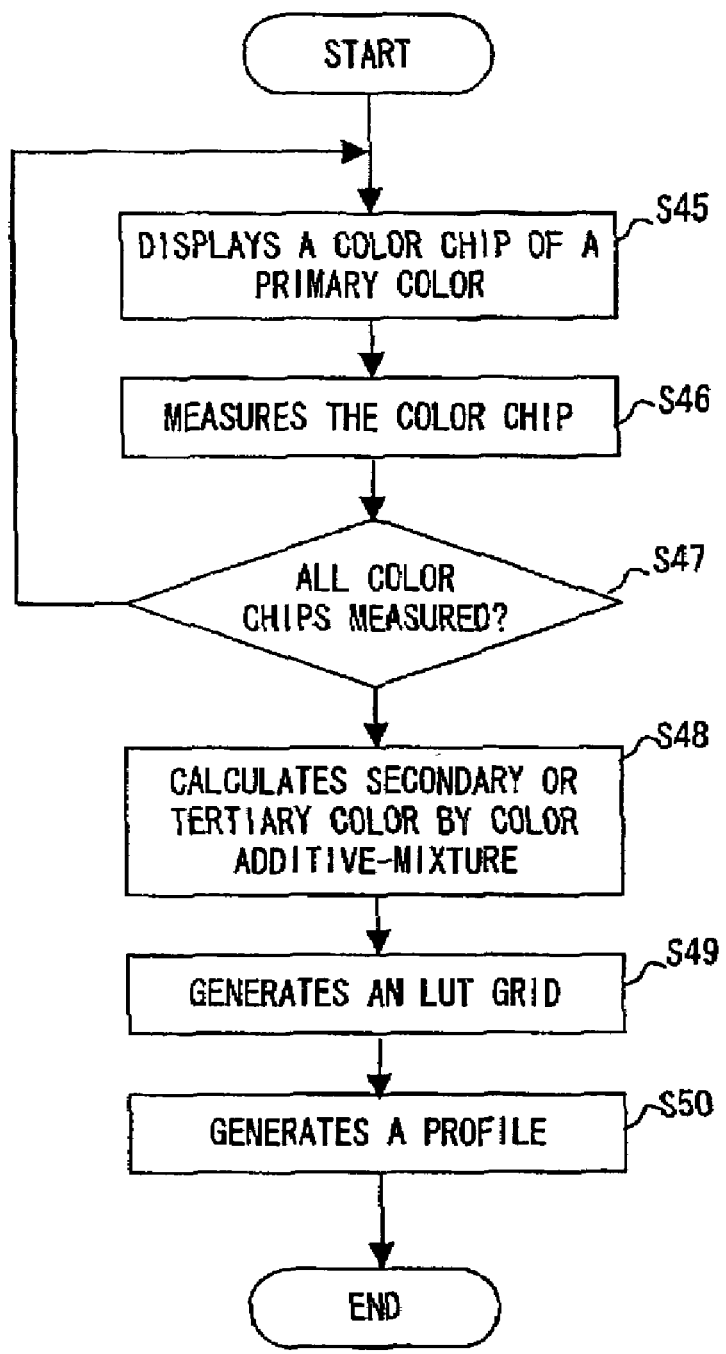
FIG. 17 is a flowchart showing the process of generating an LUT profile using a color additive-mixture characteristic.

FIG. 17 is a flowchart showing the process of generating an LUT profile utilizing a color additive-mixture characteristic.

First, in step S45, a color patch in a primary color is displayed. Then, in step S46 the color patch is measured, and in step S47 it is judged whether all color patchs are measured. If all color patchs are not measured yet, the flow returns to step S45 and a subsequent color patch is measured. If in step S47 it is judged that all color patchs are measured, in step S48 secondary and tertiary colors are calculated by color additive-mixture. Then, in step S47 an LUT grid is generated. Then, in step S50 a profile is generated and the process is terminated.

By switching data to be measured depending on color additive-mixture accuracy, only in the case of a display with high color additive-mixture accuracy, an accurate profile can be generated with a small number of measurements. In the case of a display with low color additive-mixture accuracy, there is no degradation of profile accuracy since grid data are measured. Alternatively, grid data can be generated using both color tone data and grid data instead of only by the color additive-mixture of color tone data. For example, if the measurement data of 17-grids is generated using color tone data of 17 color tones, more accurate grid data can be generated by correcting a color additive-mixture value using the result of the measurement data of 5 grids. Even in this case, if grid data are generated from a measurement value, the measurement of only 175 colors (50 colors in 17 color tones+125 colors on 5 grids) is sufficient, although the measurement of 4,913 colors is recommended.

There are a matrix profile and an LUT profile in a display profile. In some displays, a matrix profile has higher accuracy than an LUT profile, while in other displays, an LUT profile has higher accuracy than a matrix profile (problem 12). Therefore, by generating both an LUT profile and a matrix profile when generating a profile, calculating the accuracy of each profile and selecting only the more accurate profile, a user can always obtain the more accurate profile without selecting a profile type.

If the color additive-mixture accuracy of a display is high, the accuracy of a matrix profile is higher than that of an LUT profile and also the file size of a matrix profile is smaller than that of an LUT profile. Since the color additive-mixture accuracy of a current display, in particular, a CRT, is high, the accuracy of a matrix profile is higher than that of an LUT profile. The number of measurements required to generate an LUT profile is greater than that of a matrix profile. Therefore, alternatively, first, a matrix profile can be generated and the accuracy can be judged. If the accuracy is equal to or less than a pre-determined accuracy, it can be judged that the display has low color additive-mixture accuracy, an LUT profile can be generated, the accuracy of the LUT profile can be compared with that of the matrix profile again and a profile with higher accuracy can be selected. The accuracy of each profile varies depending on the types (or models) of a display. Therefore, alternatively, a profile type to be generated can be set in advance for each type of a display and a profile type can be selected according to the type of a display.

If a user generates a profile, the user cannot verify the accuracy of the profile on the spot (problem 13). However, by measuring a display, the user can verify the accuracy of a display profile. By comparing a measurement result obtained by measuring a color patch for accuracy verification with an output value obtained by passing the color patch for verification through a profile as an input value, accuracy can be confirmed.

By using a real image, the accuracy of a profile can be more directly confirmed. By using a profile, a CMS can convert an input value (for example, RGB values) into a common color signal (for example, CIELAB values) or can inversely convert a common color signal into RGB values.

In this case, an image is converted into a common color signal using a generated profile and is inversely converted using the same profile. In this case, since color is converted using the same profile, an input image must be the same as an output image. In reality, their values are different due to an operation error or a rounding error. Therefore, both the input and output images are displayed on a display (or printed on a piece of paper) and are compared. If the accuracy of a profile is low, the color of the output image is different from that of the input image. If a difference between the input and output images cannot be recognized, it can be judged that the accuracy of the profile is high. By combining such a verification of a profile with a profile generation, the possibility of using a profile with low accuracy can be reduced. By confirming the accuracy of a profile generated by conducting measurement for evaluation after generating a profile or confirming the difference between input and output images by converting the images using a profile generated after generating the profile, the accuracy of the profile can be verified.

Figure 18:
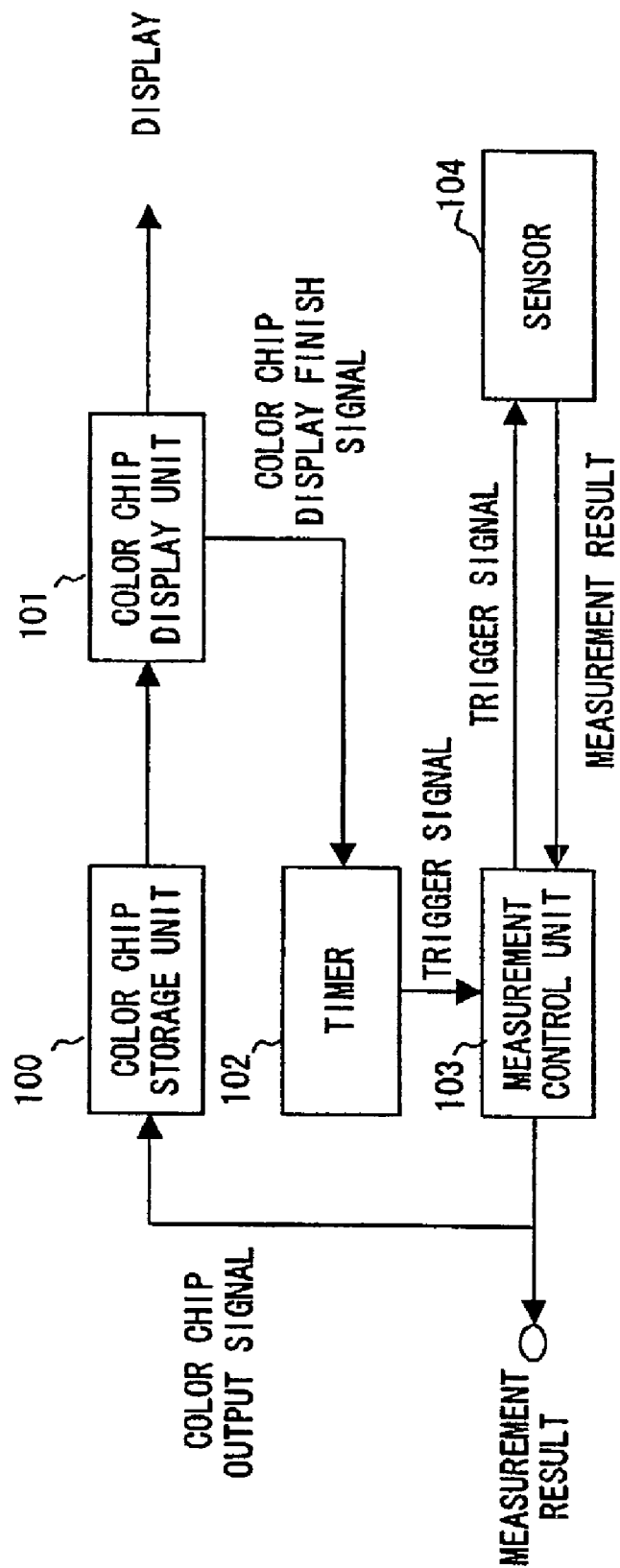
FIG. 18 shows the configuration of the first preferred embodiment of the display-measuring device of the present invention.

FIG. 18 shows the configuration of the first preferred embodiment of the display-measuring device of the present invention.

A color patch storage unit 100 stores a color patch required to measure the characteristic of a display. A color patch display unit 101 (for example, a frame buffer) receives color patch data and plots/displays a color patch on a display. After displaying the color patch, the color display unit 101 transmits a color patch display signal to a timer 102. The timer 102 counts for a specific time after receiving the color patch display signal and transmit a trigger signal to a measurement control unit 103 after the specific period. Upon receipt of the trigger signal, the measurement control unit 103 measures the color patch on the display using a sensor 104. After the measurement is finished, a measurement value is outputted and the measurement control unit 103 outputs color patch signals to the color patch storage unit 100. Upon receipt of the color patch output signals, the color patch storage unit 100 outputs a subsequent color patch to the color patch display unit 101. A time counted by the timer 102 can be set by a user or can be obtained by referring to a file that stores a count time for each model or type of a display. Alternatively, a different count time can be set for each color patch.

Figure 19:
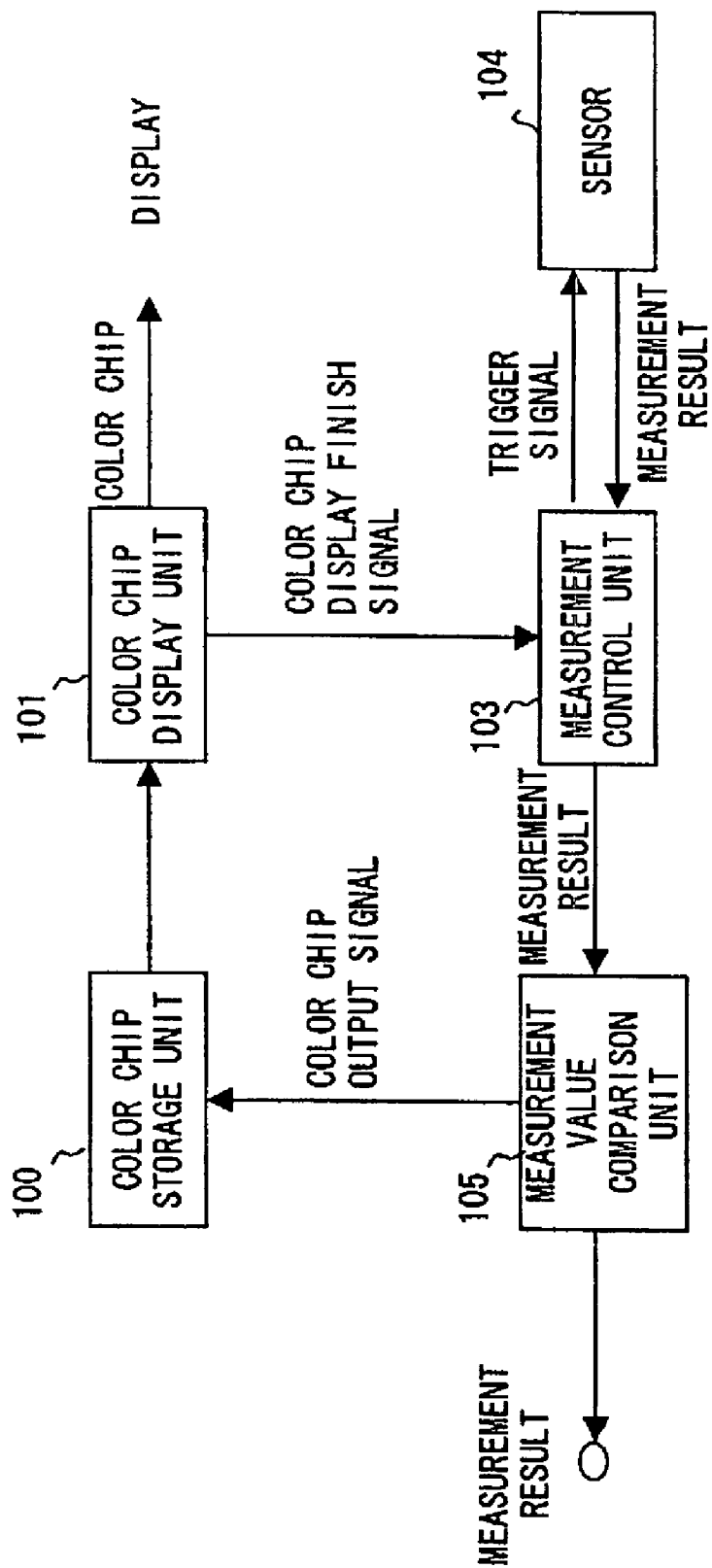
FIG. 19 shows the configuration of the second preferred embodiment of the display-measuring device of the present invention.

FIG. 19 shows the configuration of the second preferred embodiment of the display-measuring device of the present invention.

The color patch storage unit 100 stores a color patch required to measure the characteristic of a display. The color patch display unit 101 receives color patch data and plots/displays the color patch on a display. After finishing the color patch display, the color patch display unit 101 transmits a trigger signal to the measurement control unit 103. Upon receipt of the trigger signal, the measurement control unit 103 measures the color patch on the display using the sensor 104. The measurement result is transmitted to a measurement value comparison unit 105 and is compared with a measurement result of the same color patch. As a result of the comparison, if the difference is big, the measurement value comparison unit 105 transmits a trigger signal to the measurement control unit 103. Upon receipt of the trigger signal from the measurement comparison unit 105, the measurement control unit 103 performs measurement again and transmits the measurement value to the measurement value comparison unit 105. Alternatively, when the difference in a measurement value is judged to be small, the measurement value comparison unit 105 can output the latest measurement result. In this case, when transmitting color patch output signals to the measurement control unit 103, a timer can be added. By measuring again after a specific time elapses, the number of measurements can be reduced.

Figure 20:
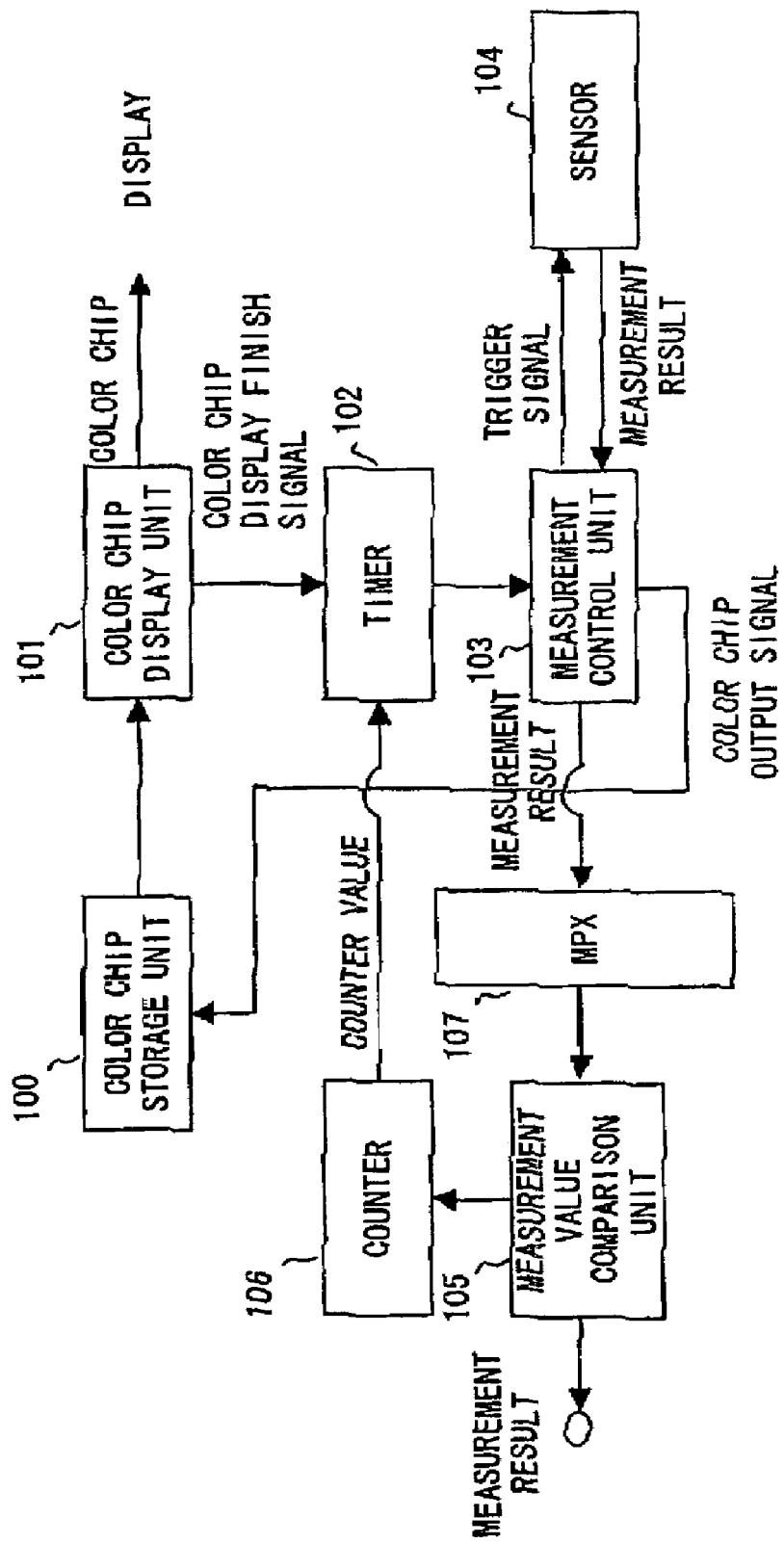
FIG. 20 shows the configuration of the third preferred embodiment of the display-measuring device of the present invention.

FIG. 20 shows the configuration of the third preferred embodiment of the display-measuring device of the present invention.

After finishing a color patch display, the color patch display unit 101 transmits a color patch display signal to the timer 102. The timer 102 initially stores an arbitrary value (for example, "0"). Upon receipt of the color patch display signal, the timer 102 counts up to a set value and transmits a trigger signal to the measurement control unit 103 after a specific time elapses. Upon receipt of the trigger signal, the measurement control unit 103 measures a color patch on a display using the sensor 104. First, an MPX 107 (for example, a buffer or selector) transmits the measurement result to the measurement value comparison unit 105. The measurement value comparison unit 105 compares measurement results. As a result of the comparison, if the difference is big, the measurement value comparison unit 105 transmits a trigger signal to the measurement control unit 103. Upon receipt of the first measurement result of the color patch, the measurement value comparison unit 105 transmits a counter start signal to a counter 106 instead of performing a comparison. Upon receipt of the count start signal, the counter 106 starts counting. When judging that the difference in a measurement value is small, the measurement value comparison unit 105 outputs the latest measurement result, transmits a color patch output signal to the color patch storage unit 100 and further transmits a counter end signal to the counter 106. Upon receipt of the count end signal, the counter 106 stops counting and transmits the counting result to the timer 102. Simultaneously, the counter 106 transmits a switching signal to the MPX 107. The timer 102 sets a transmitted timer value. Upon receipt of the switching signal, the MPX 107 outputs the measurement value to a terminal without performing any process.

Figure 21:
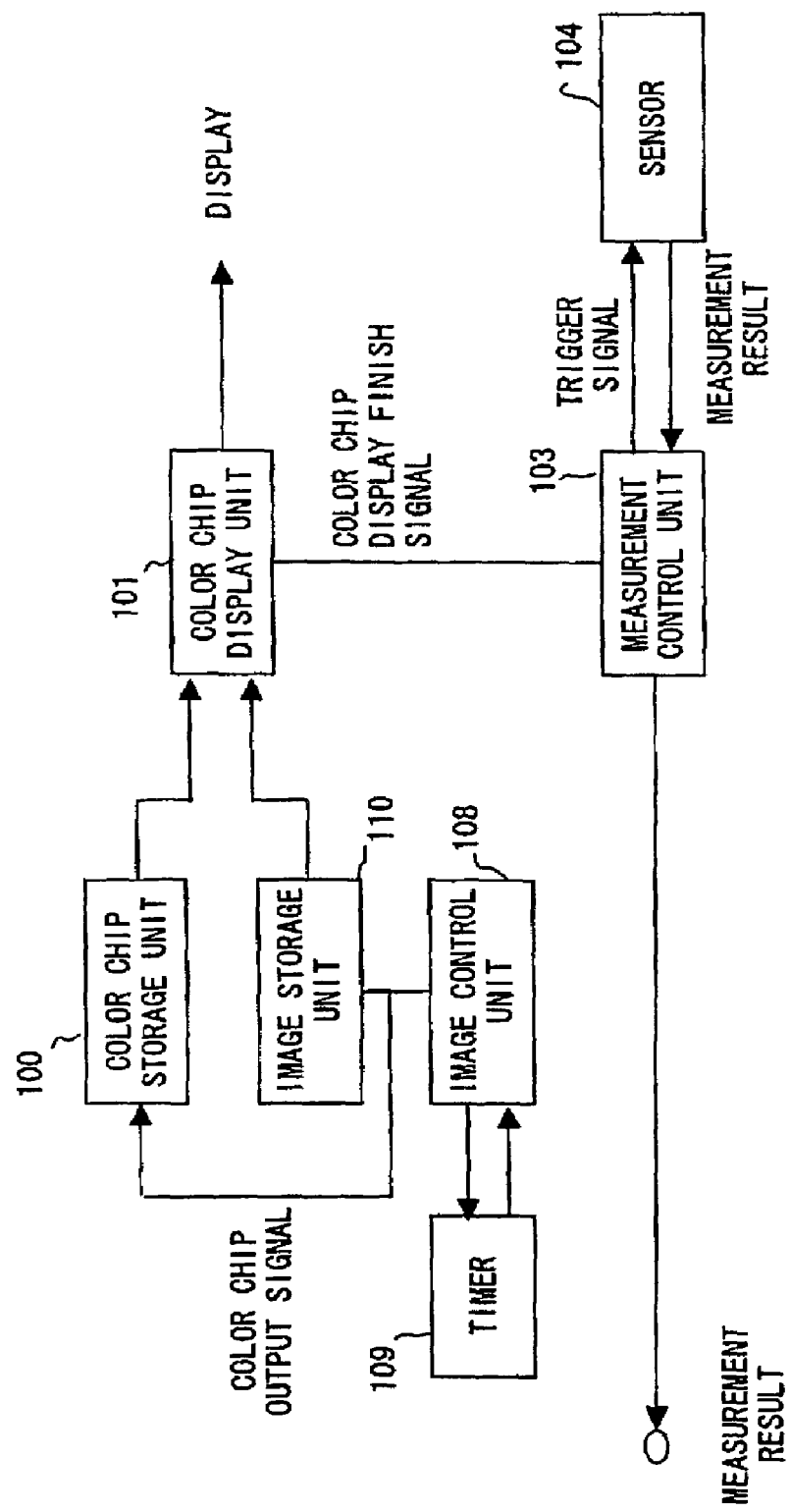
FIG. 21 shows the configuration of the fourth preferred embodiment of the display-measuring device of the present invention.

FIG. 21 shows the configuration of the fourth preferred embodiment of the display-measuring device of the present invention.

The color patch storage unit 100 stores a color patch required to measure the characteristic of a display. The color patch display unit 101 receives the color data and plots/displays the color patch. After finishing the color patch display, the color patch display unit 101 transmits a trigger signal to the measurement control unit 103. Upon receipt of the trigger signal, the measurement control unit 103 measures the color patch on a display using the sensor 104. The measurement result is outputted from a terminal. The measurement control unit 103 also transmits an image-switching signal to an image control unit 108. The image control unit 108 transmits the signal to an image storage unit 110 and also transmits a count start signal to a timer 109. The image storage unit 110 transmits a stored image (for example, an image composed of black only) to the color patch display unit 101. The color patch display unit 101 plots the image and transmits the image to a display. In this case, the color patch display unit 101 does not transmit a trigger signal to the measurement control unit 103. Upon receipt of the count start signal, the timer 109 starts counting. After a specific pre-determined time elapses, the timer 109 transmits an elapse signal to the image control unit 108. Upon receipt of the elapse signal, the image control unit 108 transmits an image-switching signal to the color patch storage unit 100 and displays a subsequent image. A user can set a time to be counted by the counter 109 or the time can be obtained by referring to a file that stores a count time for each model or type of display. Alternatively, a different time can also be set for each color patch.

Figure 22:
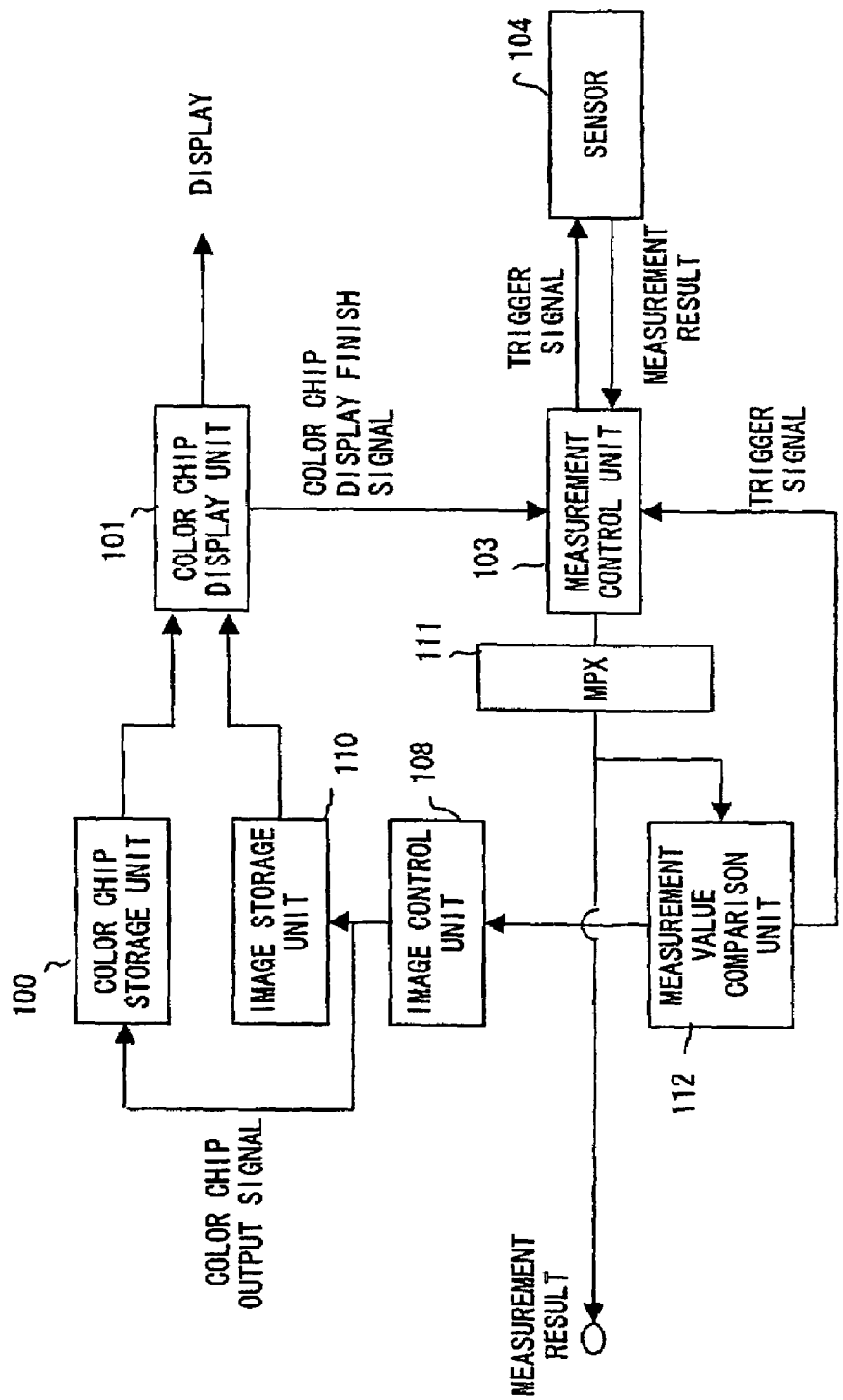
FIG. 22 shows the configuration of the fifth preferred embodiment of the display-measuring device of the present invention.

Alternatively, instead of using a timer, images can be consecutively measured and the existence/non-existence of an after-image can also be detected FIG. 22 shows the configuration of the fifth preferred embodiment of the display-measuring device of the present invention.

The color patch storage unit 100 stores a color patch required to measure the characteristic of a display. The color patch display unit 101 receives the color patch data and plots/displays the color patch on a display. After finishing the color patch display, the color patch display unit 101 transmits a trigger signal to the measurement control unit 103. Upon receipt of the trigger signal, the measurement control unit 103 measures the color patch on the display using the sensor 104. The MPX 111 (for example, a selector or the like) outputs the measurement result to a terminal. The measurement control unit 103 also transmits an image-switching signal to the image control unit 108 and also transmits the switching signal to an MPX 111. The image control unit 108 transmits the signal to the image storage unit 110. The image storage unit 110 transmits stored image (for example, an image composed of only black) to the color patch display unit 101. The color patch display unit 101 plots the image and transmits the image to a display. In this case, the color patch display unit 101 transmits a trigger signal to the measurement control unit 103 again. The MPX 111 transmits the measurement result to a measurement value comparison unit 112. The measurement value comparison unit 112 compares the measurement result of the image with the previous measurement result. If the difference in a measurement value is big, the measurement value comparison unit transmits a trigger signal to the measurement control unit 103. Upon receipt of the trigger signal, the measurement control unit 103 performs measurement again and transmits the measurement value to the measurement value comparison unit 112. Upon receipt of the image-switching signal, the image control unit 108 transmits the image-switching signal to the color patch storage unit 100 and displays a subsequent color patch.

Alternatively, before measurement, an image (for example, an image composed of only black) can be measured, which is not shown, and the result can be stored/used by the measurement value comparison unit 112. In this case, when the measurement value of a currently measured image becomes close to that of a stored measurement result, the image control unit 108 transmits an image-switching signal and displays a subsequent color patch.

FIG. 23 shows the configuration of the sixth preferred embodiment of the display-measuring device of the present invention.

According to the present invention, a counter 113 counts a time required to judge whether there is an after-image and the time is set as an interval. After that, there is no measurement of an image, and when the count result of the counter 113 reaches the interval, a subsequent color patch is displayed.

An example of a method for modeling displays based on the measurement results of displays and setting each parameter of a model is described below.

The following three display models are assumed.

$$(\text{Output})=(\text{Input})^\gamma \quad \text{Model 1}$$

$$(\text{Output})=a(\text{Input})^\gamma \quad \text{Model 2}$$

$$(\text{Output})=a(\text{Input})^\gamma+b \quad \text{Model 3}$$

The equations include three variables (a, b, and γ). Therefore, if there are at least two measurement values, each parameter can be solved using simultaneous equations. For example, it is assumed that measurement results are as follows.

TABLE 1

Examples of measurement results and differences in measurement values for each model

| No | INPUT | OUTPUT | MODEL 1 | MODEL 2 | MODEL 3 |
|---|---|---|---|---|---|
| 1 | 0 | 0.17 | 0 | 0 | 0.17 |
| 2 | 0.2 | 0.19 | 0.07373 | 0.11107 | 0.19406 |
| 3 | 0.4 | 0.278 | 0.22664 | 0.27348 | 0.28056 |
| 4 | 0.6 | 0.438 | 0.43712 | 0.46328 | 0.43978 |
| 5 | 0.8 | 0.677 | 0.69664 | 0.67338 | 0.67801 |
| 6 | 1 | 1 | 1 | 0.9 | 1 |
| Average output errors | | | 0.05969 | 0.06373 | 0.00157 |

If the parameter of model 1 is calculated based on result No.4, γ=1.62 is obtained. If the parameters of model 2 are calculated based on results Nos. 3 and 5, a=0.9 and γ=1.3 are obtained. If the parameters of model 3 are calculated based on results Nos. 1, 4 and 6, a=0.83, b=0.17 and γ=2.2 are obtained. If the outputs of the respective models are calculated using each parameter value, the table at the right is obtained. The error of model 3 is the smallest. Therefore, the model of this display can be most closely approximated by the following equation.

$$(\text{Output})=a(\text{Input})^\gamma+b (a=0.8, b=0.17 \text{ and } \gamma=2.2)$$

Each of these parameter values is stored in a profile. In an ICC profile, only display model (1) is assumed. Setting such a plurality of models and storing the parameters of a model with the smallest error in a profile can implement more accurate color matching in a CMS corresponding to such a plurality of models.

FIG. 24 shows the configuration of the seventh preferred embodiment of the display-measuring device of the present invention.

A color patch value storage unit 114 stores the RGB values of a color patch. A color patch generation unit 115 generates a color patch based on both the size of the color patch stored in a size storage unit 116 and the RGB values stored in the color patch value storage unit 114. In this case, first, an image of white (255, 255, 255) is generated and is displayed on a display. The color patch generation unit 115 transmits a measurement start (trigger) signal to a measurement control unit 118. The measurement control unit 118 performs control of a sensor 119 according to the trigger signal and reads the measurement value of the image displayed on the display. Then, the measurement control unit 118 transmits a size modification signal to the size storage unit 116. The size storage unit 116 transmits a size modification signal to a size modification unit 117, stores a color patch of a size smaller than the relevant color patch and transmits the color patch to the color patch display unit 101. The color patch display unit 101 displays a color patch of a size smaller than the relevant color patch and the measurement control unit 103 measures the value. Then, both the measurement values are compared. If the latter is lighter than the former, it can be judged that power control has been exercised. In this case, the process described above is repeated reducing the size gradually until both the measurement values become the same (stay in the allowable error range). When both the measurement results become the same, the measurement control unit 103 transmits a size-fixture signal to the size storage unit 116. The size storage unit 116 stores the size obtained when both the measurement results become the same or at the size immediately preceding the relevant size, and uses the relevant size for subsequent color patchs.

The detecting method of a measurement error by color additive-mixture is described below. Since color additive-mixture can be applied, the measurement value of a specific color C (r, g, b) equals the sum of red R (r, 0, 0), green G (0, g, 0) and blue B (0, 0, b) Although there is a small error due to a measurement error, backward radiation or the like, the error remains acceptable. Table 2 shows the measurement results of a CRT (FMV-DP978) manufactured by Fujitsu.

TABLE 2

CRT color additive-mixture performance

| RGB value | | | Measurement value | | | Color additive-mixture value | | | |
|---|---|---|---|---|---|---|---|---|---|
| R | G | B | X | Y | Z | X | Y | Z | Error |
| 128 | 0 | 0 | 14.33 | 8.096 | 1.874 | — | — | — | — |
| 0 | 128 | 0 | 13.95 | 25.38 | 4.657 | — | — | — | — |
| 0 | 0 | 128 | 10.16 | 5.629 | 45.65 | — | — | — | — |
| 128 | 128 | 0 | 26.65 | 32.32 | 5.172 | 28.29 | 33.48 | 6.531 | 2.417516 |
| 128 | 0 | 128 | 22.86 | 12.43 | 47.37 | 24.49 | 13.73 | 47.53 | 2.08948 |
| 0 | 128 | 128 | 22.32 | 29.67 | 49.78 | 24.11 | 31.01 | 50.31 | 2.295934 |
| 128 | 128 | 128 | 35.16 | 36.66 | 50.62 | 38.44 | 39.11 | 52.18 | 4.378499 |

The errors are calculated according to sqrt $\{(X1 - X2)^2 + (Y1 - Y2)^2 + (Z1 - Z2)^2\}$ In this table, for example, the color additive-mixture value of (R, G, B)=(128, 128, 0) is the sum of the measurement value of (R, G, B)=(128, 0, 0) and the measurement value of (R, G, B)=(0, 128, 0). As seen from this table, the errors in measurement values (CIEXYZ values) all are 5 or less, and differences between X, Y and Z values all are 3 or less. By calculating an error between the sum of a measured secondary color (color in which two or more of R, G and B color elements are lit) or a measured tertiary color (color in which all of R, G and B color elements are lit) and a primary color (one of R, G and B color elements is lit), and a measurement value and by judging whether the error is equal to or less than a threshold value, the existence/non-existence of a measurement error can be detected.

A method for detecting a measurement error based on both the increase/decrease of the RGB values and XYZ values of a color patch is described below. Table 3 shows the measurement results of a CRT (FMV-DP978) manufactured by Fujitsu.

TABLE 3

Correlation between a measurement value and a color patch value

| RGB Value | | | Measurement Value | | |
|---|---|---|---|---|---|
| R | G | B | X | Y | Z |
| 0 | 0 | 0 | 1.8858 | 1.4568 | 1.3481 |
| 0 | 0 | 64 | 3.6178 | 2.3585 | 11.2312 |
| 0 | 0 | 128 | 10.1569 | 5.6292 | 45.6539 |
| 0 | 0 | 191 | 20.5493 | 10.8486 | 101.304 |
| 0 | 0 | 255 | 38.4387 | 19.719 | 196.851 |

This table shows measurement values obtained when blue increases. As blue increases, all of the X, Y and Z values increase. As to an increase amount, the increase amount of the Z value is the greatest. Similarly, as red or green increases, all of the X, Y and Z values increase, and in the case of red or green the increase amount of X and that of Y, respectively, are the greatest. Thus, by comparing a color patch value with a measurement value, for example, if the measurement value decreases although the RGB value of a color patch increases or if the X value increases although blue increases, it can be judged that there is a measurement error. In this case, by comparing measurement values immediately before and after, a measurement error can be detected.

With regard to color additive-mixture, the CIEXYZ values of white should be larger than those of any other color. Therefore, by first measuring white, storing the CIEXYZ values and comparing a subsequent measurement value with the CIEXYZ values, a measurement error can be detected. If extraneous light penetrates a measurement instrument due to some cause, sometimes a measurement value becomes larger than that of white. Such an error can be easily detected. In this case, not all of the X, Y and Z values, but one of the values, for example, only the Y value (luminance value), can also be compared.

Figure 25:
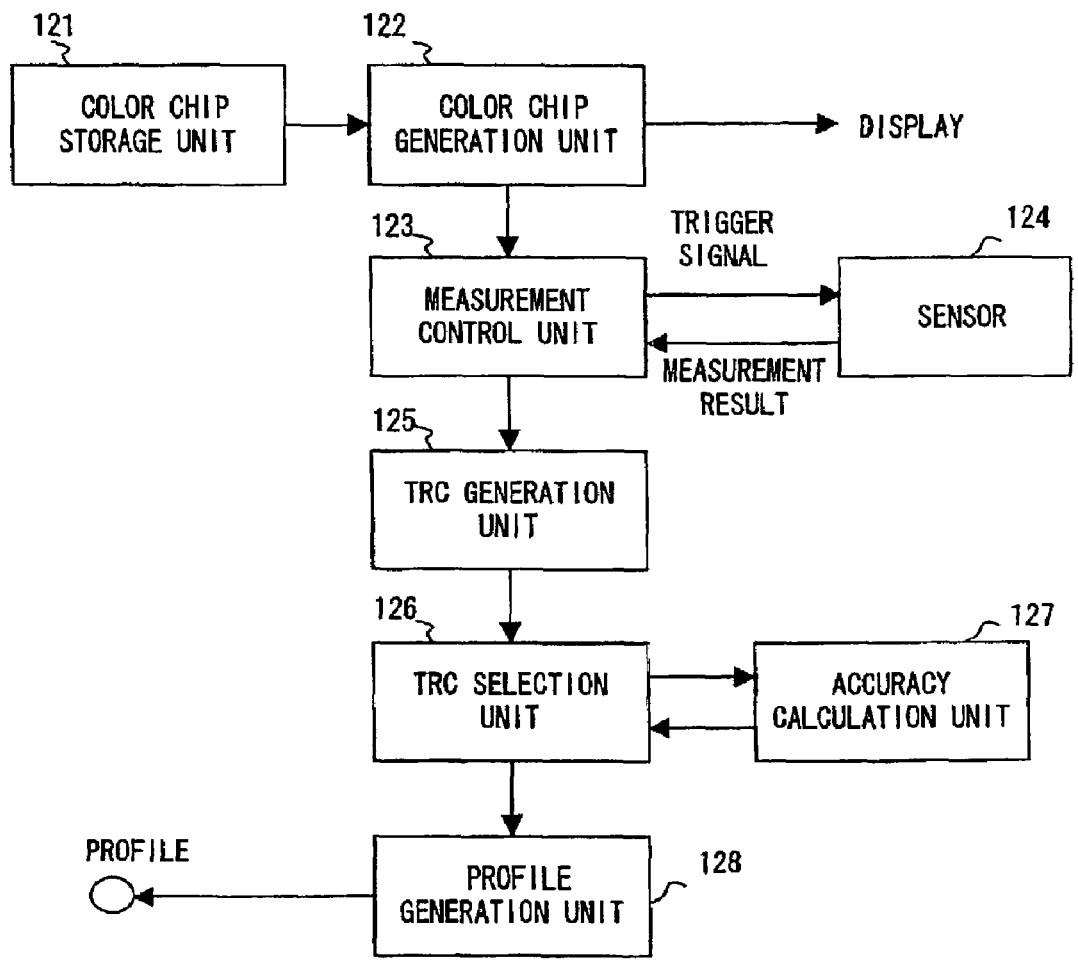
FIG. 25 shows the configuration of the eighth preferred embodiment of the display-measuring device of the present invention.

FIG. 25 shows the configuration of the eighth preferred embodiment of the display-measuring device of the present invention.

Figure 2:
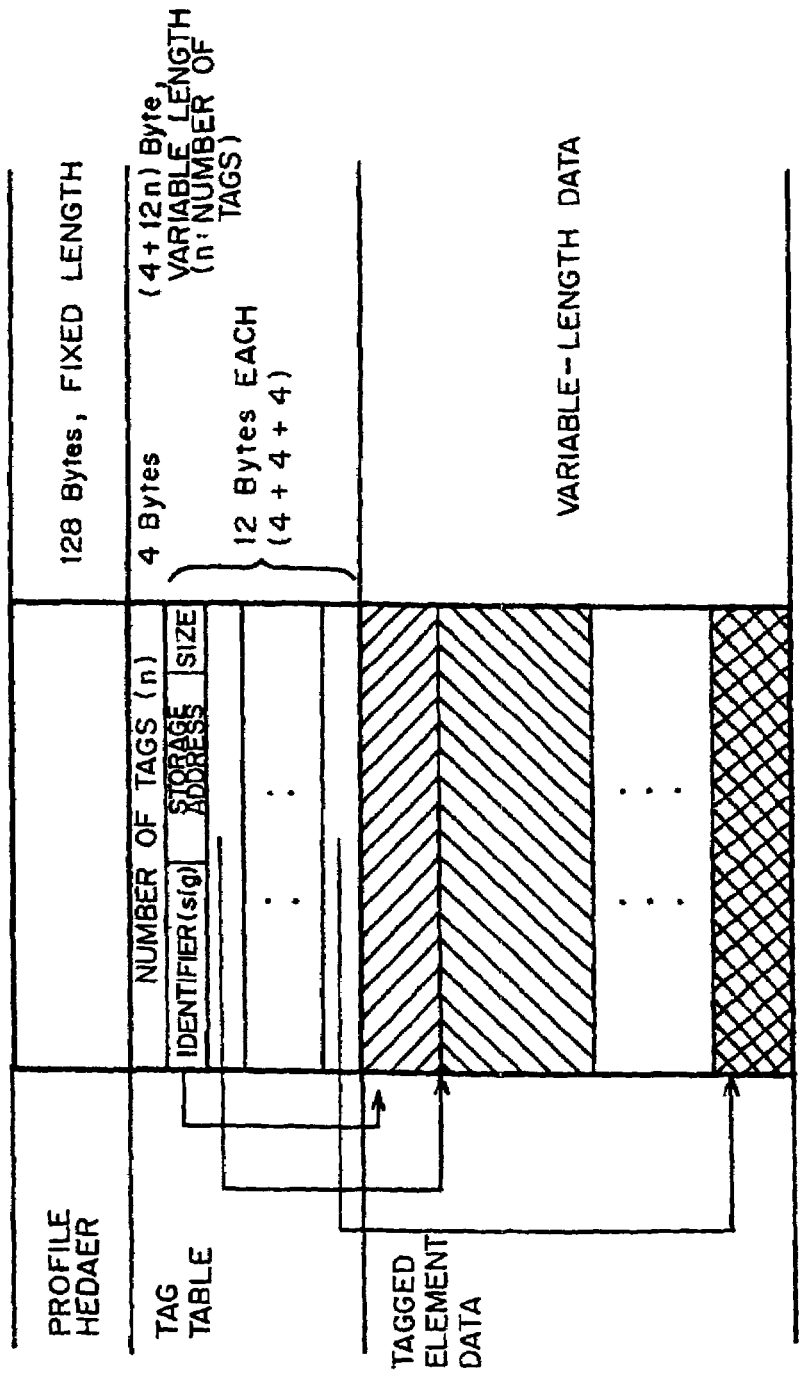
FIG. 2 shows the structure of an ICC profile.
Figure 3:
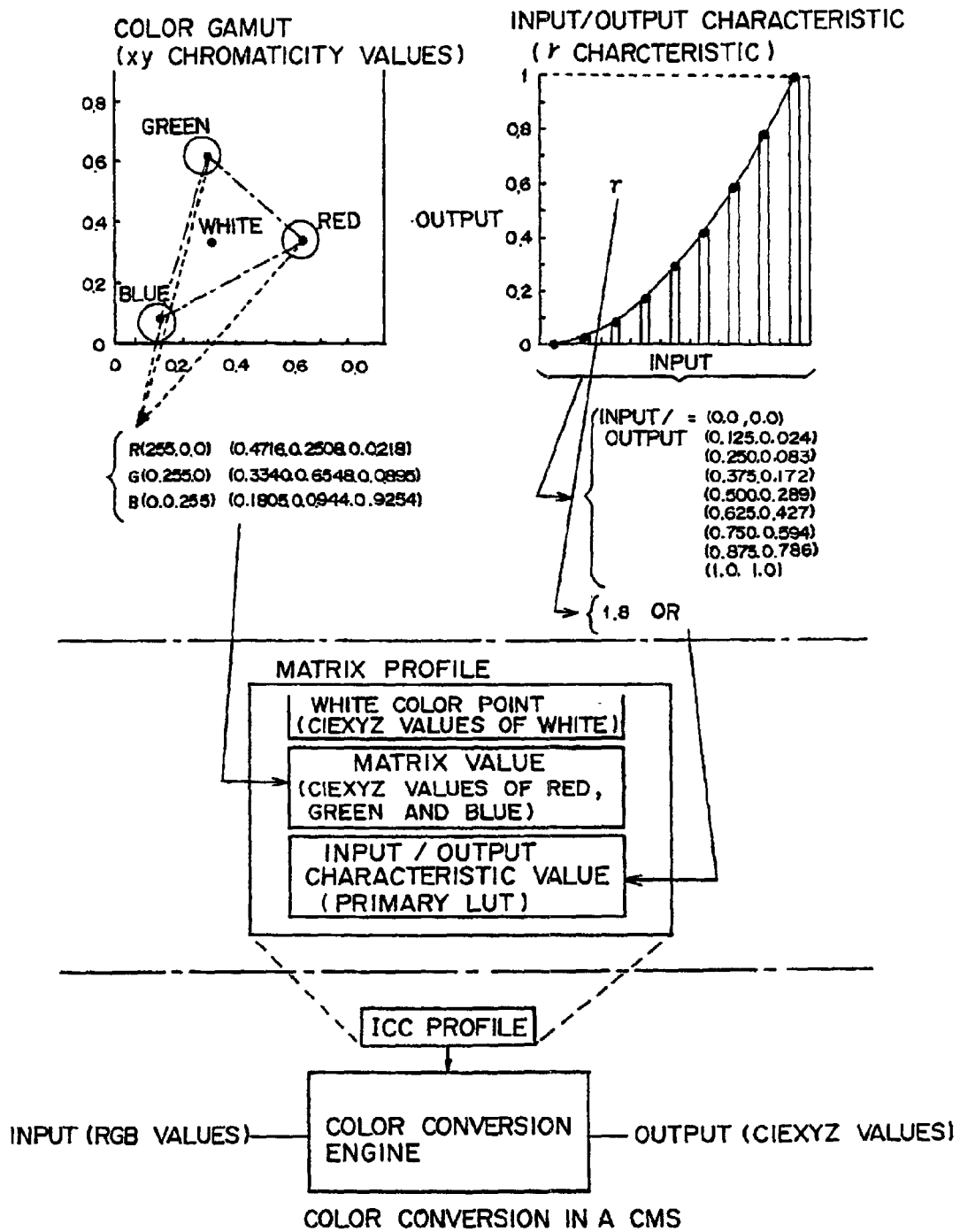
FIG. 3 shows information stored in a matrix profile.
Figure 4:
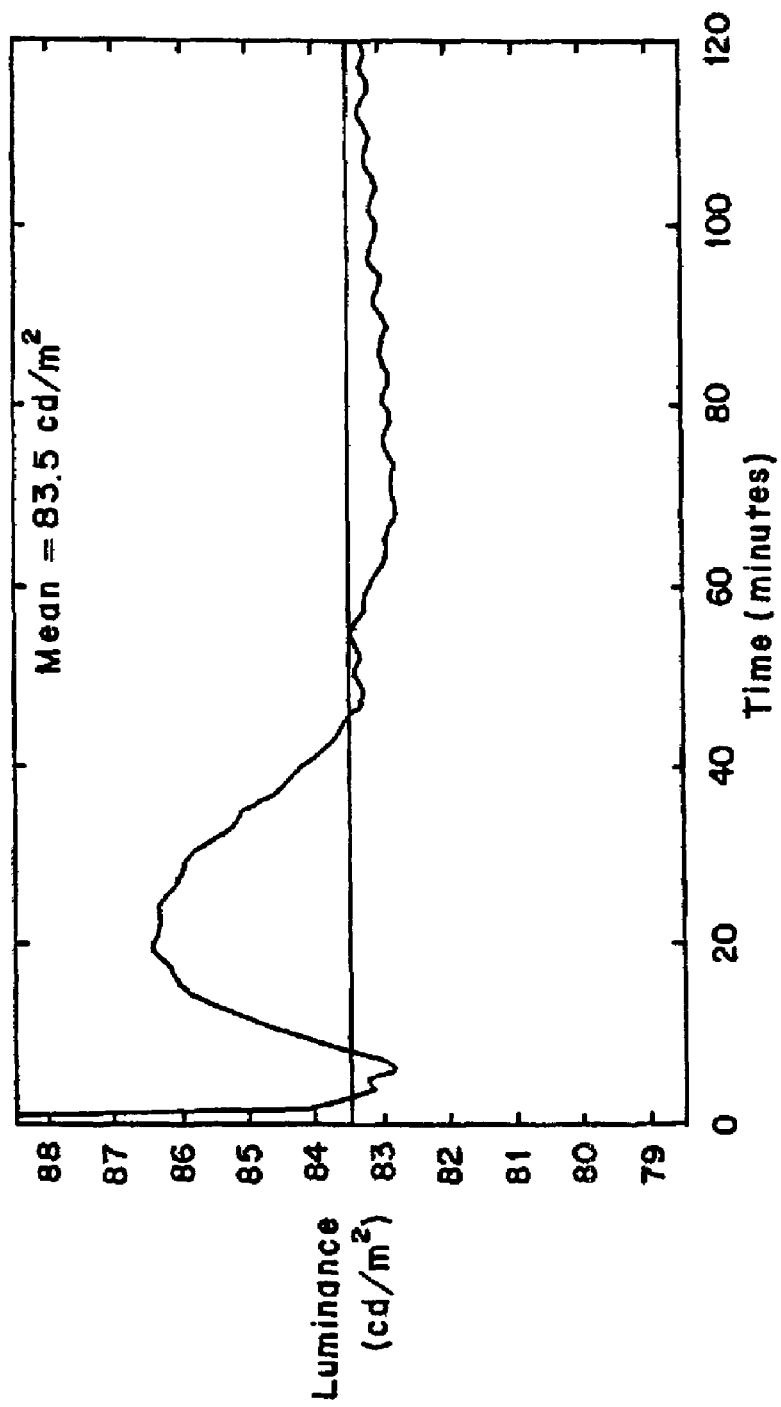
Figure 5:
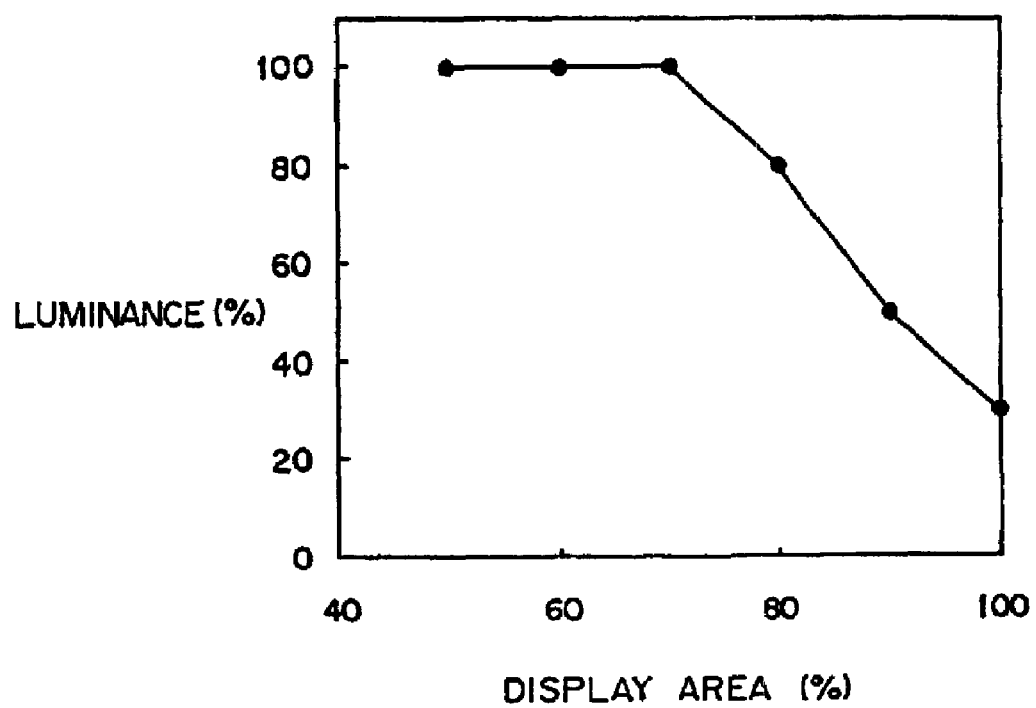
FIG. 5 is a graph showing one relationship between a display area and luminance.

A color storage unit 121 stores a color patch or the RGB values of a color patch required to generate a TRC. The color patch display unit 101 plots the color patch and displays the color patch on a display. The unit 101 also transmits a measurement start (trigger) signal to a measurement control unit 123. The measurement control unit 123 performs control of a sensor 124 and transmits the measurement result to a TRC generation unit 125. The TRC generation unit 125 evaluates a plurality of TRCs based on the measurement data. A TRC selection unit 126 selects one of the TRCs based on the result of an accuracy calculation unit 127. A TRC with the highest accuracy can be simply selected. Alternatively, since a file size increases with the number of nodes of a TRC, the number of nodes of the most efficient TRC can be selected taking the file size into consideration. For example, if the relationship between the number of nodes of a TRC and accuracy is as shown in FIG. 26, accuracy is suddenly improved as the number of nodes of a TRC increases when the number of nodes of a TRC is 32 (TRC=32) or less. Although, accuracy is gradually improved even if a TRC is more than 32, the degree of effect is not the same as the modification in the number of nodes of a TRC. In this case, by selecting TRC=32 as an optimal TRC, the most effective profile can be generated when compared with a file size. Since a TRC is stored for each of the R, G and B color elements, a profile size has three times the number of nodes of a TRC. If the number of tags in a matrix profile is assumed to be 7 (wtpt, rXYZ, gXYZ, bXYZ, rTRC, gTRC and bTRC), the profile size is as follows (see FIG. 2).

128 bytes (profile header)+88 bytes (tag table)+n(tag element)

A tag element stores seven tags. Of these, rXYZ, gXYZ, bXYZ and wtpt store the XYZ values of red, green blue and white, respectively. The fixed length of each size is 20 bytes and the total is 80 bytes. rTRC, gTRC and bTRC store TRCs, and the size varies depending on the number of nodes of a TRC. If the number of nodes of a TRC is assumed to be n, the size is 12+2n. Therefore, the profile size is (332+6n) bytes. Thus, a profile size can be estimated from the number of nodes of a TRC. If TRC=32, the profile size is 524 bytes, and if TRC=256, it is 1,868 bytes. However, there are tags for storing character strings, such as cprt, desc or the like, in addition to these tags. If these tags are stored, the profile size further increases.

FIG. 26 shows the relationship between the number of nodes of a TRC and the accuracy of a profile generated by a TRC.

As shown in FIG. 26, if the number of TRCs exceeds a specific value, accuracy is improved no further. A TRC generation unit 125 generates a TRC and also calculates a γ coefficient, which is not shown. An accuracy calculation unit 127 compares accuracy obtained by using a TRC and accuracy obtained by using a γ coefficient, which is not shown. If a high accuracy is obtained by using a TRC, a profile of a smaller size can be generated. If there is no big difference in performance between a TRC and a γ coefficient, by generating a profile that stores a γ coefficient, a profile of a smaller size can be generated. A γ coefficient value can be calculated from a measurement value according to the following equation described in IEC-61966-3.

$$\gamma = \frac{1}{D}\left(n\sum_{i=1}^{n} p_i q_i - \sum_{i=1}^{n} p_i \sum_{i=1}^{n} q_i\right)$$

$$p_i = \log_{10} x_i$$

$$q_i = \log_{10} y_i$$

-continued $$D = n\sum_{i=1}^{n} p_i^2 - \left(\sum_{i=1}^{n} p_i\right)^2$$

Calculation Expression of γ Coefficient

The optimal number of TRCs depends on the types of a display, which is not shown. For example, since the tone reproduction curve of a CRT is smooth, high accuracy can be expected despite a small number of measurement points. For example, if a display to be measured is a CRT and an LCD/PDP, the optimal number of nodes of a TRC can be easily determined for each type of display using TRC=16 and TRC=64, respectively. A user can designate which display should be measured: a CRT or an LCD. Alternatively, in the case of Windows 95/98, the user can refer to registry information since the registry information stores the model names of displays in use.

FIG. 27(a) shows the γ characteristic of a display.

The γ characteristics of the R, G and B color elements of this display are almost the same. In such a display, the x and y chromaticity values of the non-color are the same. If R, G and B color elements are not balanced, as shown in FIG. 27(b), the x and y chromaticity values of the non-color are different. If the curve with a small inclination (□), shown in FIG. 27(b), is assumed to be the tone reproduction curve of blue, the non-color located in the middle is bluish white. If two colors, white and gray, are measured and their chromaticity values are compared, it can be judged whether the γ characteristics of the colors of this display are the same or different. If the difference between x and y chromaticity values is equal to or more than a pre-determined threshold value, a TRC is calculated by individually measuring R, G and B color elements. If the difference is less than the threshold value, there is no big dispersion. Therefore, by measuring the color tone of one of the color elements or white and copying/storing the measurement result as the TRCs of R, G and B color elements, the number of measurements can be reduced to ⅓ what would be otherwise be required.

An ICC profile stores information in the form of a tag. Measured XYZ values are stored in the form of a ratio between the measurement values of a reference color (D50) and those of white. If it is assumed that the XYZ values of the reference color and the measurement values of white are $(X_{LS}, Y_{LS}, Z_{LS})$ and $(X_{wtpt}, X_{wtpt}, X_{wtpt})$, respectively, a storage value $(X_p, Y_p, Z_p)$ can be calculated as follows.

$$X_p = X \cdot X_{LS}/X_{wtpt}$$

$$Y_p = Y \cdot Y_{LS}/Y_{wtpt}$$

$$Z_p = Z \cdot Z_{LS}/Z_{wtpt}$$

In this case, by storing measurement values X, Y and Z, along with $X_p$, $Y_p$ and $Z_p$, this method can be applied to a CMS in which color matching is available, taking the absolute values of color into consideration. These pieces of information can also be stored in a profile as a new tag. A new tag can be obtained by applying to ICC. There are tags for storing arbitrary character strings, such as cprt or the like. Alternatively, an arbitrary character string can be stored in such a tag without obtaining a new tag. An example of the procedure for generating different profiles for R, G and B color elements from the measurement value of one color is described below.

The fact that there are different color temperatures in the same display means that their lightness ratios between R, G and B color elements composing a color are different. A chromaticity value, which is information about color, can be expressed according to the following equations, with X, Y and Z values as variables.

$$x = \frac{X}{X+Y+Z}, y = \frac{Y}{X+Y+Z} \quad (4)$$

Although the XYZ values of red, green and blue of a display vary depending on different color temperatures, chromaticity values xy do not vary since X, Y and Z are all multiplied by the same value k. For example, the relationship between the XYZ values of red $R_{D50}$ at a color temperature of D50 and the XYZ values of red $R_{9500K}$ at a color temperature of 9500K is as follows.

$$R_{D50}(X, Y, Z) = (X_{RD50}, Y_{RD50}, Z_{RD50})$$

$$R_{9500K}(X, Y, Z) = (X_{R9500K}, Y_{RD9500K}, Z_{RD9500K})$$

$$= (k \cdot X_{RD50}, k \cdot Y_{RD50}, k \cdot Z_{RD50})$$

In the above equation, k is a proportional constant.

The same description applies to G and B color elements. In white W, chromaticity varies. Since the component ratio among R, G and B color elements varies, the relationship between the XYZ values of white WD50 at a color temperature of D50 and the XYZ values of white W9500K at a color temperature of 9500K is as follows.

$$W_{D50} = (X_{WD50}, Y_{WD50}, Z_{WD50}) \quad (5)$$

$$W_{9500K}(X_{W9500K}, Y_{W9500K}, Z_{W9500K})$$

$$= (k_R X_{RD50} + k_G X_{GR50} + k_B X_{BR50}, k_R Y_{RD50} + k_G Y_{GD50} +$$

$$k_B Y_{BD50}, k_R Z_{RD50} + k_G Z_{GD50} + k_B Z_{BD50})$$

In the above equations, $k_R$, $k_G$, $k_B$ are the proportional constants of R, G and B color elements, respectively.

If the Y value is defined, X and Z can be calculated according to equation (4) as follows.

$$X = \frac{x}{y}Y, Z = \frac{1-x-y}{y}Y \quad (6)$$

International Illumination Committee CIE or the like define chromaticity values xy at a specific color temperature. Both xy chromaticity values at each color temperature and the XYZ values at luminance Y=1.0 cd/m² are as follows.

TABLE 4

| Color Temperature | xy chromaticity values and XYZ values at color temperatures | | | | |
|---|---|---|---|---|---|
| | xy chromaticity value | | XYZ values in case Y = 1.0 | | |
| | x | y | $X_c$ | $Y_c$ | $Z_c$ |
| 9300 K | 0.2866 | 0.3044 | 0.9415 | 1 | 1.344 |
| 7500 K | 0.3004 | 0.3103 | 0.9681 | 1 | 1.255 |
| 6500 K | 0.3135 | 0.3237 | 0.9685 | 1 | 1.121 |

TABLE 4-continued

| Color Temperature | xy chromaticity values and XYZ values at color temperatures | | | | |
|---|---|---|---|---|---|
| | xy chromaticity value | | XYZ values in case Y = 1.0 | | |
| | x | y | $X_c$ | $Y_c$ | $Z_c$ |
| 5000 K | 0.3451 | 0.3516 | 0.9815 | 1 | 0.8626 |
| A | 0.4476 | 0.4074 | 1.099 | 1 | 0.3559 |
| C | 0.3101 | 0.3163 | 0.9804 | 1 | 1.181 |
| D65 | 0.3127 | 0.329 | 0.9505 | 1 | 1.089 |
| D50 | 0.3457 | 0.3585 | 0.9643 | 1 | 0.8251 |

As described above, if color temperature varies in the same display, the following relationships hold true.

(Relationship A) Chromaticity values xy do not vary according to variation of a color temperature. Therefore, if in R, chromaticity values xy are $R_1$ (X, Y, Z) at a color temperature, the values are $R_2$ ($k_R X$, $k_R Y$, $k_R Z$) at another color temperature, if in G, chromaticity values xy are $G_1$ (X, Y, Z) at a color temperature, the values are $G_2$ ($k_G X$, $k_G Y$, $k_G Z$) at another color temperature, and if in B, chromaticity values xy are $B_1$ (X, Y, Z) at a color temperature, the values are $B_2$ ($k_B X$, $k_B Y$, $k_B Z$) at another color temperature.

(relationship B) Since the XYZ values of white W are the sum of R, G and B values(equation (5)), $$W = (k_R X_R + k_G X_G + k_B X_B, k_R Y_R + k_G Y_G + k_B Y_B, k_R Z_R + k_G Z_G + k_B Z_B) = (X_C, Y_C, Z_C)$$

($X_C$, $Y_C$ and $Z_C$ are the XYZ values shown in Table 4)

As described above, by calculating constants $k_R$, $k_G$ and $k_B$, the XYZ values of R, G and B color elements in the case where color temperature varies can be obtained. $k_R$, $k_G$ and $k_B$ can be obtained by solving the following simultaneous linear equation with three unknowns.

$$X_C = k_R X_R + k_G X_G + k_B X_B$$

$$Y_C = k_R Y_R + k_G Y_G + k_B Y_B$$

$$Z_C = k_R Z_R + k_G Z_G + k_B Z_B$$

These equations can be solved according to a matrix equation, as follows.

$$\begin{pmatrix} X_R & X_G & X_B \\ Y_R & Y_G & Y_B \\ Z_R & Z_G & Z_B \end{pmatrix} \begin{pmatrix} k_R \\ k_G \\ k_B \end{pmatrix} = \begin{pmatrix} X_C \\ Y_C \\ Z_C \end{pmatrix}$$

If an inverse matrix is multiplied to both sides, the following can be obtained.

$$\begin{pmatrix} k_R \\ k_G \\ k_B \end{pmatrix} = \begin{pmatrix} X_R & X_G & X_B \\ Y_R & Y_G & Y_B \\ Z_R & Z_G & Z_B \end{pmatrix}^{-1} \begin{pmatrix} X_C \\ Y_C \\ Z_C \end{pmatrix}$$

If the inverse matrix in the right-hand-side is developed, the following can be obtained.

$$\begin{pmatrix} k_R \\ k_G \\ k_B \end{pmatrix} = \frac{1}{|XYZ|} \begin{pmatrix} Y_G Z_B - Y_B Z_G & X_B Z_G - X_G Z_B & X_G Y_B - X_B Y_G \\ Y_B Z_R - Y_R Z_B & X_R Z_B - X_B Z_R & X_B Y_R - X_R Y_B \\ Y_R Z_G - Y_G Z_R & X_G Z_R - X_R Z_G & X_R Y_G - X_G Y_R \end{pmatrix} \begin{pmatrix} X_C \\ Y_C \\ Z_C \end{pmatrix} \quad (7)$$

where $$\frac{1}{|XYZ|} = \frac{1}{(X_R Y_G Z_B + X_B Y_R Z_G + X_G Y_B Z_R - X_B Y_G Z_R - X_G Y_R Z_B - X_R Y_B Z_G)}$$

$X_R$, $Y_R$, $Z_R$, $X_G$, $Y_G$, $Z_G$, $X_B$, $Y_B$ and $Z_B$ are the XYZ values of the original R, G and B color elements of the display, and $X_C$, $Y_C$ and $Z_C$ are the XYZ values of a color temperature from the rXYZ, gXYZ and bXYZ tags of the original profile. By obtaining them from Table 4, $k_R$, $k_G$ and $k_B$ can be calculated according to equation (7). It $k_R$, $k_G$ and $k_B$ can be obtained, the XYZ values of R, G and B color elements can be calculated according to the relationship A. An example of the color temperature profile generating procedure is as follows.

EXAMPLE

If a profile with the following tag information, rXYZ=0.3647, 0.1903, 0.0101 gXYZ=0.3566, 0.6912, 0.0605 bXYZ=0.2428, 0.1185, 0.7545 wtpt=0.9414, 1.000, 1.3433, is converted into a profile with the following chromaticity values xy of the measurement value of white, xy=(0.3156, 0.3361)

Step 1: The XYZ values of color temperature X are calculated from chromaticity xy.

If X and Z are calculated assuming Y=1.0, $X_{color.temp.X}=0.3156/0.3361=0.939$ $Y_{color.temp.X}=1.0$ $Z_{color.temp.X}=(1-0.3156-0.3361)/0.3361=1.0363$ Step 2: The XYZ values of each of the R, G and B color elements of a reference profile are calculated from tag information.

$X_R = X_{rXYZ} \cdot X_{wtpt}/X_{LS} = 0.3647 \times 0.9414/0.9642 = 0.3560$ $Y_R = Y_{rXYZ} \cdot Y_{wtpt}/Y_{LS} = 0.1903 \times 1.0/1.0 = 0.1903$ $Z_R = Z_{rXYZ} \cdot Z_{wtpt}/Z_{LS} = 0.0101 \times 1.3433/0.8251 = 0.01644$ $X_G = X_{gXYZ} \cdot X_{wtpt}/X_{LS} = 0.3566 \times 0.9414/0.9642 = 0.3482$ $Y_G = Y_{gXYZ} \cdot Y_{wtpt}/Y_{LS} = 0.6912 \times 1.0/1.0 = 0.6912$ $Z_G = YZ_{gXYZ} \cdot Z_{wtpt}/Z_{LS} = 0.0605 \times 1.3433/0.8251 = 0.09850$ $X_B = X_{bXYZ} \cdot X_{wtpt}/X_{LS} = 0.2428 \times 0.9414/0.9642 = 0.2371$ $Y_B = Y_{bXYZ} \cdot Y_{wtpt}/Y_{LS} = 0.1185 \times 1.0/1.0 = 0.1185$ $Z_B = Z_{bXYZ} \cdot Z_{wtpt}/Z_{LS} = 0.7545 \times 1.3433/0.8251 = 1.2284$ Step 3: The proportional constants $k_R$, $k_G$ and $k_B$ of each of R, G and B color elements are calculated.

The fact there are different color temperatures means that the ratio among R, G and B color elements varies. However, in R, G and B, which are primary colors, chromaticity values xy do not vary even if color temperature varies (Relationship A). The calculation process is omitted here.

If the following matrix equation is solved, $$\begin{pmatrix} k_R \\ k_G \\ k_B \end{pmatrix} = \begin{pmatrix} X_R & X_G & X_B \\ Y_R & Y_G & Y_B \\ Z_R & Z_G & Z_B \end{pmatrix}^{-1} \begin{pmatrix} X_C \\ Y_C \\ Z_C \end{pmatrix} = \begin{pmatrix} 0.3560 & 0.3482 & 0.2371 \\ 0.1903 & 0.6912 & 0.1185 \\ 0.0164 & 0.0985 & 1.2284 \end{pmatrix}^{-1} \begin{pmatrix} 0.939 \\ 1.0 \\ 1.0363 \end{pmatrix}$$

$k_R=1.163$, $k_G=0.998$ and $k_B=0.748$ can be obtained.

Step 4: The XYZ values of each of the R, G and B color elements after color temperature modification are calculated.

$X'_R = X_R \times k_R = 0.3560 \times 1.163 = 0.4140$ $Y'_R = Y_R \times k_R = 0.1903 \times 1.163 = 0.2213$ $Z'_R = Z_R \times k_R = 0.01644 \times 1.163 = 0.0191$ $X'_G = X_G \times k_G = 0.3482 \times 0.998 = 0.3475$ $Y'_G = Y_G \times k_G = 0.6912 \times 0.998 = 0.6898$ $Z'_G = Z_G \times k_G = 0.0985 \times 0.998 = 0.0983$ $X'_B = X_B \times k_R = 0.2371 \times 0.748 = 0.1774$ $Y'_B = Y_B \times k_R = 0.1185 \times 0.748 = 0.0886$ $Z'_B = Z_B \times k_R = 1.2284 \times 0.748 = 0.9188$ Step 5: wtpt, rXYZ, gXYZ, bXYZ and wtpt are calculated.

$X'_{wtpt} = X_{color.temp.X} = 0.939$ $Y'_{wtpt} = Y_{color.temp.X} = 1.0$ $Z'_{wtpt} = Z_{color.temp.X} = 1.0363$ $X'_{rXYZ} = X'_R X_{LS}/X'_{wtpt} = 0.4140 \times 0.9642/0.939 = 0.4251$ $Y'_{rXYZ} = Y'_R Y_{LS}/Y'_{wtpt} = 0.2213 \times 1.0/1.0 = 0.2213$ $Z'_{rXYZ} = Z'_R Z_{LS}/Z'_{wtpt} = 0.0191 \times 0.8251/1.0363 = 0.0152$ $X'_{gXYZ} = X'_G X_{LS}/X'_{wtpt} = 0.3475 \times 0.9642/0.939 = 0.3568$ $Y'_{gXYZ} = Y'_G Y_{LS}/Y'_{wtpt} = 0.6898 \times 1.0/1.0 = 0.6898$ $Z'_{gXYZ} = Z'_G Z_{LS}/Z'_{wtpt} = 0.0983 \times 0.8251/1.0363 = 0.0783$ $X'_{bXYZ} = X'_B X_{LS}/X'_{wtpt} = 0.1774 \times 0.9642/0.939 = 0.1822$ $Y'_{bXYZ} = Y'_B Y_{LS}/Y'_{wtpt} = 0.0886 \times 1.0/1.0 = 0.0866$ $Z'_{bXYZ} = Z'_B Z_{LS}/Z'_{wtpt} = 0.9188 \times 0.8251/1.0363 = 0.7315$ Step 6: They are stored.

By storing a profile that stores wtpt, rXYZ, gXYZ and bXYZ in step 5, a profile with a different color temperature can be generated.

According to the procedure described above, a profile with a different color temperature can be generated by the measurement of one color.

FIG. 28 shows the dump code of a matrix profile.

A TRC is stored in the double underlined areas shown in FIG. 28. Since a TRC is stored using two bytes, values 0, 5407, 18841, 39075 and 65535 are stored. If the values are normalized using 65563, then 0.00825, 0.2875, 0.5963 and 1.0 can be obtained. These are color tone data. In a TRC, an output value obtained by equally dividing an input is stored. Since in this example, the number of TRCs is five, relationships between inputs and outputs (input, output)=(0,0), (0.25, 0.0825), (0.5, 0.2875), (0.75, 0.5963) and (1.0, 1.0) are stored. To modify this profile to $\gamma 2.2$, it is sufficient if values obtained by multiplying $0.25^{2.2}=0.0474$, $0.5^{2.2}=0.2176$ and $0.75^{2.2}=0.5310$ by 65535 are stored. Therefore, it is sufficient if the double underlined values are rewritten as 0000, 0c22, 37b4, 87ef and ffff (see claim 7). In reality, since there are TRCs for R, G and B color elements in a profile, the number of areas to be rewritten is three.

As to an LUT profile, by automatically selecting a profile with the highest accuracy, the workload of a user can be reduced, as in the case of a matrix profile.

Figure 29:
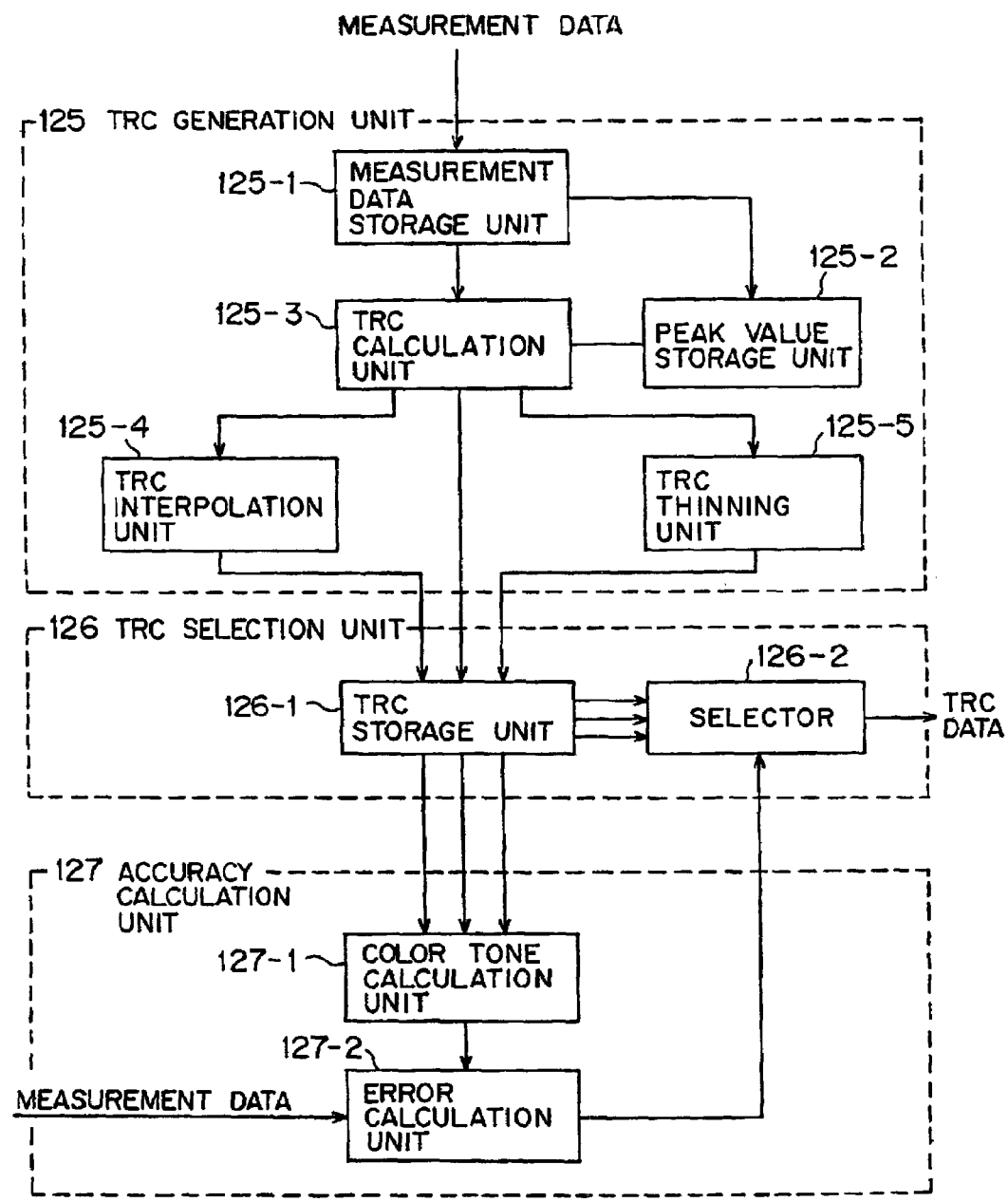
FIG. 29 shows the detailed configuration of the eighth preferred embodiment of the display-measuring device shown in FIG. 25.

FIG. 29 shows the details of the configuration shown in FIG. 25.

In the TRC generation unit 125, all measurement data are temporarily stored in a measurement data storage unit 125-1. A peak value storage unit 125-2 stores the XYZ values of the maximum color (for example, in the case of red, RGB values (255, 0, 0)) of the measurement data. A TRC calculation unit 125-3 calculates a ratio to the maximum color by dividing each measurement data value by the measurement data value of the maximum color. Since according to the regulations of an ICC profile, a TRC is stored using 16 bits, the maximum value is 65535. Therefore, a TRC can be obtained by multiplying the ratio of each piece of color tone data to the maximum color calculated earlier, by 65535. A TRC interpolation unit 125-4 increases the number of TRCs by interpolating the generated TRCs. For the interpolation, a simple linear interpolation, interpolation similar to a $\gamma$ curve ($(input)=(output)^\gamma$) or the like, are used. Conversely, a TRC thinning unit 125-5 reduces the number of nodes of a TRC by thinning out a part of the TRC. Thus, the TRC generation unit 125 generates a plurality of TRCs with different numbers of nodes.

The TRC selection unit 126 temporarily stores the plurality of generated TRCs and transmits each of the TRCs to the accuracy calculation unit 127.

In the accuracy calculation unit 127, a color tone calculation unit 127-1 calculates the color tone value of specific RGB values based on the received TRC and transmits the calculation result to an error calculation unit 127-2. The error calculation unit 127-2 compares a measurement value obtained by measuring a color patch with RGB values with the output of the color tone calculation unit 127-1, detects the TRC with the smallest error and transmits the result to the selector 126-2 of the TRC selection unit 126.

Upon receipt of the detection result of the accuracy calculation unit 127, the selector 126-2 outputs the TRC with the highest accuracy to the profile generation unit125.

Figure 30:
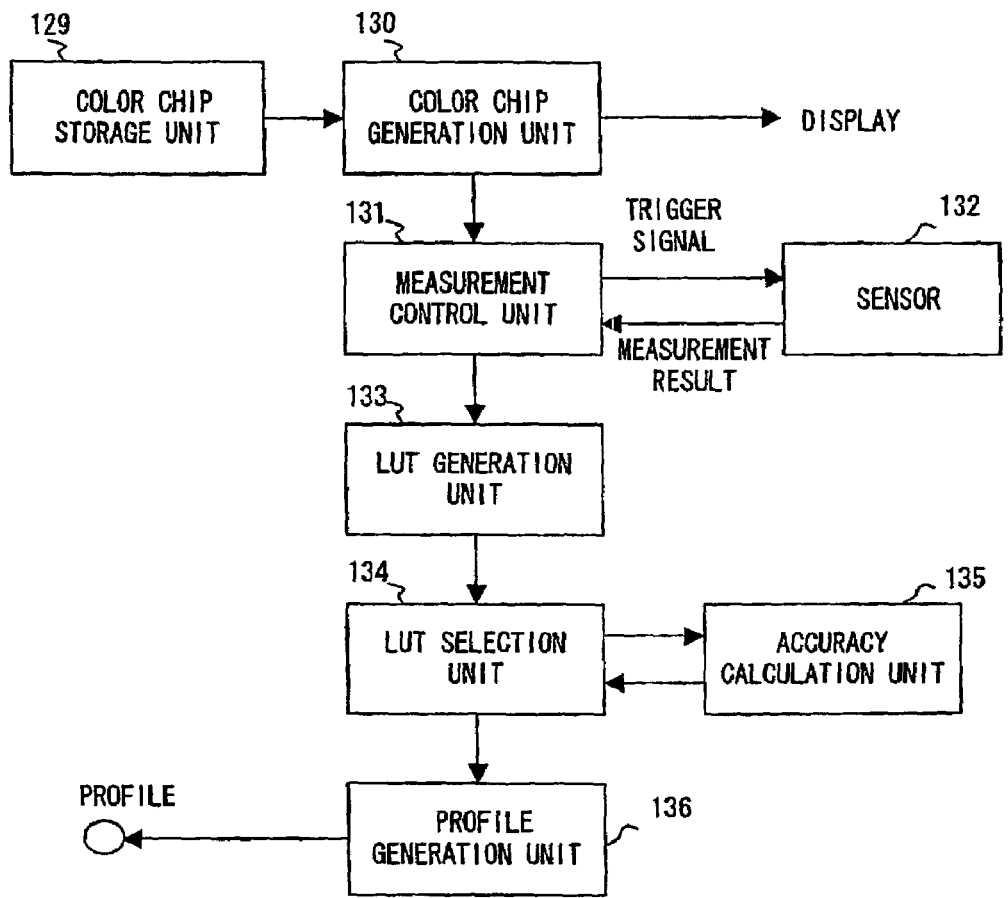
FIG. 30 shows the configuration of the ninth preferred embodiment of the display-measuring device of the present invention.

FIG. 30 shows the configuration of the ninth preferred embodiment of the display-measuring device of the present invention.

The color patch storage unit 129 stores a color patch required to generate an LUT or the RGB value of the color patch. The color patch unit 130 plots and displays the color patch on a display. The unit 130 also transmits a measurement start (trigger) signal to the measurement control unit 131. The measurement control unit 131 transmits the measurement result to an LUT generation unit 133 by performing control of a sensor 132. The LUT generation unit 133 generates LUTs composed of different numbers of grids. The accuracy calculation unit 135 evaluates the plurality of LUTs generated by the LUT generation unit 133. To evaluate the accuracy, the LUT with the highest accuracy can simply be selected. As the number of LUTs increases, the file size increases. Therefore, the most efficient number of LUTs can also be selected by taking a file size into consideration. As in the case of a matrix profile, the optimal number of grids is fixed to some extent for each model or type of a display. Therefore, the optimal number of grids for each model or type of a display can also be stored in a file and the number of grids can also be set depending on the type or model of a display.

Figure 31:
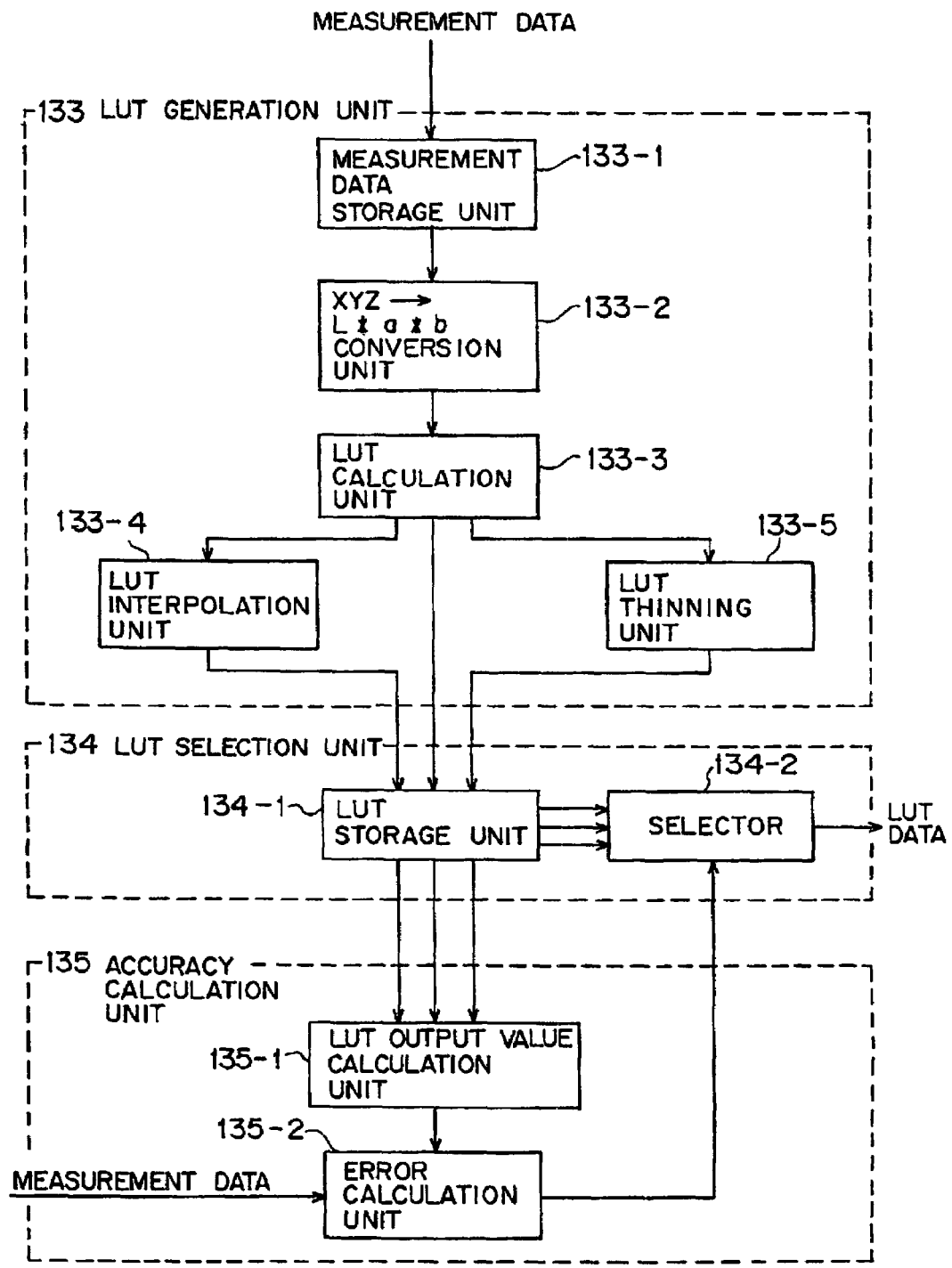
FIG. 31 shows the detailed configuration of the ninth preferred embodiment of the display-measuring device shown in FIG. 30.

FIG. 31 shows the details of the configuration shown in FIG. 30.

In the LUT generation unit 133, a measurement data storage unit 133-1 temporarily stores all measurement data. The output of a measuring instrument is usually XYZ values, and the values of an LUT profile is L*a*b* values. L*a*b* values can be obtained from XYZ values according to a calculation expression. An XYZ→L*a*b* conversion unit 133-2 converts XYZ values into L*a*b* values and transmits the L*a*b* values to an LUT calculation unit 133-3. The LUT calculation unit 133-3 generates an LUT in which the input RGB and output L*a*b* are related to each other. An LUT interpolation unit 133-4 increases the number of LUTs by interpolating the generated LUTs. For the interpolation, a simple linear interpolation, interpolation similar to a $\gamma$ curve ($(input)=(output)^\gamma$) or the like are used. Conversely, the LUT thinning unit 133-5 reduces the number of LUTs by thinning out a part of the LUT. Thus, the LUT generation unit 133 generates a plurality of LUTs with different numbers of LUTs.

The LUT selection unit 134 temporarily stores the plurality of generated LUTs and transmits each of the LUTs to the accuracy calculation unit 135.

In the accuracy calculation unit 135, an LUT output value calculation unit 135-1 calculates the color tone value of specific RGB value based on the received LUT and transmits the calculation result to an error calculation unit 135-2. The error calculation unit 135-2 compares the measurement value obtained by measuring a color patch with RGB values with the output value of the LUT output value calculation unit, detects the LUT with the smallest error and transmits the result to the selector 134-2 of the LUT selection unit 134.

Upon receipt of the detection result of the accuracy calculation unit 135, the selector 134-2 outputs an LUT with the highest accuracy to the profile generation unit 136.

Figure 32:
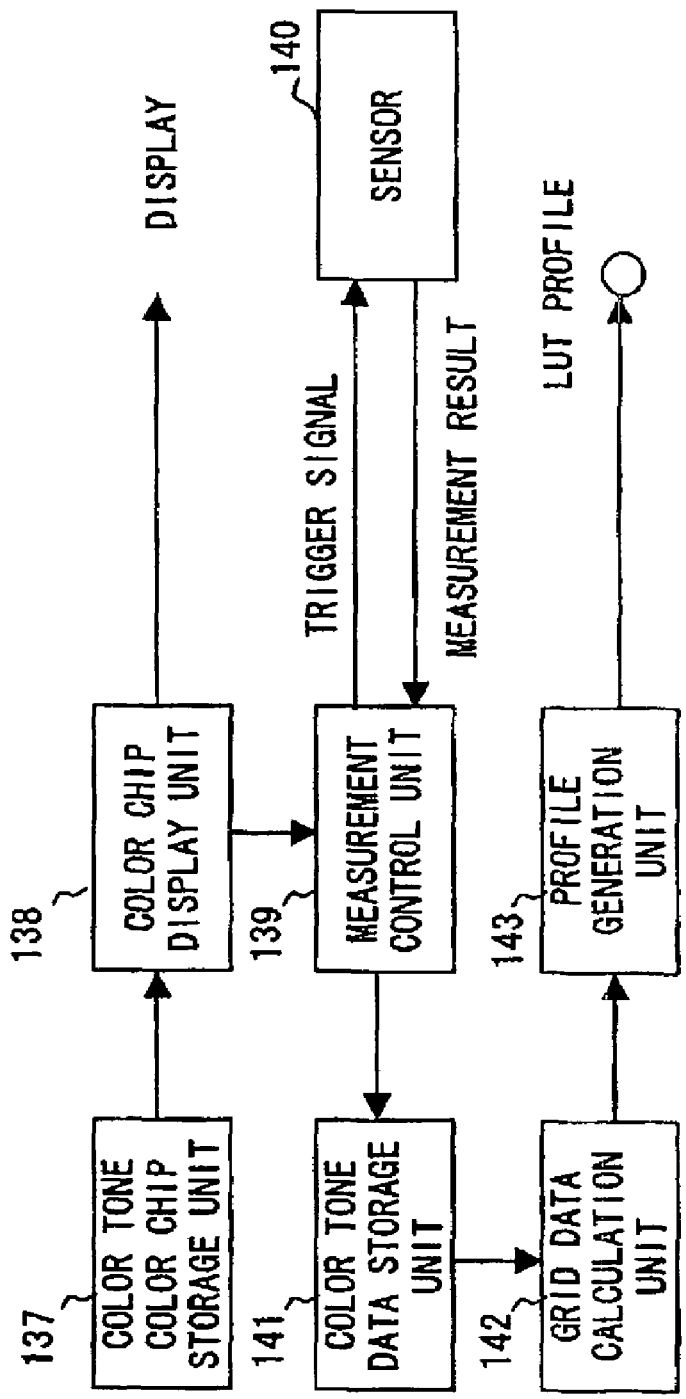
FIG. 32 shows the configuration of the tenth preferred embodiment of the display-measuring device of the present invention.

FIG. 32 shows the configuration of the tenth preferred embodiment of the display-measuring device of the present invention.

A color tone color patch storage unit 137 stores a color patch required to measure color tone data. A color patch display unit 138 displays the color patch on a display and transmits a measurement start (trigger) signal to a measurement control unit 139. The measurement control unit 139 transmits the trigger to a sensor 140 and measures the color of the color patch on the display. A color tone data storage unit 141 stores the measurement value. After the measurement of color tone data, a grid data calculation unit 142 generates grid data from the stored color tone data. For example, the color tone data are as follows:

TABLE 5

Example of the measurement result of color tone data

| R | G | B | X | Y | Z |
|---|---|---|---|---|---|
| 0 | 0 | 0 | 0 | 0 | 0 |
| 128 | 0 | 0 | 20.4 | 15.165 | 5.25 |
| 255 | 0 | 0 | 40.8 | 30.33 | 10.5 |
| 0 | 128 | 0 | 10.09 | 25.31 | 8.665 |
| 0 | 255 | 0 | 20.18 | 50.62 | 17.33 |
| 0 | 0 | 128 | 4.51 | 4.525 | 41.085 |
| 0 | 0 | 255 | 9.02 | 9.05 | 82.17 |

The following data of three grids can be generated by color additive-mixture.

TABLE 6

Data of three grids calculated by color additive-mixture

| R | G | B | X | Y | Z |
|---|---|---|---|---|---|
| 0 | 0 | 0 | 0 | 0 | 0 |
| 128 | 0 | 0 | 20.04 | 15.16 | 5.25 |
| 255 | 0 | 0 | 40.08 | 30.33 | 10.5 |
| 0 | 128 | 0 | 10.09 | 25.31 | 8.66 |
| 128 | 128 | 0 | 30.13 | 40.47 | 13.91 |
| 255 | 128 | 0 | 50.17 | 55.64 | 19.16 |
| 0 | 255 | 0 | 20.18 | 50.62 | 17.33 |
| 128 | 255 | 0 | 40.22 | 65.78 | 22.58 |
| 255 | 255 | 0 | 60.26 | 80.95 | 27.83 |
| 0 | 0 | 128 | 4.51 | 4.52 | 41.08 |
| 128 | 0 | 128 | 24.55 | 19.68 | 46.33 |
| 255 | 0 | 128 | 44.59 | 34.85 | 51.58 |
| 0 | 128 | 128 | 14.6 | 29.83 | 49.74 |
| 128 | 128 | 128 | 34.64 | 44.99 | 54.99 |
| 255 | 128 | 128 | 54.68 | 60.16 | 60.24 |
| 0 | 255 | 128 | 24.69 | 55.14 | 58.41 |
| 128 | 255 | 128 | 44.73 | 70.3 | 63.66 |
| 255 | 255 | 128 | 64.77 | 85.47 | 68.91 |
| 0 | 0 | 255 | 9.02 | 9.05 | 82.17 |
| 128 | 0 | 255 | 29.06 | 24.21 | 87.42 |
| 255 | 0 | 255 | 49.1 | 39.38 | 92.67 |
| 0 | 128 | 255 | 19.11 | 34.36 | 90.83 |
| 128 | 128 | 255 | 39.15 | 49.52 | 96.08 |
| 255 | 128 | 255 | 59.19 | 64.69 | 101.33 |
| 0 | 255 | 255 | 29.2 | 59.67 | 99.5 |
| 128 | 255 | 255 | 49.24 | 74.83 | 104.75 |
| 255 | 255 | 255 | 69.28 | 90 | 110 |

The profile generation unit 143 generates a profile based on the grid data.

Since a display with high color additive-mixture performance, such as a CRT, generates grid data not greatly different from actual values, a profile with high accuracy can be generated. However, since a part of LCDs or the like has low color additive-mixture performance, sometimes a profile generated from the color additive-mixture value has low accuracy. In such a case, a part of colors, for example white (255, 255, 255) is measured and the measurement value and the color additive-mixture value are compared. If the difference is less than a pre-determined threshold value, the display is judged to have high color additive-mixture performance and a profile is generated from the color additive-mixture value. If the difference is more than the threshold value, the display is judged to have low color additive-mixture performance and the grid data are measured. By checking color additive-mixture performance, a profile with low accuracy can be prevented from being generated.

Figure 33:
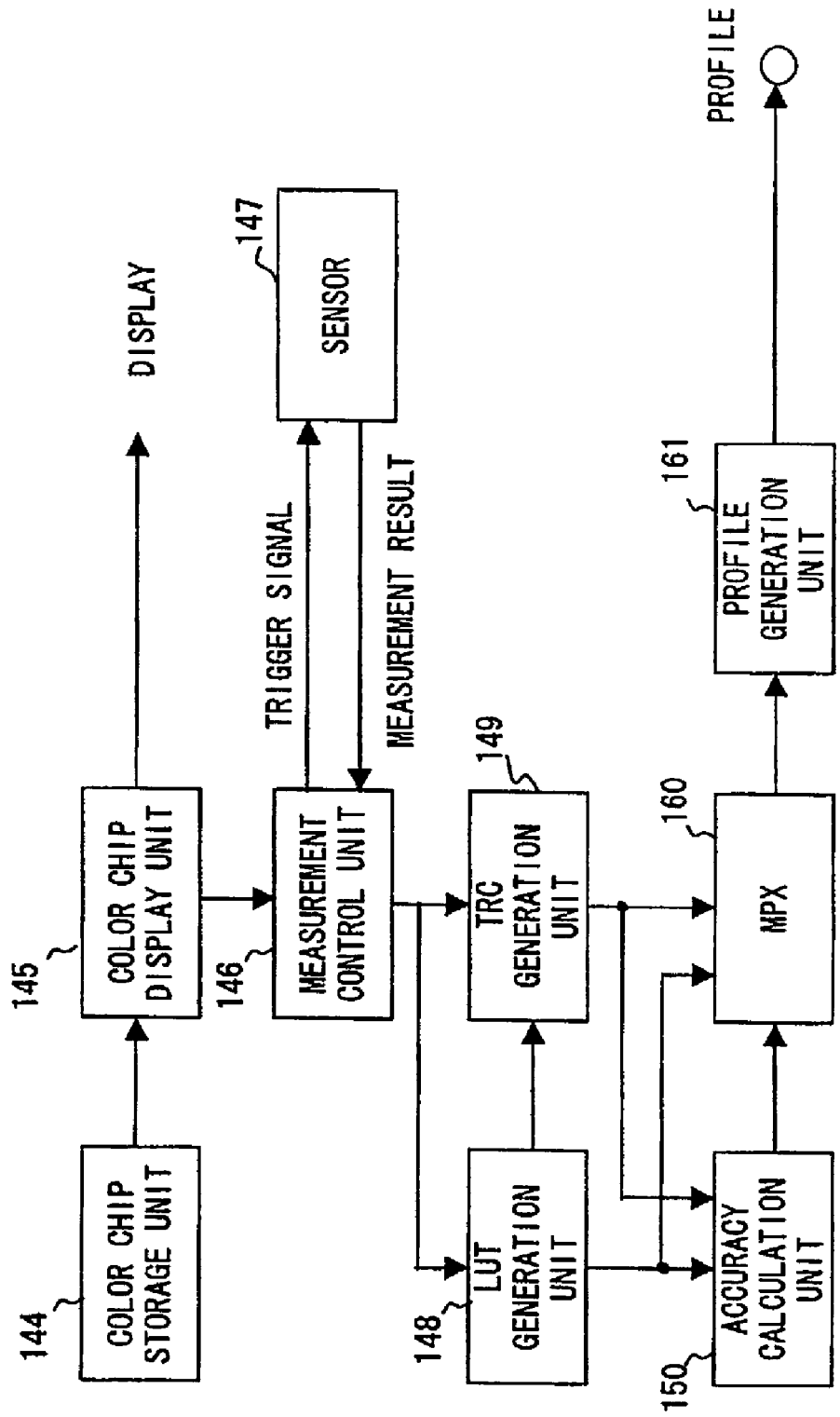
FIG. 33 shows the configuration of the eleventh preferred embodiment of the display-measuring device of the present invention.

FIG. 33 shows the configuration of the eleventh preferred embodiment of the display-measuring device of the present invention.

According to the present invention, a TRC generation unit 149 generates a TRC for a matrix profile based on a measurement result, and an LUT generation unit 148 generates an LUT for an LUT profile. An accuracy judgment unit 150 compares the accuracy of a TRC with that of an LUT, and outputs the profile with the higher accuracy to a profile generation unit 161 through an MPX 160 (selector or the like). According to the present invention, the profile with higher accuracy is automatically selected and outputted.

An LUT profile requires a larger number of measurements than a matrix profile. For example, a matrix profile with nine color tones requires only the measurement of 28 colors of a color patch, while an LUT profile with nine grids requires the measurement of 729 colors. As to a display, in the case of a CRT, a matrix profile has higher accuracy than an LUT profile, and even in the case of a part of LCDs and some PDPs, a matrix profile has higher accuracy than an LUT profile. Therefore, first, measurement for a matrix profile is conducted and only the accuracy of a TRC is detected. If the accuracy of a TRC is higher than the pre-determined accuracy, both measurement for an LUT profile and profile generation are not performed and a matrix profile is outputted. Thus, both measurement time and generation time can be reduced.

It is determined to some extent, depending on the models or types of display, which is better, a matrix profile or an LUT profile. In most cases of a CRT, a matrix profile has higher accuracy and in most cases of an LCD/PDP, an LUT profile has higher accuracy. A profile, the type of which is designated for each model or type of a display can also be stored, and a type can also be selected depending on the models or types of a display.

Figure 34:
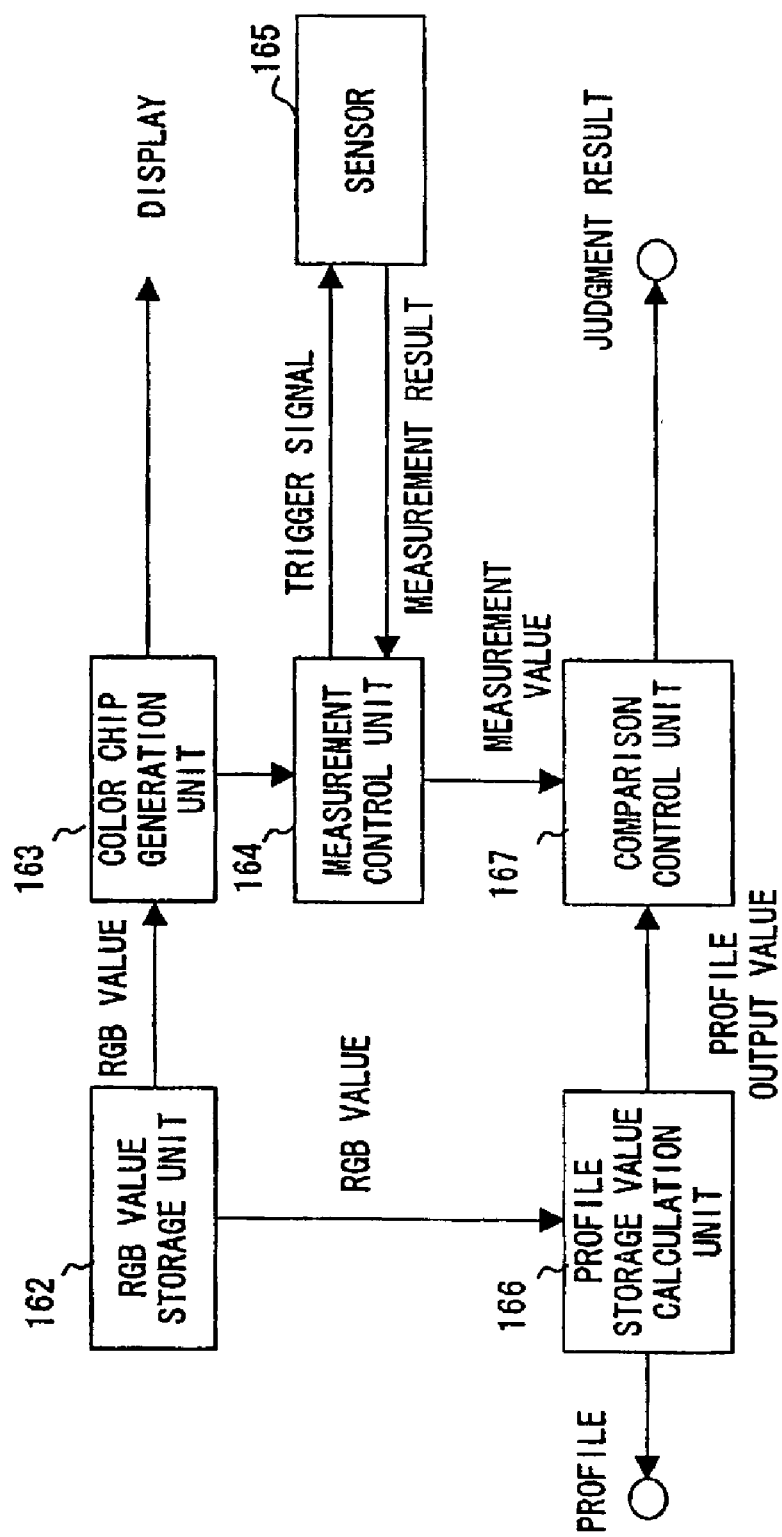
FIG. 34 shows the configuration of the twelfth preferred embodiment of the display-measuring device of the present invention.

FIG. 34 shows the configuration of the twelfth preferred embodiment of the display-measuring device of the present invention.

An RGB value storage unit 162 stores the RGB values of a color patch. A color patch generation unit 163 generates a color patch based on the RGB values and displays the color patch on a display. A measurement control unit 164 transmits a trigger signal to a sensor 165, measures color on the display and transmits the measurement result to a comparison/judgment unit 167. A profile for evaluation is transmitted to a profile operation unit 166, the output of the RGB value storage unit 162 is calculated and the calculation result is transmitted to a comparison control unit 167. The comparison control unit 167 compares both values. If the difference is less than a pre-determined value, an "OK" notification is sent to a user. If the difference is equal to or more than the threshold value, an "NG" notification is sent to a user. Since a human being performs color matching, the accuracy of a profile should be better if judged by human eyes than by a numeric value. In a profile, an image is reproduced using both information for converting RGB values into common color signals and information for inversely converting common color signals into RGB values. If a profile can be correctly generated, the difference between an original image and the conversion image will not be recognized. Displaying an original image and the conversion image on a display and enabling a user to recognize the difference is performed to judge the accuracy of a profile. It is preferable to evaluate a profile immediately after profile generation.

Figure 35:
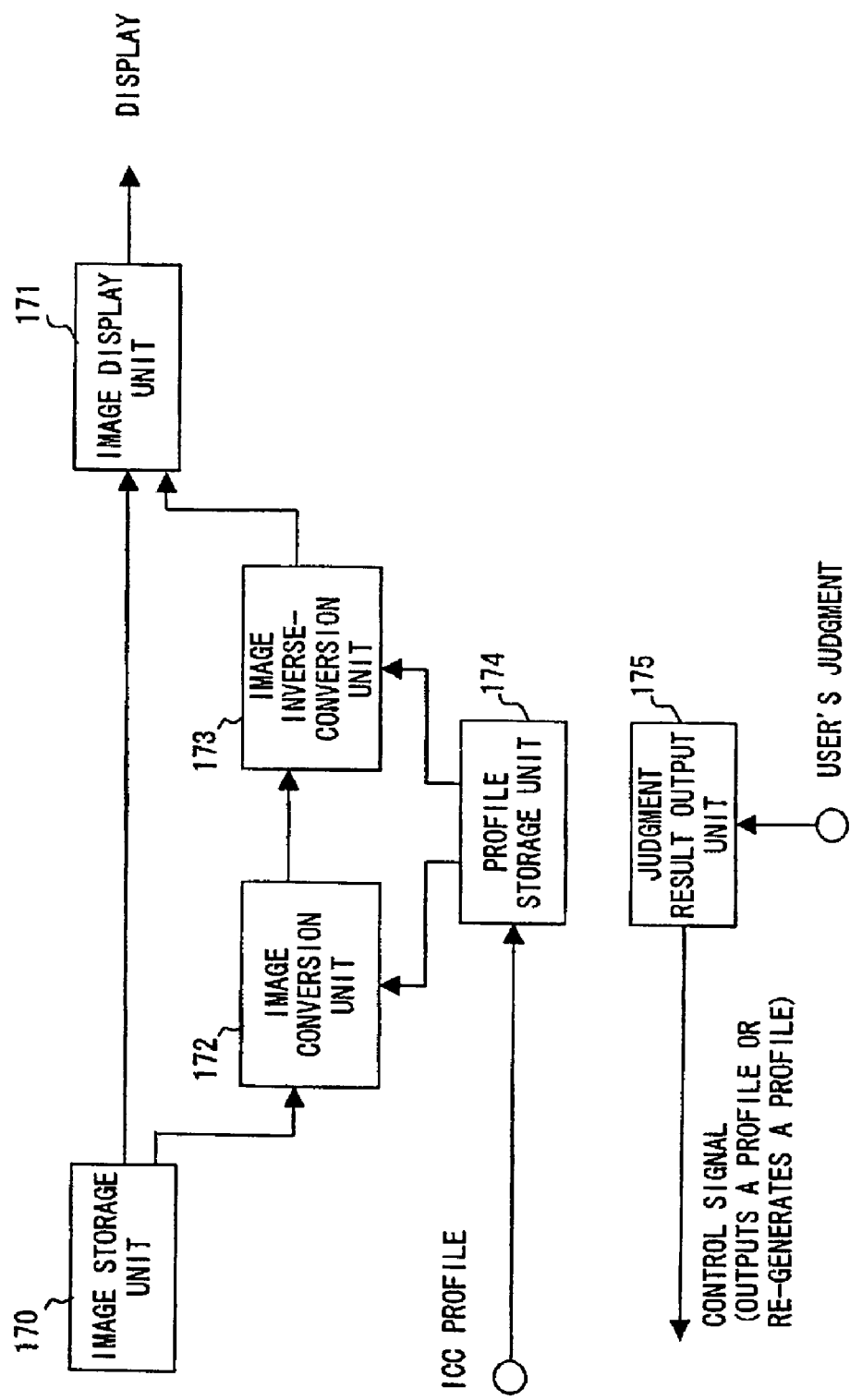
FIG. 35 shows the configuration of an alternative of the twelfth preferred embodiment in which a human being makes the judgment of a comparison control unit.

FIG. 35 shows dispersion in the case where a human being, instead of a comparison control unit, performs judgment in the twelfth preferred embodiment.

An image storage unit 170 stores an image for evaluation (a color patch, a natural image or the like). The image storage unit 170 transmits an image for evaluation to an image conversion unit 172. The image conversion unit 172 converts the image for evaluation into common color signals, such as XYZ and L*a*b*, according to the information of a profile stored in a profile storage unit 174. An image inverse-conversion unit 173 inversely converts the common color signals into RGB values again according to the information of the profile. An image display unit 171 displays both the image for evaluation stored in the image storage unit 170, which is a base, and the conversion image, the color of which is converted by a profile on a display. A user makes a comparison by eye of the two images displayed on the display, it is judged that "color is unnatural", "a difference is clearly recognized", "although a difference is recognized, it is allowable", "no difference can be recognized" or the like, and the judgment result is transmitted to a judgment result output unit 175. The judgment result output unit 175 outputs a control signal for a statement, such as "to output a generated profile", "to discard a generated profile and to generate a profile again" or the like, based on the user's evaluation result.

As described above, the present invention can solve the following conventional problems in the generation of a profile and can generate a profile with high accuracy.
(1) Color stability immediately after display
(2) After-image of displayed color
(3) Stability at the time of the start of display
(4) Display in which display luminance fluctuates
(5) Measurement error
(6) Information amount of a matrix profile
(7) Number of measurements of tone reproduction curve
(8) Accuracy of the information of a profile
(9) Troubles in both display setting and profile generation
(10) Number of grids of an LUT profile
(11) Number of measurements of grid data
(12) Selection of a profile type
(13) Confirmation of profile accuracy The present invention can provide a method for generating a profile for color conversion with high accuracy and is used to display an image on a display or the like and can match the color appearance of images displayed with different equipment with high accuracy.

What is claimed is:

1. A display measuring method for measuring a display characteristic of an electronic display, comprising:
   displaying a specific color patch on the electronic display;
   counting a time that elapses after the color patch is displayed; and
   measuring a color of the color patch displayed on the electronic display,
   wherein the color patch is measured when the time that elapses after the color patch is displayed reaches a specific pre-determined time.

2. A display measuring method for measuring a display characteristic of a display, comprising:
   displaying a specific color patch on a display;
   measuring a color of the color patch displayed on the display;
   displaying a pre-determined image on the display after a measurement; and
   counting a time that elapses after the predetermined image is displayed,
   wherein a subsequent color patch is displayed when a specific time elapses after the predetermined image is displayed.

3. The display measuring method according to claim 2, comprising:
   consecutively measuring images displayed in the image display step; and
   comparing a plurality of measurement results obtained in the interval measurement step and judging whether a measurement value is stabilized,
   wherein the subsequent color patch is displayed when the measurement value is judged to be stabilized.

4. A display measuring method for measuring a display characteristic of a display, comprising:
   displaying a specific color patch on a display;
   counting a time that elapses after the color patch is displayed;
   measuring a color of the color patch displayed on the display and wherein the color patch is measured when the time that elapses after the color patch display reaches a specific pre-determined time;
   displaying the specific color patch on the display;
   consecutively measuring colors of color patches displayed on the display;
   storing a plurality of measurement results;
   comparing the measurement result with a previous result and judging whether the measurement is stabilized; and
   discarding the previous measurement result of the color patch and storing the measurement result obtained when the measurement is stabilized if the measurement is stabilized.

5. A display measuring method for measuring a display characteristic of a display, comprising:
   displaying a specific color patch on a display;
   counting a time that elapses after the color patch is displayed;
   measuring a color of the color patch displayed on the display, wherein the color patch is measured when the time that elapses after the color patch display reaches a specific predetermined time
   counting a time required to judge that a measurement value is stabilized after the color patch display; and
   setting the count result as a measurement interval, and
   wherein the measurement interval set based on the m-th stabilization time is used for the n-th color patch (where, n>m).

6. A device for measuring a display characteristic of an electronic display, comprising:
   means for displaying a specific color patch on the electronic display;
   means for counting a period that elapses after the color patch is displayed; and
   means for measuring a color of the color patch displayed on the electronic display,
   wherein the color patch is measured when a specific pre-determined time elapses after the color patch is displayed.

7. A device for measuring a display characteristic of a display, comprising:
   means for displaying a specific color patch on the display;
   means for measuring color of the color patch displayed on the display;
   means for displaying a pre-determined image after the measurement; and means for counting a period that elapses after displaying the image, wherein a subsequent color patch is displayed when a specific period elapses after the image display.

8. A device for measuring a display characteristic of a display, comprising:

means for displaying an image before starting measurement of a color patch;

means for counting a period that elapses after displaying the image;

means for displaying a specific color patch on the display; and means for measuring a color of the specific color patch displayed on the display, wherein when a specific period elapses after displaying the image, the specific color patch is displayed and the measurement is started.

9. A display measuring method for measuring a display characteristic of a display, comprising:

displaying a specific color patch on a display;

measuring a color of the color patch displayed on the display;

displaying a pre-determined image on the display after a measurement;

counting a time that elapses after the display of the predetermined image and wherein a subsequent color patch is displayed when a specific time elapses after the predetermined image is displayed;

counting a time required to judge that a measurement value is stabilized after the color patch display; and setting the count result as a measurement interval and wherein the measurement interval set based on the m-th stabilization time is used for the n-th color patch (where, n>m).

10. A display measuring method for measuring a display characteristic of a display, comprising:

displaying an image on a display before a color patch starts to be measured;

counting a time that elapses after the display;

displaying a specific color patch on the display;

measuring a color of the specific color patch displayed on the display and wherein when a specific time elapses after the image is displayed, the specific color patch is displayed and a measurement is started;

counting a time required to judge that a measurement value is stabilized after the color patch display; and setting the count result as a measurement interval and wherein the measurement interval set based on the m-th stabilization time is used for the n-th color patch (where, n>m).

11. A display measuring method for measuring a display characteristic of a display, comprising:

counting a prescribed time after the power of a display is switched on;

displaying a color patch after a prescribed time elapses;

counting a time required to judge that a measurement value is stabilized after the color patch display; and setting the count result as a measurement interval and wherein the measurement interval set based on the m-th stabilization time is used for the n-th color patch (where, n>m).

12. A display measuring method for measuring a display characteristic of a display, comprising:

displaying a specific color patch on a display;

counting a time that elapses after the color patch is displayed;

measuring a color of the color patch displayed on the display and wherein the color patch is measured when the time that elapses after the color patch display reaches a specific predetermined time;

displaying the specific color patch on the display;

consecutively measuring colors of color patches displayed on the display;

storing a plurality of measurement results;

comparing the measurement result with a previous result and judging whether the measurement is stabilized;

discarding the previous measurement result of the color patch and storing the measurement result obtained when the measurement is stabilized if the measurement is stabilized;

counting a time required to judge that a measurement value is stabilized after the color patch display; and setting the count result as a measurement interval and wherein the measurement interval set based on the m-th stabilization time is used for the n-th color patch (where, n>m).

13. A display measuring method for measuring a color display characteristic of a display, comprising:

displaying a color patch on the display; and measuring a color of the color patch on the display a predetermined time after the displaying the color patch on the display.

14. A display measuring method for measuring a color display characteristic of a display, comprising:

displaying a color patch on the display; and measuring a color of the color patch on the display after a steady state is reached.

* * * * *

UNITED STATES PATENT AND TRADEMARK OFFICE
CERTIFICATE OF CORRECTION

PATENT NO. : 7,268,913 B2  Page 1 of 1
APPLICATION NO. : 10/028264
DATED : September 11, 2007
INVENTOR(S) : Kimitaka Murashita It is certified that error appears in the above-identified patent and that said Letters Patent is hereby corrected as shown below:

Title Page, Column 2 (Abstract), Line 6, change "patchs" to --patches--.

Signed and Sealed this

First Day of April, 2008

JON W. DUDAS
*Director of the United States Patent and Trademark Office*